(12) United States Patent
Asakura et al.

(10) Patent No.: US 8,704,938 B2
(45) Date of Patent: Apr. 22, 2014

(54) OPTICAL DEVICE AND IMAGE PICKUP DEVICE AND IMAGE PICKUP SYSTEM USING THE SAME

(75) Inventors: Ayako Asakura, Shibuya-Ku (JP); Akikazu Yachi, Shibuya-Ku (JP)

(73) Assignee: Olympus Corporation, Tokyo (JP)

( * ) Notice: Subject to any disclaimer, the term of this patent is extended or adjusted under 35 U.S.C. 154(b) by 65 days.

(21) Appl. No.: 13/408,767

(22) Filed: Feb. 29, 2012

(65) Prior Publication Data

US 2012/0162486 A1    Jun. 28, 2012

Related U.S. Application Data

(63) Continuation of application No. PCT/JP2010/005342, filed on Aug. 31, 2010.

(30) Foreign Application Priority Data

| Sep. 1, 2009 | (JP) | 2009-201689 |
| Oct. 26, 2009 | (JP) | 2009-245067 |
| Oct. 26, 2009 | (JP) | 2009-245068 |

(51) Int. Cl.
*H04N 5/232* (2006.01)
*H04N 5/225* (2006.01)
*H04N 5/228* (2006.01)

(52) U.S. Cl.
USPC ......... 348/345; 348/252; 348/335; 348/222.1

(58) Field of Classification Search
USPC ......... 348/208.11, 240.1, 240.3, 259, 333.08, 348/335, 340, 344, 252, 222.1, 345; 359/619, 325, 237
See application file for complete search history.

(56) References Cited

U.S. PATENT DOCUMENTS

| 6,469,837 B2 * | 10/2002 | Toyama | 359/652 |
| 6,563,104 B2 * | 5/2003 | Ogi et al. | 250/208.1 |
| 2007/0097253 A1 | 5/2007 | Woo et al. | |
| 2009/0051805 A1 * | 2/2009 | Pan | 348/345 |
| 2009/0125105 A1 | 5/2009 | Lesage et al. | |
| 2009/0141140 A1 * | 6/2009 | Robinson | 348/222.1 |
| 2009/0141163 A1 * | 6/2009 | Attar et al. | 348/345 |
| 2011/0122281 A1 * | 5/2011 | Ohara et al. | 348/222.1 |

FOREIGN PATENT DOCUMENTS

| JP | 11127382 | 5/1999 |
| JP | 2007-60647 | 3/2007 |
| JP | 2007-122055 | 5/2007 |
| JP | 2009-122514 | 6/2009 |
| JP | 2009-124569 | 6/2009 |

(Continued)

OTHER PUBLICATIONS

Murali Subbarao, et al., "Localized and Computationally Efficient Approach to Shift-Variant Image Debluring", Image Processing, 2008. ICIP 2008. 15th IEEE International Conference, p. 657-660.

*Primary Examiner* — Nhan T Tran
*Assistant Examiner* — Chan Nguyen
(74) *Attorney, Agent, or Firm* — Kenyon & Kenyon LLP

(57) ABSTRACT

An optical device where an image of an object is formed on an image pickup element and where an image restoration process is performed on the image obtained by the image pickup element, comprising
a MTF that satisfies the following conditional expression (1):

$$0.001 < L \times NA < 0.5, 5 < a < 30 \quad (1)$$

where L: the width of the MTF when the MTF is a %, and NA: a numerical aperture of the optical device.

28 Claims, 43 Drawing Sheets

(56) References Cited

FOREIGN PATENT DOCUMENTS

| JP | 2009-169092 | 7/2009 |
| WO | WO 2007128423 | 11/2007 |
| WO | 2009/069752 | 6/2009 |

* cited by examiner

Example 1-1
(Spherical aberration control)

(a) On-axis (b) Off-axis (c) Frequency crossing

Example 1-4 (Trifocal lens)

(a) On-axis (c) Frequency crossing

Example 1-5 (Spherical aberration control)

(a) On-axis (b) Off-axis

OPTICAL DEVICE AND IMAGE PICKUP DEVICE AND IMAGE PICKUP SYSTEM USING THE SAME

CROSS REFERENCE TO RELATED APPLICATIONS

This application is a continuation of PCT International Application No. PCT/JP2010/005342 filed on Aug. 31, 2010, which in turn claims priority under 35 U.S.C. §119 to Japanese Patent Application No. 2009-201689, filed on Sep. 1, 2009, and to Japanese Patent Application No. 2009-245067, filed on Oct. 26, 2009, and to Japanese Patent Application No. 2009-245068, filed on Oct. 26, 2009; each of which is expressly incorporated herein by reference thereto.

BACKGROUND OF THE INVENTION

The present invention relates to an optical device, which is used in a digital camera or the like, an image pickup device, which uses the optical device, and an image pickup system, which includes the image pickup device and an external device; and more particularly to those having an optical system suitable for an image restoration process, which is performed on a taken image.

Conventionally, various image pickup devices are known that take a picture by projecting an image of an object, which is obtained as the light is concentrated through an optical system, onto an image pickup element such as CCD. In such an image pickup device, on an image obtained by an image pickup process, various kinds of image processing are typically performed to process the image in a filter having a predetermined characteristic.

As such a kind of image pickup device capable of image processing, what is disclosed in JP-A-2008-011492 is an image pickup device that includes an optical system, an image pickup element, a conversion means and a signal processing means and uses a first filter and a second filter. The optical system is so formed that, at a focal position and in distances before and behind the focal position, the amounts of focus blur become substantially constant. The image pickup element takes an object's image, which is formed by the optical system. The conversion means corrects the focus blur in the image obtained from the image pickup element, and generates a restored image. The signal processing means performs predetermined image processing on an image signal. The first filter is used, at the time of still image taking mode, for an image restoration process of the conversion means. The second filter is used, at the time of moving image taking mode or when a through-the-lens image is displayed, for an image restoration process of the conversion means.

According to what is disclosed in JP-A-2008-011492, at the time of moving image taking mode or when a through-the-lens image is displayed, the second filter can be used to carry out a simple image restoration process. As a result, without the need for expensive conversion means, the optical system can be simplified, resulting in lower costs. Moreover, it is possible to provide an image pickup device that prevents a restored image from being degraded.

SUMMARY OF THE INVENTION

An optical device of the present invention and an image pickup device and image pickup system using the same achieve any of the following.

According to a No. 1-1 configuration of an optical device of the present invention, an optical device where an image of an object is formed on an image pickup element and where an image restoration process is performed on the image obtained by the image pickup element has a MTF that satisfies the following conditional expression (1):

$$0.001 < L \times NA < 0.5, 5 < a < 30 \qquad (1)$$

where L: the width of the MTF when the MTF is a %, and
NA: a numerical aperture of the optical device.

According to a No. 1-2 configuration of an optical device of the present invention, in the No. 1-1 configuration, the MTF satisfies the following conditional expression (2):

$$0.001 < Lc \times NA < 0.5, 5 < a < 30 \qquad (2)$$

where Lc: a half-value width of the MTF.

According to a No. 1-3 configuration of an optical device of the present invention, in the No. 1-1 configuration, the MTF has a spatial frequency that satisfies the following conditional expression (3):

$$V = 1/(2 \times P \times A), 1 < A < 20 \qquad (3)$$

where v: a spatial frequency, and
P: a pixel pitch of the image pickup element.

According to a No. 1-4 configuration of an optical device of the present invention, in the No. 1-1 configuration, the MTF has a spatial frequency that satisfies the following conditional expression (4):

$$v = 1/(2 \times P \times A), 2 < A < 8 \qquad (4)$$

where v: a spatial frequency, and
P: a pixel pitch of the image pickup element.

According to a No. 1-5 configuration of an optical device of the present invention, in the No. 1-1 configuration, the MTF has a spatial frequency that satisfies the following conditional expression (5):

$$0.001 < v/N < 3 \qquad (5)$$

where v: a spatial frequency, and
N: the number of pixels on one side of the image pickup element.

A No. 1-1 configuration of an image pickup device of the present invention includes: an image pickup element; an optical system that forms an image of an object on the image pickup element; and an image processing means for executing image processing on the image obtained by the image pickup element, wherein the optical system has a MTF that satisfies the following conditional expression (1):

$$0.001 < L \times NA < 0.5, 5 < a < 30 \qquad (1)$$

where L: the width of the MTF when the MTF is a %, and
NA: a numerical aperture of the optical system.

According to a No. 1-2 configuration of an image pickup device of the present invention, in the No. 1-1 configuration, the MTF satisfies the following conditional expression (2):

$$0.001 < Lc \times NA < 0.5, 5 < a < 30 \qquad (2)$$

where Lc: a half-value width of the MTF.

According to a No. 1-3 configuration of an image pickup device of the present invention, in the No. 1 or 2 configuration, the MTF has a spatial frequency that satisfies the following conditional expression (3):

$$v = 1/(2 \times P \times A), 1 < A < 20 \qquad (3)$$

where v: a spatial frequency, and
P: a pixel pitch of the image pickup element.

According to a No. 1-4 configuration of an image pickup device of the present invention, in the No. 1-1 or 1-2 configuration, the MTF has a spatial frequency that satisfies the following conditional expression (4):

$$v=1/(2\times P\times A), 2<A<8 \qquad (4)$$

where v: a spatial frequency, and
P: a pixel pitch of the image pickup element.

According to a No. 1-5 configuration of an image pickup device of the present invention, in the No. 1-1 to the No. 1-4 configurations, the MTF has a spatial frequency that satisfies the following conditional expression (5):

$$0.001<v/N<3 \qquad (5)$$

where v: a spatial frequency, and
N: the number of pixels on one side of the image pickup element.

More preferably, in the No. 1-1 to No. 1-5 configurations of the image pickup devices, any one of the following configurations is satisfied at the same time.

According to a No. 1-6 configuration of an image pickup device of the present invention, in any one of the No. 1-1 to No. 1-5 image pickup devices, the MTF satisfies, at a maximum aperture, each of the conditional expressions.

According to a No. 1-7 configuration of an image pickup device of the present invention, in any one of the No. 1-1 to No. 1-6 image pickup devices, the MTF crosses an MTF of another spatial frequency in a range where contrast does not become zero.

According to a No. 1-8 configuration of an image pickup device of the present invention, in the No. 1-7 image pickup device, the MTF crosses an MTF of another spatial frequency at a position less than or equal to 10%.

According to a No. 1-9 configuration of an image pickup device of the present invention, in any one of the No. 1-1 to No. 1-8 image pickup devices, a spherical aberration characteristic of the optical system has a peak value.

According to a No. 1-10 configuration of an image pickup device of the present invention, in the No. 1-9 image pickup device, a spherical aberration characteristic of the optical system has two or more peak values.

According to a No. 1-11 configuration of an image pickup device of the present invention, in the No. 1-10 image pickup device, peak values of the spherical aberration characteristic are positioned on positive and negative sides.

According to a No. 1-12 configuration of an image pickup device of the present invention, in the No. 1-1 to No. 1-11 image pickup devices, the optical system includes a wave-front control element, which is designed to realize the MTF.

According to a No. 1-13 configuration of an image pickup device of the present invention, in the No. 1-12 image pickup device, the wave-front control element designed to realize the MTF has an aspherical surface.

According to a No. 1-14 configuration of an image pickup device of the present invention, in the No. 1-12 image pickup device, the wave-front control element designed to realize the MTF is a phase plate.

According to a No. 1-15 configuration of an image pickup device of the present invention, in the No. 1-12 image pickup device, the wave-front control element designed to realize the MTF has a plurality of curvatures on one surface.

According to a No, 1-16 configuration of an image pickup device of the present invention, in the No. 1-12 image pickup device, the wave-front control element designed to realize the MTF has different curvatures in central and peripheral portions.

According to a No. 1-17 configuration of an image pickup device of the present invention, in the No. 1-15 or 1-16 image pickup device, the wave-front control element designed to realize the MTF is a lens having three curvatures on one surface.

According to a No. 1-18 configuration of an image pickup device of the present invention, in any one of the No. 1-12 to No. 1-17 image pickup devices, the wave-front control element designed to realize the MTF is made of birefringent crystal.

According to a No. 1-19 configuration of an image pickup device of the present invention, in any one of the No. 1-12 to 1-18 image pickup devices, the wave-front control element designed to realize the MTF is detachable.

According to a No. 1-20 configuration of an image pickup device of the present invention, in any one of the No. 1-1 to No. 1-19 image pickup devices, the image processing executed by the image processing means includes an image restoration process on an observation image output by the image pickup element.

According to a No. 1-21 configuration of an image pickup device of the present invention, in the No. 1-20 image pickup device, the image restoration process uses an image formation characteristic of the optical system.

According to a No. 1-22 configuration of an image pickup device of the present invention, in the No. 1-21 image pickup device, as for the image restoration process, a restored image executes a process represented by the following differential equation:

$$f(x,y)=g(x,y)+a_1(x,y)\cdot g'(x,y)+ \ldots +a_n(x,y)\cdot g^{(n)}(x,y)$$

where
f: the restored image
g: the observation image
$a_1, a_2, \ldots, a_n$: degradation parameters, and
$g^{(n)}$: nth-order differentiation for the observation image.

The configuration of a No. 1-1 image pickup system of the present invention includes anyone of the No. 1-1 to No. 1-22 image pickup devices; and an external device, which performs an image restoration process on an image obtained by the image pickup element.

According to the configuration of a No. 1-2 image pickup system of the present invention, in the No. 1-1 image pickup system, the image restoration process uses an image formation characteristic of the optical system.

According to the configuration of a No. 1-3 image pickup system of the present invention, in the No. 1-1 or 1-2 image pickup system, as for the image restoration process, a restored image executes a process represented by the following differential equation:

$$f(x,y)=g(x,y)+a_1(x,y)\cdot g'(x,y)+ \ldots +a_n(x,y)\cdot g^{(n)}(x,y)$$

where
f: the restored image
g: an observation image
$a_1, a_2, \ldots, a_n$: degradation parameters, and
$g^{(n)}$: nth-order differentiation for the observation image.

According to the configuration of a No. 1-4 image pickup system of the present invention, the image pickup device and the external device each have a communication means; and an observation image taken by the image pickup device is transmitted to the external device via the communication means.

According to a No. 2-1 configuration of an optical device of the present invention, in an optical device that forms an image of an object on an image pickup element and executes an image restoration process on the image obtained by the image pickup element, PSFs in at least two spots in an image-side predetermined region are substantially equal to each other.

According to a No. 2-2 configuration of an optical device of the present invention, in the No. 2-1 configuration, the predetermined region is a region of an optical-axis direction, and the PSFs are substantially equal to each other in two spots in the optical-axis direction.

According to a No. 2-3 configuration of an optical device of the present invention, in the No. 2-1 or 2-2 configuration, the predetermined region is a region of a direction perpendicular to the optical axis, and the PSFs are substantially equal to each other in two spots in an image-height direction.

According to a No. 2-4 configuration of an optical device of the present invention, in any one of the No. 2-1 to No. 2-3 configurations, a change in the width of the PSF between the two spots is within ±30%.

According to a No. 2-5 configuration of an optical device of the present invention, in the No. 2-4 configuration, the width of the PSF is a full-width at half-maximum.

A No. 2-1 configuration of an image pickup device of the present invention includes an image pickup element; an optical system that forms an image of an object on the image pickup element; and an image processing means for executing image processing on the image obtained by the image pickup element, wherein, in the optical system, PSFs in at least two spots in an image-side predetermined region are substantially equal to each other.

According to a No. 2-2 configuration of an image pickup device of the present invention, in the No. 2-1 configuration, the predetermined region is a region of an optical-axis direction, and the PSFs are substantially equal to each other in two spots in the optical-axis direction.

According to a No. 2-3 configuration of an image pickup device of the present invention, in the No. 2-1 or 2-2 configuration, the predetermined region is a region of a direction perpendicular to the optical axis, and the PSFs are substantially equal to each other in two spots in an image-height direction.

According to a No. 2-4 configuration of an image pickup device of the present invention, in any one of the No. 2-1 to No. 2-3 configurations, a change in the width of the PSF between the two spots is within ±30%.

According to a No. 2-5 configuration of an image pickup device of the present invention, in any one of the No. 2-1 to No. 2-4 configurations, a change in the width of the PSF between the two spots is within one-fourth of a pixel.

According to a No. 2-6 configuration of an image pickup device of the present invention, in the No. 2-4 or No. 2-5 configuration, the width of the PSF is a full-width at half-maximum.

According to a No. 2-7 configuration of an image pickup device of the present invention, in the No. 2-1 to No. 2-6 configurations, a spherical aberration characteristic of the optical system has a peak.

According to a No. 2-8 configuration of an image pickup device of the present invention, in the No. 2-7 configuration, a spherical aberration characteristic of the optical system has two or more peaks.

According to a No. 2-9 configuration of an image pickup device of the present invention, in the No. 2-8 configuration, peaks of the spherical aberration characteristic are positioned on positive and negative sides.

According to a No. 2-10 configuration of an image pickup device of the present invention, in any one of the No. 2-1 to No. 2-9 configurations, the optical system includes a wave-front control element, which is designed to realize the PSF.

According to a No. 2-11 configuration of an image pickup device of the present invention, in the No. 2-10 configuration, the wave-front control element designed to realize the PSF has an aspherical surface.

According to a No. 2-12 configuration of an image pickup device of the present invention, in the No. 2-10 configuration, the wave-front control element designed to realize the PSF is a phase plate.

According to a No. 2-13 configuration of an image pickup device of the present invention, in the No. 2-10 configuration, the wave-front control element designed to realize the PSF is a lens having a plurality of curvatures on one surface.

According to a No. 2-14 configuration of an image pickup device of the present invention, in the No. 2-10 configuration, the wave-front control element designed to realize the PSF is a lens having different curvatures in central and peripheral portions.

According to a No. 2-15 configuration of an image pickup device of the present invention, in the No. 2-13 or 2-14 configuration, the wave-front control element designed to realize the PSF is a lens having three curvatures on one surface.

According to a No. 2-16 configuration of an image pickup device of the present invention, in any one of the No. 2-10 to No. 2-15 configurations, the wave-front control element designed to realize the PSF is made of birefringent crystal.

According to a No. 2-17 configuration of an image pickup device of the present invention, in anyone of the No. 2-10 to No. 2-16 configurations, the wave-front control element designed to realize the PSF is detachable.

According to a No. 2-18 configuration of an image pickup device of the present invention, in anyone of the No. 2-1 to 2-17 configurations, the image processing executed by the image processing means includes an image restoration process on an image obtained by the image pickup element.

According to a No. 2-19 configuration of an image pickup device of the present invention, in the No. 2-18 configuration, the image restoration process uses an image formation characteristic of the optical system.

According to a No. 2-20 configuration of an image pickup device of the present invention, in the No. 2-19 configuration, as for the image restoration process, a restored image executes a process represented by the following differential equation:

$$f(x,y)=g(x,y)+a_1(x,y) \cdot g'(x,y)+ \ldots +a_n(x,y) \cdot g^{(n)}(x,y)$$

where
  f: the restored image
  g: the image
  $a_1, a_2, \ldots, a_n$: degradation parameters, and
  $g^{(n)}$: nth-order differentiation for the image.

A No. 2-1 configuration of an image pickup system of the present invention includes any one of the No. 2-1 to No. 2-20 image pickup devices; and an external device, which performs an image restoration process on an image obtained by the image pickup element.

According to a No. 2-2 configuration of an image pickup system of the present invention, in the No. 2-1 configuration, the image restoration process uses an image formation characteristic of the optical system.

According to a No. 2-3 configuration of an image pickup system of the present invention, in the No. 2-1 or 2-2 configuration, as for the image restoration process, a restored image executes a process represented by the following differential equation:

$$f(x,y)=g(x,y)+a_1(x,y) \cdot g'(x,y)+ \ldots +a_n(x,y) \cdot g^{(n)}(x,y)$$

where
f: the restored image
g: the image
$a_1, a_2, \ldots, a_n$: degradation parameters, and
$g^{(n)}$: nth-order differentiation for the image.

According to a No. 2-4 configuration of an image pickup system of the present invention, in any one of the No. 2-1 to No. 2-3 configurations, the image pickup device and the external device each have a communication means; and an image obtained by the image pickup element is transmitted to the external device via the communication means.

According to a No. 3-1 configuration of an optical device of the present invention, in an optical device that forms an image of an object on an image pickup element and executes an image restoration process on the image obtained by the image pickup element, LSFs in at least two spots in an image-side predetermined region are substantially equal to each other.

According to a No. 3-2 configuration of an optical device of the present invention, in the No. 3-1 configuration, the predetermined region is a region of an optical-axis direction, and the LSFs are substantially equal to each other in two spots in the optical-axis direction.

According to a No. 3-3 configuration of an optical device of the present invention, in the No. 3-1 or 3-2 configuration, the predetermined region is a region of a direction perpendicular to the optical axis, and the LSFs are substantially equal to each other in two spots in an image-height direction.

According to a No. 3-4 configuration of an optical device of the present invention, in any one of the No. 3-1 to No. 3-3 configurations, a change in the width of the LSF between the two spots is within ±50%.

According to a No. 3-5 configuration of an optical device of the present invention, in the No. 3-4 configuration, the width of the LSF is a full-width at half-maximum.

A No. 3-1 configuration of an image pickup device of the present invention includes an image pickup element; an optical system that forms an image of an object on the image pickup element; and an image processing means for executing image processing on the image obtained by the image pickup element, wherein, in the optical system, LSFs in at least two spots in an image-side predetermined region are substantially equal to each other.

According to a No. 3-2 configuration of an image pickup device of the present invention, in the No. 3-1 configuration, the predetermined region is a region of an optical-axis direction, and the LSFs are substantially equal to each other in two spots in the optical-axis direction.

According to a No. 3-3 configuration of an image pickup device of the present invention, in the No. 3-1 or 3-2 configuration, the predetermined region is a region of a direction perpendicular to the optical axis, and the LSFs are substantially equal to each other in two spots in an image-height direction.

According to a No. 3-4 configuration of an image pickup device of the present invention, in any one of the No. 3-1 to No. 3-3 configurations, a change in the width of the LSF between the two spots is within ±50%.

According to a No. 3-5 configuration of an image pickup device of the present invention, in any one of the No. 3-1 to No. 3-4 configurations, a change in the width of the LSF between the two spots is within one pixel.

According to a No. 3-6 configuration of an image pickup device of the present invention, in the No. 3-4 or No. 3-5 configuration, the width of the LSF is a full-width at half-maximum.

According to a No. 3-7 configuration of an image pickup device of the present invention, in the No. 3-1 to No. 3-6 configurations, a spherical aberration characteristic of the optical system has a peak.

According to a No. 3-8 configuration of an image pickup device of the present invention, in the No. 3-7 configuration, a spherical aberration characteristic of the optical system has two or more peak values.

According to a No. 3-9 configuration of an image pickup device of the present invention, in the No. 3-8 configuration, peaks of the spherical aberration characteristic are positioned on positive and negative sides.

According to a No. 3-10 configuration of an image pickup device of the present invention, in any one of the No. 3-1 to No. 3-9 configurations, the optical system includes a wave-front control element, which is designed to realize the LSF.

According to a No. 3-11 configuration of an image pickup device of the present invention, in the No. 3-10 configuration, the wave-front control element designed to realize the LSF has an aspherical surface.

According to a No. 3-12 configuration of an image pickup device of the present invention, in the No. 3-10 configuration, the wave-front control element designed to realize the LSF is a phase plate.

According to a No. 3-13 configuration of an image pickup device of the present invention, in the No. 3-10 configuration, the wave-front control element designed to realize the LSF is a lens having a plurality of curvatures on one surface.

According to a No. 3-14 configuration of an image pickup device of the present invention, in the No. 3-10 configuration, the wave-front control element designed to realize the LSF is a lens having different curvatures in central and peripheral portions.

According to a No. 3-15 configuration of an image pickup device of the present invention, in any one of the No. 3-10 to No. 3-14 configurations, the wave-front control element designed to realize the LSF is made of birefringent crystal.

According to a No. 3-16 configuration of an image pickup device of the present invention, in any one of the No. 3-10 to No. 3-15 configurations, the wave-front control element designed to realize the LSF is detachable.

According to a No. 3-17 configuration of an image pickup device of the present invention, in anyone of the No. 3-1 to 3-16 configurations, the image processing executed by the image processing means includes an image restoration process on an image obtained by the image pickup element.

According to a No. 3-18 configuration of an image pickup device of the present invention, in the No. 3-17 configuration, the image restoration process uses an image formation characteristic of the optical system.

According to a No. 3-19 configuration of an image pickup device of the present invention, in the No. 3-18 configuration, as for the image restoration process, a restored image executes a process represented by the following differential equation:

$$f(x,y)=g(x,y)+a_1(x,y) \cdot g'(x,y)+ \ldots +a_n(x,y) \cdot g^{(n)}(x,y)$$

where
f: the restored image
g: an observation image
$a_1, a_2,$ degradation parameters, and
$g^{(n)}$: nth-order differentiation for the image.

A No. 3-1 configuration of an image pickup system of the present invention includes any one of the No. 3-1 to No. 3-19 image pickup devices; and an external device, which performs an image restoration process on an image obtained by the image pickup element.

According to a No. 3-2 configuration of an image pickup system of the present invention, in the No. 3-1 configuration, the image restoration process uses an image formation characteristic of the optical system.

According to a No. 3-3 configuration of an image pickup system of the present invention, in the No. 3-1 or 3-2 configuration, as for the image restoration process, a restored image executes a process represented by the following differential equation:

$$f(x,y)=g(x,y)+a_1(x,y)\cdot g'(x,y)+\ldots+a_n(x,y)\cdot g^{(n)}(x,y)$$

where
f: the restored image
g: an observation image
$a_1, a_2, \ldots, a_n$: degradation parameters, and
$g^{(n)}$: nth-order differentiation for the image.

According to a No. 3-4 configuration of an image pickup system of the present invention, in any one of the No. 3-1 to No. 3-3 configurations, the image pickup device and the external device each have a communication means; and an image obtained by the image pickup element is transmitted to the external device via the communication means.

DESCRIPTION OF EXEMPLARY EMBODIMENTS

According to a No. 1-1 configuration of an optical device of the present embodiment, an optical device where an image of an object is formed on an image pickup element and where an image restoration process is performed on the image obtained by the image pickup element has a MTF that satisfies the following conditional expression (1):

$$0.001 < L \times NA < 0.5, 5 < a < 30 \tag{1}$$

where L: the width of the MTF when the MTF is a %, and
NA is a numerical aperture of the optical device.

The following explains the reason why the No. 1-1 configuration of the optical device is employed and the operation thereof.

In the optical device, an image of an object is formed by an optical system. At this time, according to the position of the object, the position of the formed image varies. When a plurality of objects is positioned differently, the image of each object too is positioned differently. Suppose that a certain object is used as a reference and brought into focus. In this case, before and behind the position (referred to as a reference image position, hereinafter) of the object's image, images of other objects are formed. At the reference image position, the object's image is obtained in focus. However, the objects' images before and behind the reference image position are out of focus (blurred).

Figure 1:
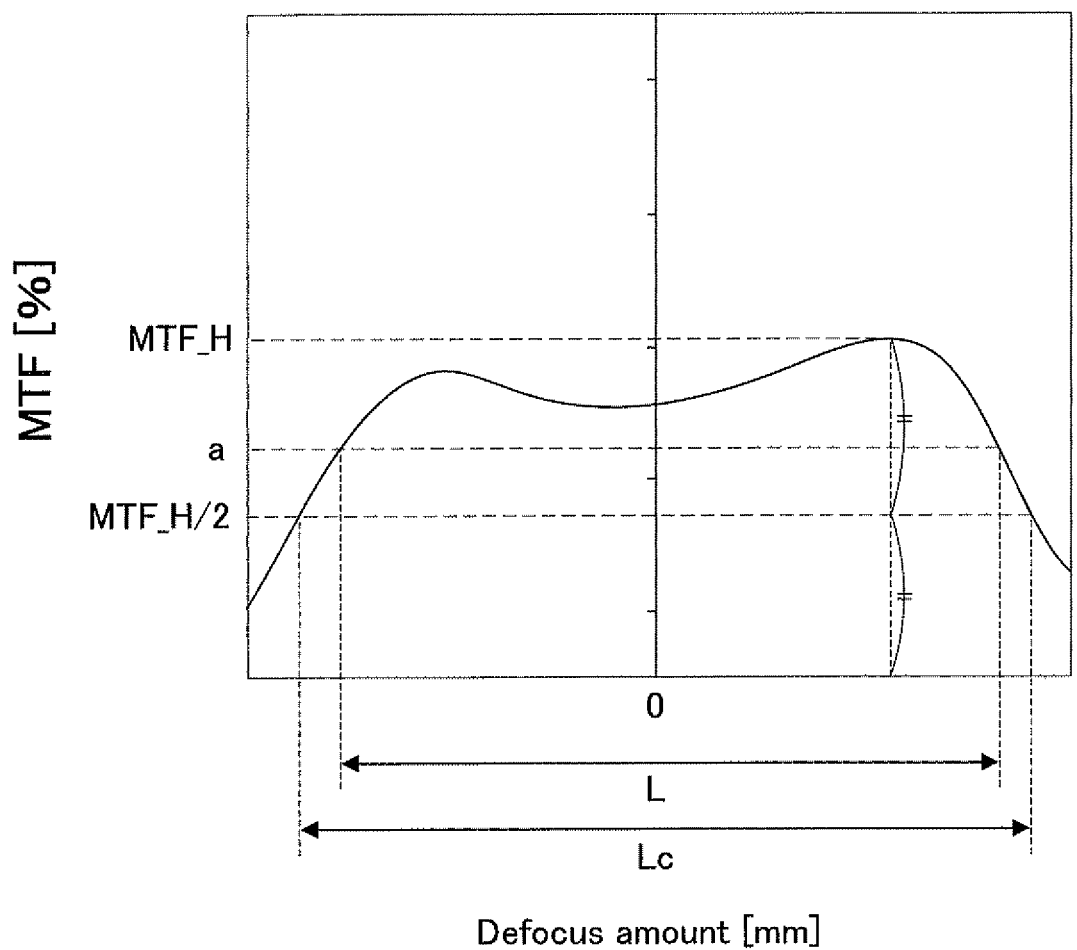
FIG. 1 is a diagram illustrating various parameters in a MTF characteristic of the present invention.

According to the No. 1-1 configuration, the shape of a MTF characteristic is defined as being constant, or substantially constant. Incidentally, MTF stands for Modulation Transfer Function. FIG. 1 is a schematic diagram illustrating various parameters in the optical device of the present embodiment, or more specifically, in the MTF characteristics of the optical system. What is shown in the diagram is a defocus amount, i.e. the MTF characteristic for which a MTF value is taken with respect to the distance (the horizontal axis in the diagram) in a direction running along an optical axis. According to the present embodiment, the MTF width represents a distance between both the farthest ends of a MTF characteristic. Even when the MTF characteristics cross each other midway between both the farthest ends, the crossing is not taken into account. As shown in the diagram, MTF_H represents a maximum value of MTF, and MTF_H/2 a half of the maximum value (½). When the MTF is a %, the MTF width is L. When the MTF is MTF_H/2, the MTF width is Lc.

When the conditional expression (1) is satisfied, the shape of the MTF characteristic can be made constant or substantially constant. In this case, as for each of the images obtained in the reference position and the vicinity thereof, almost the same image characteristics (the image quality, the degree of blur, and the like) can be obtained. Therefore, when an image restoration process is performed on the image, image restoration is carried out in an effective manner.

More specifically, for example, when a restoration process is performed to increase a MTF characteristic, the MTF can be restored in the same way on each pixel of an image. That is, it is possible to sufficiently improve the resolution for each of the pixels making up the image. As a result, the sufficiently resolved image can be restored. Moreover, the image can be restored as an image with a wide focal depth. Incidentally, the substantially constant MTF means a range (fluctuation range) in which, when an image restoration process is executed, image restoration is similarly performed in many pixels (to the extent that a sufficient resolution is obtained, for example).

When being greater than the upper limit of the conditional expression (1), the effects of the image restoration process becomes reduced. When being lower than the lower limit of the conditional expression (1), the MTF characteristic does not become wide in width, and the resolution of the optical device decreases. In any case, even if the image restoration process is executed, the obtained image has a remarkably low change in resolution.

Incidentally, in the conditional expression (1), it is preferred that, in the entire range of 5<a<30, the expression 0.001<L×NA<0.5 be satisfied. However, all that is required is that, in one of 5<a<30, the expression 0.001<L×NA<0.5 is satisfied.

According to a No. 1-2 configuration of an optical device of the present embodiment, in the No. 1-1 configuration, the MTF satisfies the following conditional expression (2):

$$0.001 < Lc \times NA < 0.5, 5 < a < 30 \tag{2}$$

where Lc: a half-value width of the MTF.

When the conditional expression (2) is satisfied, the shape of the MTF characteristic can be made constant or substantially constant. Therefore, when an image restoration process is performed on an image that is obtained with the use of the optical device, the image restoration process is carried out in an effective manner. That is, the sufficiently resolved image can be restored.

Incidentally, in the conditional expression (2), it is preferred that, in the entire range of 5<a<30, the expression 0.001<Lc×NA<0.5 be satisfied. However, all that is required is that, in one of 5<a<30, the expression 0.001<Lc×NA<0.5 is satisfied.

The No. 1-1 configuration of an image pickup device of the present embodiment includes: an image pickup element; an optical system that forms an image of an object on the image pickup element; and an image processing means for executing image processing on the image obtained by the image pickup element, wherein the optical system has a MTF that satisfies the following conditional expression (1):

$$0.001 < L \times NA < 0.5, 5 < a < 30 \tag{1}$$

where L: the width of the MTF when the MTF is a %, and
NA: a numerical aperture of the optical system.

According to a No. 1-2 configuration of an image pickup device of the present embodiment, in the No. 1-1 configuration, the MTF satisfies the following conditional expression (2):

$$0.001 < Lc \times NA < 0.5, 5 < a < 30 \tag{2}$$

where Lc: a half-value width of the MTF.

The image pickup devices of the No. 1-1 and No. 1-2 configurations are made by adding the following to the No. 1-1 and No. 1-2 configurations of the above-described optical devices (optical systems): the image pickup element, and the image processing means for executing image processing on an image obtained by the image pickup element. The conditional expressions (1) and (2) have already been explained above. According to the configurations of the first and second image pickup devices, an image can be obtained by the optical systems in which the shape of the MTF characteristic is constant or substantially constant; an image restoration process can be performed on the image in an effective manner. That is, the sufficiently resolved image can be restored.

According to a No. 1-3 configuration of an image pickup device of the present embodiment, in the No. 1-1 or 1-2 configuration, the MTF has a spatial frequency that satisfies the following conditional expression (3):

$$v = 1/(2 \times P \times A), 1 < A < 20 \tag{3}$$

where v: a spatial frequency, and
P: a pixel pitch of the image pickup element.

The following explains the reason why the No. 1-3 configuration of the image pickup device is employed and the operation thereof. What is defined in the No. 1-3 configuration is a spatial frequency at which a substantially constant MTF exists. According to the No. 1-3 configuration, with the use of maximum spatial frequency vmax=1/(2×P) in the image pickup element having pixel pitch P and coefficient A, a spatial frequency at which a substantially constant MTF exists is defined. According to the 1-3 configuration, in particular, the lower limit of the spatial frequency v is defined as vmax/20. The existence of at least one MTF that is substantially constant at a location where the image pickup element is placed and in predetermined distances before and behind the location in the range of the spatial frequency v is a prerequisite. The use of the optical system having such a prerequisite makes it possible to carry out the image restoration process in an effective manner. That is, the sufficiently resolved image can be restored.

According to a No. 1-4 configuration of an image pickup device of the present embodiment, in the No. 1-1 or 1-2 configuration, the MTF has a spatial frequency that satisfies the following conditional expression (4):

$$v=1/(2\times P\times A), 2<A<8 \qquad (4)$$

where v: a spatial frequency, and
P: a pixel pitch of the image pickup element.

The following explains the reason why the No. 1-4 configuration of the image pickup device is employed and the operation thereof. What is defined in the No. 1-4 configuration is a spatial frequency at which a substantially constant MTF exists, as in the No. 1-3 configuration. The range of the spatial frequency becomes narrower compared with the No. 1-3 configuration, and it is possible to perform a better image restoration process. Specifically, if a maximum spatial frequency is vmax, the upper limit of the spatial frequency is vmax/2, and the lower limit vmax/8. When the conditions are satisfied, it is possible to perform the image restoration process in a more effective manner. That is, a more resolved image can be restored.

According to a No. 1-5 configuration of an image pickup device of the present embodiment, in the No. 1-1 to the No. 1-4 configurations, the MTF has a spatial frequency that satisfies the conditional expression (5):

$$0.001<v/N<3 \qquad (5)$$

where v: a spatial frequency, and
N: the number of pixels on one side of the image pickup element.

The following explains the reason why the No. 1-5 configuration of the image pickup device is employed and the operation thereof. What is defined in the No. 1-5 configuration, too, is a spatial frequency at which a substantially constant MTF exists. According to the No. 1-5 configuration, with the use of the number of pixels on one side of the image pickup element used in the image pickup device, the upper and lower limits of the spatial frequency are defined. In this case, if the image pickup element is rectangular in shape, the number of pixels on one side of the image pickup element represents the number of pixels on the vertical or horizontal side on which more pixels are arranged than the other. In this manner, according to the conditional expression (5), the existence of at least one MTF that is substantially constant at a location where the image pickup element is placed and in predetermined distances before and behind the location in the range of the spatial frequency v is a prerequisite. When the prerequisite is satisfied, it is possible to perform the image restoration process in an effective manner. That is, the sufficiently resolved image can be restored.

More preferably, in the No. 1-1 to No. 1-5 configurations of the image pickup devices, any one of the following configurations is satisfied at the same time.

According to a No. 1-6 configuration of an image pickup device of the present embodiment, in any one of the No. 1-1 to No. 1-5 image pickup devices, the MTF satisfies, at a maximum aperture, each conditional expression.

The No. 1-6 configuration is so defined as to have a substantially constant MTF at the maximum aperture at which the focal depth becomes shallowest. When the optical system includes an adjustable diaphragm, the No. 1-6 configuration is so defined as to have a substantially constant MTF at the maximum aperture as described above. Accordingly, even when the adjustable diaphragm is changed, a substantially constant MTF can be obtained. As a result, on an image taken at any aperture position, the effective image restoration process can be realized. That is, a sufficiently resolved image can be restored.

According to a No. 1-7 configuration of an image pickup device of the present embodiment, in any one of the No. 1-1 to No. 1-6 image pickup devices, the MTF crosses an MTF of another spatial frequency in a range where contrast does not become zero.

The No. 1-7 configuration guarantees that, at an MTF of a target spatial frequency, the MTF at the location where the image pickup element is placed and at predetermined positions before and behind the location has a substantially constant spot in the relationship with the MTF of another spatial frequency. More specifically, suppose that the MTF of the target spatial frequency overlaps with the MTF of another spatial frequency. In this case, if the MTF of the target spatial frequency is substantially constant, the MTF crosses the MTF of another spatial frequency in the range where the contrast does not become zero. Incidentally, the fact that the contrast is zero represents, at the MTF of a spatial frequency of interest, a position where black and white is reversed and where the MTF becomes exactly zero.

According to a No. 1-8 configuration of an image pickup device of the present embodiment, in the No. 1-7 image pickup device, the MTF crosses an MTF of another spatial frequency at a position less than or equal to 10%.

What is defined in the No. 1-8 configuration is a condition that produces a better result in the No. 1-7 configuration. The No. 1-8 configuration further guarantees that, at an MTF of a target spatial frequency, the MTF at the location where the image pickup element is placed and at predetermined positions before and behind the location has a substantially constant spot in the relationship with the MTF of another spatial frequency.

According to a No. 1-9 configuration of an image pickup device of the present embodiment, in any one of the No. 1-1 to No. 1-8 image pickup devices, a spherical aberration characteristic of the optical system has a peak value.

According to the No. 1-9 configuration, on the basis of the spherical aberration characteristic of the optical system, the MTF is defined as being substantially constant at the location where the image pickup element is placed and at predetermined positions before and behind the location. When the spherical aberration characteristic has a peak value, then the spherical aberration characteristic moves in both positive-side and negative-side directions. As the spherical aberration characteristic moves in both directions, light rays are dispersed in the vicinity of the location where the image pickup element is placed. Because such a characteristic is provided, it is possible to form a substantially constant MTF.

According to a No. 1-10 configuration of an image pickup device of the present embodiment, in the No. 1-9 image pickup device, a spherical aberration characteristic of the optical system has two or more peak values.

The No. 1-10 configuration defines a condition that produces a better result in the No. 1-9 configuration. Since the spherical aberration characteristic has two or more peak values as described above, the spherical aberration characteristic moves at least two times in both positive-side and negative-side directions. Because such a characteristic is provided, it is possible to form a substantially constant MTF.

According to a No. 1-11 configuration of an image pickup device of the present embodiment, in the No. 1-10 image pickup device, peak values of the spherical aberration characteristic are positioned on positive and negative sides.

The No. 1-11 configuration defines a condition that produces a better result in the No. 1-10 configuration. Since the peak values of the spherical aberration characteristic are positioned at both the positive and negative sides, it is possible to form a substantially constant MTF.

According to a No. 1-12 configuration of an image pickup device of the present embodiment, in the No. 1-1 to No. 1-11 image pickup devices, the optical system includes a wave-front control element, which is designed to realize a substantially constant MTF.

Since the light wave-front control element is provided, it is possible to realize an optical system having a substantially constant MTF.

According to a No. 1-13 configuration of an image pickup device of the present embodiment, in the No. 1-12 image pickup device, the wave-front control element designed to realize the MTF has an aspherical surface.

Since the wave-front control element has an aspherical surface, it is possible to realize an optical system having a substantially constant MTF. For the wave-front control element having an aspherical surface, the following can be employed: an aspherical lens, an aspherical plate, a multifocal lens having an aspherical surface in any one of the regions thereof, or the like.

According to a No. 1-14 configuration of an image pickup device of the present embodiment, in the No. 1-12 image pickup device, the wave-front control element designed to realize the MTF is a phase plate.

Since a phase plate is used as the wave-front control element, it is possible to realize an optical system having a substantially constant MTF.

According to a No. 1-15 configuration of an image pickup device of the present embodiment, in the No. 1-12 image pickup device, the wave-front control element designed to realize the MTF is a lens having a plurality of curvatures on one surface.

Since a lens having a plurality of curvatures on one surface is used as the wave-front control element, it is possible to realize an optical system having a substantially constant MTF. As one curvature, those having a predetermined radius of curvature, such as spherical shapes, as well as curvatures obtained by predetermined calculation formulas as in the case of aspherical shapes, are contained.

According to a No. 1-16 configuration of an image pickup device of the present embodiment, in the No. 1-12 image pickup device, the wave-front control element designed to realize the MTF is a lens having different curvatures in central and peripheral portions.

Since a lens having different curvatures in central and peripheral portions is used as the wave-front control element, it is possible to realize an optical system having a substantially constant MTF.

According to a No. 1-17 configuration of an image pickup device of the present embodiment, in the No. 1-17 or 1-18 image pickup device, the wave-front control element designed to realize the MTF is a lens having three curvatures on one surface.

Since a lens having three curvatures on one surface is used as the wave-front control element, it is possible to realize an optical system having a substantially constant MTF.

According to a No. 1-18 configuration of an image pickup device of the present embodiment, in any one of the No. 1-12 to No. 1-17 image pickup devices, the wave-front control element designed to realize the MTF is made of birefringent crystal.

Since the wave-front control element is made of birefringent crystal, it is possible to realize an optical system having a substantially constant MTF.

According to a No. 1-19 configuration of an image pickup device of the present embodiment, in any one of the No. 1-12 to 1-18 image pickup devices, the wave-front control element designed to realize the MTF is detachable.

According to such a configuration, the wave-front control element can be removed from the optical system, or replaced with another optical element. It is possible to realize an optical system having a substantially constant MTF and another optical system in one device, as well as to change to a desired MTF characteristic when necessary.

According to a No. 1-20 configuration of an image pickup device of the present embodiment, in any one of the No. 1-1 to No. 1-19 image pickup devices, the image processing executed by the image processing means includes an image restoration process on an image obtained by the image pickup element.

According to the No. 1-20 configuration, it is possible to execute an image taking process and an image restoration process on an image obtained by the image taking process by using only one image pickup device.

According to a No. 1-21 configuration of an image pickup device of the present embodiment, in the No. 1-20 image pickup device, the image restoration process uses an image formation characteristic of the optical system.

According to the No. 1-21 configuration, the image restoration process is performed with the use of an image formation characteristic of the optical system. Therefore, the image restoration process can be performed in a more effective manner.

According to a No. 1-22 configuration of an image pickup device of the present embodiment, in the No. 1-21 image pickup device, as for the image restoration process, a restored image executes a process represented by the following differential equation:

$$f(x,y)=g(x,y)+a_1(x,y)\cdot g'(x,y)+\ldots+a_n(x,y)\cdot g^{(n)}(x,y)$$

where
 f: the restored image
 g: an observation image
 $a_1, a_2, \ldots, a_n$: degradation parameters, and
 $g^{(n)}$: nth-order differentiation for the observation image.

According to the No. 1-22 configuration, filtering is performed by using, as the image formation characteristic of the optical system, the degradation parameters that vary according to the position of the image, i.e. space-variant parameters. Therefore, the image restoration process can be performed in a more effective manner.

The configuration of a No. 1 image pickup system of the present embodiment includes any one of the No. 1-1 to No. 1-22 image pickup devices; and an external device, which performs an image restoration process on an image obtained by the image pickup element.

According to the configuration of the No. 1 image pickup system, the image restoration process is performed by the external device. Therefore, it is possible to reduce processing load within the image pickup device, resulting in lower costs and high-speed processing of the image pickup device.

According to the configuration of a No. 1-2 image pickup system of the present embodiment, in the No. 1-1 image pickup system, the image restoration process uses an image formation characteristic of the optical system.

According to the configuration of the No. 1-2 image pickup system, the image formation characteristic of the optical system is used to perform the image restoration process. Therefore, the image restoration process can be performed in a more effective manner.

According to the configuration of a No. 1-3 image pickup system of the present embodiment, in the No. 1-1 or 1-2 image pickup system, as for the image restoration process, a restored image executes a process represented by the following differential equation:

$$f(x,y)=g(x,y)+a_1(x,y) \cdot g'(x,y)+ \ldots +a_n(x,y) \cdot g^{(n)}(x,y)$$

where
f: the restored image
g: an observation image
$a_1, a_2, \ldots, a_n$: degradation parameters, and
$g^{(n)}$: nth-order differentiation for the observation image.

According to the No. 1-3 configuration of the image pickup system, filtering is performed by using, as the image formation characteristic of the optical system, the degradation parameters that vary according to the position of the image, i.e. space-variant parameters. Therefore, the image restoration process can be performed in a more effective manner.

According to the configuration of a No. 1-4 image pickup system of the present embodiment, the image pickup device and the external device each have a communication means; and an image obtained by the image pickup element is transmitted to the external device via the communication means.

According to the configuration of the No. 1-4 image pickup system, the image obtained by the image pickup element can be easily offered to the external device. Moreover, it is possible to reduce the storage capacity and throughput of the image pickup device.

According to a No. 2-1 configuration of an optical device of the present embodiment, in an optical device that forms an image of an object on an image pickup element and executes an image restoration process on the image obtained by the image pickup element, PSFs in at least two spots in an image-side predetermined region are substantially equal to each other.

The following describes the reason why the No. 2-1 configuration of the optical device is employed and an operation thereof.

In the optical device, an image of an object is formed by an optical system. At this time, according to the position of the object, the position of the formed image varies. When a plurality of objects is positioned differently, the image of each object too is positioned differently. Suppose that a certain object is used as a reference and brought into focus. In this case, before and behind the position (referred to as a reference image position, hereinafter) of the object's image, images of other objects are formed. At the reference image position, the object's image is obtained in focus. However, the objects' images before and behind the reference image position are out of focus (blurred)

The No. 2-1 configuration defines PSFs in at least two spots in an image-side predetermined region as being substantially equal to each other. In this case, the PSF (Point Spread Function) means a response characteristic to a point image called a point spread function or point image intensity distribution. The PSF means a characteristic representing the light intensity distribution of an image-side observation spot at a time when a point light source is disposed on a substance surface of a target optical system. When the PSF is calculated, the δ function is used as the point light source. The fact that PSFs are substantially equal to each other means that the shapes of the PSFs are substantially identical to each other. As for being defined as equal, a comparison of the full-width at half-maximum of each PSF and the like, or of widths at a predetermined ratio value of a peak value, or any other comparison is made.

According to the present embodiment, the PSFs in at least two spots in an image-side predetermined region are defined as being substantially equal to each other. Therefore, as for each of the images obtained between the two spots, almost the same image characteristics (the image quality, the degree of blur, and the like) can be obtained. Therefore, when an image restoration process is performed on the obtained image, image restoration is carried out in an effective manner.

For example, if a restoration process designed to similarly increase a MTF (Modulation Transfer Function) at each pixel of an image is used, the MTF can be similarly restored in the vicinity of each pixel at least between the two spots when the PSFs in at least the two spots in the image-side predetermined region are defined as being substantially equal to each other. That is, it is possible to sufficiently raise resolution at each of pixels making up an image. As a result, the sufficiently resolved image can be restored. Moreover, the image can be restored as an image with a wide focal depth. On the other hand, when the PSFs in at least the two spots in the image-side predetermined region are not substantially equal to each other, the image has a remarkable change in resolution even if a restoration process designed to similarly increase a MTF at each pixel of an image is performed.

According to a No. 2-2 configuration of an optical device of the present embodiment, in the No. 2-1 configuration, the predetermined region is a region of an optical-axis direction, and PSFs are substantially equal to each other in two spots in the optical-axis direction.

The following explains the reason why the No. 2-2 configuration of the optical device is employed and an operation thereof. According to the No. 2-2 configuration of the optical device, a direction of observing PSFs in two spots on the image side is defined. Since the PSFs in two spots in the optical-axis direction of the optical device are defined as being substantially equal to each other as described above, the image can be restored as an image with a wide focal depth when a restoration process is performed.

According to a No. 2-3 configuration of an optical device of the present embodiment, in the No. 2-1 or 2-2 configuration, the predetermined region is a region of a direction perpendicular to the optical axis, and PSFs are substantially equal to each other in two spots in an image-height direction.

The following explains the reason why the No. 2-3 configuration of the optical device is employed and an operation thereof. According to the No. 2-3 configuration of the optical device, a direction of observing PSFs in two spots on the image side is defined. Since the PSFs in two spots in the image-height direction (which is a direction perpendicular to the optical axis) of the optical device are defined as being substantially equal to each other as described above, a sufficient resolution can be obtained when a restoration process is performed.

According to a No. 2-4 configuration of an optical device of the present embodiment, in any one of the No. 2-1 to No. 2-3 configurations, a change in the width of the PSF between two spots is within ±30%.

The following explains the reason why the No. 2-4 configuration of the optical device is employed and an operation thereof. According to the No. 2-4 configuration of the optical device, a prerequisite for the PSFs in at least two spots in an image-side predetermined region to be substantially equal to each other is defined. The prerequisite is that a change in the width of the PSF is within ±30%. In this case, as for the width of the PSF, measurement takes place under the same conditions for the PSFs in at least two target spots. An image of an object is taken by the optical device having the above condition, and an image restoration process is performed on the obtained image. Therefore, it is possible to obtain a sufficiently resolved image. If the above condition is not satisfied, the image has a remarkable change in resolution even when an image restoration process is executed on the obtained image.

According to a No. 2-5 configuration of an optical device of the present embodiment, in the No. 2-4 configuration, the width of the PSF is a full-width at half-maximum.

The following explains the reason why the No. 2-5 configuration of the optical device is employed and an operation thereof. According to the No. 2-5 configuration of the optical device, a preferable form of the width of the PSF defined in the No. 2-4 configuration is defined. In this case, the full-width at half-maximum means the width of the PSF at a time when the value of the PSF is half the maximum peak value (maximum value) of the PSF.

A No. 2-1 configuration of an image pickup device of the present embodiment includes an image pickup element; an optical system that forms an image of an object on the image pickup element; and an image processing means for executing image processing on the image obtained by the image pickup element, wherein, in the optical system, PSFs in at least two spots in an image-side predetermined region are substantially equal to each other.

According to a No. 2-2 configuration of an image pickup device of the present embodiment, in the No. 2-1 configuration, PSFs are substantially equal to each other in two spots in the optical-axis direction.

According to a No. 2-3 configuration of an image pickup device of the present embodiment, in the No. 2-1 or 2-2 configuration, PSFs are substantially equal to each other in two spots in an image-height direction.

According to a No. 2-4 configuration of an image pickup device of the present embodiment, in any one of the No. 2-1 to No. 2-3 configurations, a change in the width of the PSF between two spots is within ±30%.

According to a No. 2-5 configuration of an image pickup device of the present embodiment, in any one of the No. 2-1 to No. 2-4 configurations, a change in the width of the PSF between two spots is within one-fourth of a pixel.

According to a No. 2-6 configuration of an image pickup device of the present embodiment, in the No. 2-4 or No. 2-5 configuration, the width of the PSF is a full-width at half-maximum.

The image pickup devices of the No. 2-1 to No. 2-4 and No. 2-6 configurations are realized as image pickup devices by adding the image pickup element and the image processing means, which executes image processing on the image obtained by the image pickup element, to the No. 2-1 to No. 2-5 configurations of the optical devices (optical systems) described above. According to the configurations of the 2-1 to No. 2-4 and No. 2-6 image pickup devices, an image of an object is formed by the optical system in which PSFs in at least two spots in an image-side predetermined region are substantially equal to each other. Since the object's image is taken by the image pickup element, it is possible to obtain the image (observation image) of the object. When an image restoration process is performed on the image, the image restoration process can be performed in an effective manner. That is, the sufficiently resolved image can be restored.

Moreover, in the image pickup device that employs the No. 2-5 configuration, as for the relationship with the size of a pixel of the image pickup element, a change in the width of the PSF between two spots is defined as being within one-fourth of a pixel. When the optical system satisfying the above condition is used, an image restoration process can be performed in an effective manner. That is, the sufficiently resolved image can be restored. Incidentally, for the width of the PSF, a full-width at half-maximum is preferably used.

According to a No. 2-7 configuration of an image pickup device of the present embodiment, in the No. 2-1 to No. 2-6 configurations, a spherical aberration characteristic of the optical system has a peak.

According to the No. 2-7 configuration, on the basis of the spherical aberration characteristic of the optical system, PSFs in at least two spots in an image-side predetermined region are defined as being substantially equal to each other. When the spherical aberration characteristic has a peak value, then the spherical aberration characteristic moves in both positive-side and negative-side directions. As the spherical aberration characteristic moves in both directions, light rays are dispersed in the vicinity of the location where the image pickup element is placed. Because such a characteristic is provided, the PSFs in at least the two spots in the image-side predetermined region can become substantially equal to each other.

According to a No. 2-8 configuration of an image pickup device of the present invention, in the No. 2-7 configuration, a spherical aberration characteristic of the optical system has two or more peak values.

The No. 2-8 configuration defines a condition that produces a better result in the No. 2-7 configuration. Since the spherical aberration characteristic has two or more peaks as described above, the spherical aberration characteristic moves at least two times in both positive-side and negative-side directions. Because such a characteristic is provided, it is possible to realize an optical system in which the PSFs in at least the two spots in the image-side predetermined region are substantially equal to each other.

According to a No. 2-9 configuration of an image pickup device of the present invention, in the No. 2-8 configuration, peaks of the spherical aberration characteristic are positioned on positive and negative sides.

The No. 2-9 configuration defines a condition that produces a better result in the No. 2-8 configuration. Since the peaks of the spherical aberration characteristic are positioned at both the positive and negative sides, it is possible to realize an optical system in which the PSFs in at least the two spots in the image-side predetermined region are substantially equal to each other.

According to a No. 2-10 configuration of an image pickup device of the present invention, in any one of the No. 2-1 to No. 2-9 configurations, the optical system includes a wave-front control element, which is designed to realize a PSF.

Since the wave-front control element is provided, it is possible to realize an optical system in which the PSFs in at least the two spots in the image-side predetermined region are substantially equal to each other.

According to a No. 2-11 configuration of an image pickup device of the present invention, in the No. 2-10 configuration, the wave-front control element designed to realize the PSF has an aspherical surface.

Since the wave-front control element has an aspherical surface, it is possible to realize an optical system in which the PSFs in at least the two spots in the image-side predetermined region are substantially equal to each other. For the wave-front control element having an aspherical surface, the following can be employed: an aspherical lens, an aspherical plate, a multifocal lens having an aspherical surface in any one of the regions thereof, or the like.

According to a No. 2-12 configuration of an image pickup device of the present invention, in the No. 2-10 configuration, the wave-front control element designed to realize the PSF is a phase plate.

Since a phase plate is used as the wave-front control element, it is possible to realize an optical system in which the PSFs in at least the two spots in the image-side predetermined region are substantially equal to each other.

According to a No. 2-13 configuration of an image pickup device of the present invention, in the No. 2-10 configuration, the wave-front control element designed to realize the PSF is a lens having a plurality of curvatures on one surface.

Since a lens having a plurality of curvatures on one surface is used as the wave-front control element, it is possible to realize an optical system in which the PSFs in at least the two spots in the image-side predetermined region are substantially equal to each other. As one curvature, those having a predetermined radius of curvature, such as spherical shapes, as well as curvatures obtained by predetermined calculation formulas as in the case of aspherical shapes, are contained.

According to a No. 2-14 configuration of an image pickup device of the present invention, in the No. 2-10 configuration, the wave-front control element designed to realize the PSF is a lens having different curvatures in central and peripheral portions.

Since a lens having different curvatures in central and peripheral portions is used as the wave-front control element, it is possible to realize an optical system in which the PSFs in at least the two spots in the image-side predetermined region are substantially equal to each other.

According to a No. 2-15 configuration of an image pickup device of the present invention, in the No. 2-13 or 2-14 configuration, the wave-front control element designed to realize the PSF is a lens having three curvatures on one surface.

Since a lens having three curvatures on one surface is used as the wave-front control element, it is possible to realize an optical system in which the PSFs in at least the two spots in the image-side predetermined region are substantially equal to each other.

According to a No. 2-16 configuration of an image pickup device of the present invention, in any one of the No. 2-10 to No. 2-15 configurations, the wave-front control element designed to realize the PSF is made of birefringent crystal.

Since the wave-front control element is made of birefringent crystal, it is possible to realize an optical system in which the PSFs in at least the two spots in the image-side predetermined region are substantially equal to each other.

According to a No. 2-17 configuration of an image pickup device of the present invention, in any one of the No. 2-10 to No. 2-16 configurations, the wave-front control element designed to realize the PSF is detachable.

According to the No. 2-17 configuration, the wave-front control element can be removed from the optical system, or replaced with another optical element. It is possible to realize an optical system having the PSFs in at least the two spots in the image-side predetermined region and another optical system in one device, as well as to change to a desired optical characteristic when necessary.

According to a No. 2-18 configuration of an image pickup device of the present invention, in any one of the No. 2-1 to 2-17 configurations, the image processing executed by the image processing means includes an image restoration process on an image obtained by the image pickup element.

According to the No. 2-18 configuration, it is possible to execute an image taking process and an image restoration process on an image obtained by the image taking process by using only one image pickup device.

According to a No. 2-19 configuration of an image pickup device of the present invention, in the No. 2-18 configuration, the image restoration process uses an image formation characteristic of the optical system.

According to the No. 2-19 configuration, the image restoration process is performed with the use of an image formation characteristic of the optical system. Therefore, the image restoration process can be performed in a more effective manner.

According to a No. 2-20 configuration of an image pickup device of the present invention, in the No. 2-19 configuration, as for the image restoration process, a restored image executes a process represented by the following differential equation:

$$f(x,y)=g(x,y)+a_1(x,y) \cdot g'(x,y)++y) \cdot g^{(n)}(x,y)$$

where
f: the restored image
g: the image
$a_1, a_2, \ldots, a_n$: degradation parameters, and
$g^{(n)}$: nth-order differentiation for the image.

According to the No. 2-20 configuration, filtering is performed by using, as the image formation characteristic of the optical system, the degradation parameters that vary according to the position of the image, i.e. space-variant parameters. Therefore, the image restoration process can be performed in a more effective manner.

A No. 2-1 configuration of an image pickup system of the present invention includes any one of the No. 2-1 to No. 2-20 image pickup devices; and an external device, which performs an image restoration process on an image obtained by the image pickup element.

According to the configuration of the No. 2-1 image pickup system, the image restoration process is performed by the external device. Therefore, it is possible to reduce processing load within the image pickup device, resulting in lower costs and high-speed processing of the image pickup device.

According to a No. 2-2 configuration of an image pickup system of the present invention, in the No. 2-1 configuration, the image restoration process uses an image formation characteristic of the optical system.

According to the configuration of the No. 2-2 image pickup system, the image formation characteristic of the optical system is used to perform the image restoration process. Therefore, the image restoration process can be performed in a more effective manner.

According to a No. 2-3 configuration of an image pickup system of the present invention, in the No. 2-1 or 2-2 configuration, as for the image restoration process, a restored image executes a process represented by the following differential equation:

$$f(x,y)=g(x,y)+a_1(x,y) \cdot g'(x,y)+ \ldots +a_n(x,y) \cdot g^{(n)}(x,y)$$

where
 f: the restored image
 g: the image
 $a_1, a_2, \ldots, a_n$: degradation parameters, and
 $g^{(n)}$: nth-order differentiation for the image.

According to the No. 2-3 configuration of the image pickup system, filtering is performed by using, as the image formation characteristic of the optical system, the degradation parameters that vary according to the position of the image, i.e. space-variant parameters. Therefore, the image restoration process can be performed in a more effective manner.

According to a No. 2-4 configuration of an image pickup system of the present invention, in any one of the No. 2-1 to No. 2-3 configurations, the image pickup device and the external device each have a communication means; and an image obtained by the image pickup element is transmitted to the external device via the communication means.

According to the configuration of the No. 2-4 image pickup system, the image obtained by the image pickup element can be easily offered to the external device. Moreover, it is possible to reduce the storage capacity and throughput of the image pickup device.

According to a No. 3-1 configuration of an optical device of the present embodiment, in an optical device that forms an image of an object on an image pickup element and executes an image restoration process on the image obtained by the image pickup element, LSFs in at least two spots in an image-side predetermined region are substantially equal to each other.

The following explains the reason why the No. 3-1 configuration of the optical device is employed and an operation thereof.

In the optical device, an image of an object is formed by an optical system. At this time, according to the position of the object, the position of the formed image varies. When a plurality of objects is positioned differently, the image of each object too is positioned differently. Suppose that a certain object is used as a reference and brought into focus. In this case, before and behind the position (referred to as a reference image position, hereinafter) of the object's image, images of other objects are formed. At the reference image position, the object's image is obtained in focus. However, the objects' images before and behind the reference image position are out of focus (blurred).

The No. 3-1 configuration defines LSFs in at least two spots in an image-side predetermined region as being substantially equal to each other. In this case, the LSF (Line Spread Function) means a response characteristic to a line input called a line spread function or line intensity distribution. The LSF of the present embodiment means a characteristic representing the light intensity distribution of an image-side observation spot at a time when a line light source is disposed on a substance surface of a target optical system. When the LSF is calculated, the convolution of a response input to a PSF (Point Spread Function), i.e. a point image called a point spread function or point intensity distribution, is carried out to calculate the LSF.

The fact that LSFs are substantially equal to each other means that the shapes of the LSFs are substantially identical to each other. As for being defined as equal, a comparison of the full-width at half-maximum of each LSF and the like, or of widths at a predetermined ratio value of a peak value, or any other comparison is made.

According to the present embodiment, the LSFs in at least two spots in an image-side predetermined region are defined as being substantially equal to each other. Therefore, as for each of the images obtained between the two spots, almost the same image characteristics (the image quality, the degree of blur, and the like) can be obtained. Therefore, when an image restoration process is performed on the obtained image, image restoration is carried out in an effective manner.

For example, if a restoration process designed to similarly increase a MTF (Modulation Transfer Function) at each pixel of an image is used, the MTF can be similarly restored in the vicinity of each pixel at least between the two spots when the LSFs in at least the two spots in the image-side predetermined region are defined as being substantially equal to each other. That is, it is possible to sufficiently raise resolution at each of pixels making up an image. As a result, the sufficiently resolved image can be restored. Moreover, the image can be restored as an image with a wide focal depth. On the other hand, when the LSFs in at least the two spots in the image-side predetermined region are not substantially equal to each other, the image has a remarkable change in resolution even if a restoration process designed to similarly increase a MTF at each pixel of an image is performed.

According to a No. 3-2 configuration of an optical device of the present embodiment, in the No. 3-1 configuration, the predetermined region is a region of an optical-axis direction, and the LSFs are substantially equal to each other in two spots in the optical-axis direction.

The following explains the reason why the No. 3-2 configuration of the optical device is employed and an operation thereof. According to the No. 3-2 configuration of the optical device, a direction of observing LSFs in two spots on the image side is defined. Since the LSFs in two spots in the optical-axis direction of the optical device are defined as being substantially equal to each other as described above, the image can be restored as an image with a wide focal depth when a restoration process is performed.

According to a No. 3-3 configuration of an optical device of the present embodiment, in the No. 3-1 or 3-2 configuration, the predetermined region is a region of a direction perpendicular to the optical axis, and the LSFs are substantially equal to each other in two spots in an image-height direction.

The following explains the reason why the No. 3-3 configuration of the optical device is employed and an operation thereof. According to the No. 3-3 configuration of the optical device, a direction of observing LSFs in two spots on the image side is defined. Since the LSFs in two spots in the image-height direction (which is a direction perpendicular to the optical axis) of the optical device are defined as being substantially equal to each other as described above, a sufficient resolution can be obtained when a restoration process is performed.

According to a No. 3-4 configuration of an optical device of the present embodiment, in any one of the No. 3-1 to No. 3-3 configurations, a change in the width of the LSF between two spots is within ±50%.

The following explains the reason why the No. 3-4 configuration of the optical device is employed and an operation thereof. According to the No. 3-4 configuration of the optical device, a prerequisite for the LSFs in at least two spots in an image-side predetermined region to be substantially equal to each other is defined. The prerequisite is that a change in the width of the LSF is within ±50%. In this case, as for the width of the LSF, measurement takes place under the same conditions for the LSFs in at least two target spots. An image of an object is taken by the optical device having the above condition, and an image restoration process is performed on the obtained image. Therefore, it is possible to obtain a sufficiently resolved image. If the above condition is not satisfied, the image has a remarkable change in resolution even when an image restoration process is executed on the obtained image.

According to a No. 3-5 configuration of an optical device of the present embodiment, in the No. 3-4 configuration, the width of the LSF is a full-width at half-maximum.

The following explains the reason why the No. 3-5 configuration of the optical device is employed and an operation thereof. According to the No. 3-5 configuration of the optical device, a preferable form of the width of the LSF defined in the No. 3-4 configuration is defined. In this case, the full-width at half-maximum means the width of the LSF at a time when the value of the LSF is half the maximum peak value (maximum value) of the LSF.

A No. 3-1 configuration of an image pickup device of the present embodiment includes an image pickup element; an optical system that forms an image of an object on the image pickup element; and an image processing means for executing image processing on the image obtained by the image pickup element, wherein, in the optical system, LSFs in at least two spots in an image-side predetermined region are substantially equal to each other.

According to a No. 3-2 configuration of an image pickup device of the present embodiment, in the No. 3-1 configuration, LSFs are substantially equal to each other in two spots in the optical-axis direction.

According to a No. 3-3 configuration of an image pickup device of the present embodiment, in the No. 3-1 or 3-2 configuration, LSFs are substantially equal to each other in two spots in an image-height direction.

According to a No. 3-4 configuration of an image pickup device of the present embodiment, in any one of the No. 3-1 to No. 3-3 configurations, a change in the width of the LSF between two spots is within ±50%.

According to a No. 3-5 configuration of an image pickup device of the present embodiment, in any one of the No. 3-1 to No. 3-4 configurations, a change in the width of the LSF between two spots is within one pixel.

According to a No. 3-6 configuration of an image pickup device of the present embodiment, in the No. 3-4 or No. 3-5 configuration, the width of the LSF is a full-width at half-maximum.

The image pickup devices of the No. 3-1 to No. 3-4 and No. 3-6 configurations are realized as image pickup devices by adding the image pickup element and the image processing means, which executes image processing on the image obtained by the image pickup element, to the No. 3-1 to No. 3-5 configurations of the optical devices (optical systems) described above. According to the configurations of the 3-1 to No. 3-4 and No. 3-6 image pickup devices, an image of an object is formed by the optical system in which LSFs in at least two spots in an image-side predetermined region are substantially equal to each other. Since the object's image is taken by the image pickup element, it is possible to obtain the image (observation image) of the object. When an image restoration process is performed on the image, the image restoration process can be performed in an effective manner. That is, the sufficiently resolved image can be restored.

Moreover, in the image pickup device that employs the No. 3-5 configuration, as for the relationship with the size of a pixel of the image pickup element, a change in the width of the LSF between two spots is defined as being within one pixel. When the optical system satisfying the above condition is used, an image restoration process can be performed in an efficient manner. That is, the sufficiently resolved image can be restored. Incidentally, for the width of the LSF, a full-width at half-maximum is preferably used.

According to a No. 3-7 configuration of an image pickup device of the present embodiment, in the No. 3-1 to No. 3-6 configurations, a spherical aberration characteristic of the optical system has a peak.

According to the No. 3-7 configuration, on the basis of the spherical aberration characteristic of the optical system, LSFs in at least two spots in an image-side predetermined region are defined as being substantially equal to each other. When the spherical aberration characteristic has a peak value, then the spherical aberration characteristic moves in both positive-side and negative-side directions. As the spherical aberration characteristic moves in both directions, light rays are dispersed in the vicinity of the location where the image pickup element is placed. Because such a characteristic is provided, the LSFs in at least the two spots in the image-side predetermined region can become substantially equal to each other.

According to a No. 3-8 configuration of an image pickup device of the present invention, in the No. 3-7 configuration, a spherical aberration characteristic of the optical system has two or more peak values.

The No. 3-8 configuration defines a condition that produces a better result in the No. 3-7 configuration. Since the spherical aberration characteristic has two or more peak values as described above, the spherical aberration characteristic moves at least two times in both positive-side and negative-side directions. Because such a characteristic is provided, it is possible to realize an optical system in which the LSFs in at least the two spots in the image-side predetermined region are substantially equal to each other.

According to a No. 3-9 configuration of an image pickup device of the present invention, in the No. 3-8 configuration, peaks of the spherical aberration characteristic are positioned on positive and negative sides.

The No. 3-9 configuration defines a condition that produces a better result in the No. 3-8 configuration. Since the peak values of the spherical aberration characteristic are positioned at both the positive and negative sides, it is possible to realize an optical system in which the LSFs in at least the two spots in the image-side predetermined region are substantially equal to each other.

According to a No. 3-10 configuration of an image pickup device of the present invention, in any one of the No. 3-1 to No. 3-9 configurations, the optical system includes a wave-front control element, which is designed to realize a LSF.

Since the wave-front control element is provided, it is possible to realize an optical system in which the LSFs in at least the two spots in the image-side predetermined region are substantially equal to each other.

According to a No. 3-11 configuration of an image pickup device of the present invention, in the No. 3-10 configuration, the wave-front control element designed to realize the LSF has an aspherical surface.

Since the wave-front control element has an aspherical surface, it is possible to realize an optical system in which the LSFs in at least the two spots in the image-side predetermined region are substantially equal to each other. For the wave-front control element having an aspherical surface, the following can be employed: an aspherical lens, an aspherical plate, a multifocal lens having an aspherical surface in any one of the regions thereof, or the like.

According to a No. 3-12 configuration of an image pickup device of the present invention, in the No. 3-10 configuration, the wave-front control element designed to realize the LSF is a phase plate.

Since a phase plate is used as the wave-front control element, it is possible to realize an optical system in which the LSFs in at least the two spots in the image-side predetermined region are substantially equal to each other.

According to a No. 3-13 configuration of an image pickup device of the present invention, in the No. 3-10 configuration, the wave-front control element designed to realize the LSF is a lens having a plurality of curvatures on one surface.

Since a lens having a plurality of curvatures on one surface is used as the wave-front control element, it is possible to realize an optical system in which the LSFs in at least the two spots in the image-side predetermined region are substantially equal to each other. As one curvature, those having a predetermined radius of curvature, such as spherical shapes, as well as curvatures obtained by predetermined calculation formulas as in the case of aspherical shapes, are contained.

According to a No. 3-14 configuration of an image pickup device of the present invention, in the No. 3-10 configuration, the wave-front control element designed to realize the LSF is a lens having different curvatures in central and peripheral portions.

Since a lens having different curvatures in central and peripheral portions is used as the wave-front control element, it is possible to realize an optical system in which the LSFs in at least the two spots in the image-side predetermined region are substantially equal to each other.

According to a No. 3-15 configuration of an image pickup device of the present invention, in anyone of the No. 3-10 to No. 3-14 configurations, the wave-front control element designed to realize the LSF is made of birefringent crystal.

Since the wave-front control element is made of birefringent crystal, it is possible to realize an optical system in which the LSFs in at least the two spots in the image-side predetermined region are substantially equal to each other.

According to a No. 3-16 configuration of an image pickup device of the present invention, in any one of the No. 3-10 to No. 3-15 configurations, the wave-front control element designed to realize the LSF is detachable.

According to the No. 3-16 configuration, the wave-front control element can be removed from the optical system, or replaced with another optical element. It is possible to realize an optical system having the LSFs in at least the two spots in the image-side predetermined region and another optical system in one device, as well as to change to a desired optical characteristic when necessary.

According to a No. 3-17 configuration of an image pickup device of the present invention, in anyone of the No. 3-1 to 3-16 configurations, the image processing executed by the image processing means includes an image restoration process on an image obtained by the image pickup element.

According to the No. 3-17 configuration, it is possible to execute an mage taking process and an image restoration process on an image obtained by the image taking process by using only one image pickup device.

According to a No. 3-18 configuration of an image pickup device of the present invention, in the No. 3-17 configuration, the image restoration process uses an image formation characteristic of the optical system.

According to the No. 3-18 configuration, the image restoration process is performed with the use of an image formation characteristic of the optical system. Therefore, the image restoration process can be performed in a more effective manner.

According to a No. 3-19 configuration of an image pickup device of the present invention, in the No. 3-18 configuration, as for the image restoration process, a restored image executes a process represented by the following differential equation:

$$f(x,y) = g(x,y) + a_1(x,y) \cdot g'(x,y) + \ldots + a_n(x,y) \cdot g^{(n)}(x,y)$$

where
f: the restored image
g: an image
$a_1, a_2, \ldots, a_n$: degradation parameters, and
$g^{(n)}$: nth-order differentiation for the image.

According to the No. 3-19 configuration, filtering is performed by using, as the image formation characteristic of the optical system, the degradation parameters that vary according to the position of the image, i.e. space-variant parameters. Therefore, the image restoration process can be performed in a more effective manner.

A No. 3-1 configuration of an image pickup system of the present invention includes any one of the No. 3-1 to No. 3-19 image pickup devices; and an external device, which performs an image restoration process on an image obtained by the image pickup element.

According to the configuration of the No. 3-1 image pickup system, the image restoration process is performed by the external device. Therefore, it is possible to reduce processing load within the image pickup device, resulting in lower costs and high-speed processing of the image pickup device.

According to a No. 3-2 configuration of an image pickup system of the present invention, in the No. 3-1 configuration, the image restoration process uses an image formation characteristic of the optical system.

According to the configuration of the No. 3-2 image pickup system, the image formation characteristic of the optical system is used to perform the image restoration process. Therefore, the image restoration process can be performed in a more effective manner.

According to a No. 3-3 configuration of an image pickup system of the present invention, in the No. 3-1 or 3-2 configuration, as for the image restoration process, a restored image executes a process represented by the following differential equation:

$$f(x,y) = g(x,y) + a_1(x,y) \cdot g'(x,y) + \ldots + a_n(x,y) \cdot g^{(n)}(x,y)$$

where
f: the restored image
g: an image
$a_1, a_2, \ldots, a_n$: degradation parameters, and
$g^{(n)}$: nth-order differentiation for the image.

According to the No. 3-3 configuration of the image pickup system, filtering is performed by using, as the image formation characteristic of the optical system, the degradation parameters that vary according to the position of the image, i.e. space-variant parameters. Therefore, the image restoration process can be performed in a more effective manner.

According to a No. 3-4 configuration of an image pickup system of the present invention, in any one of the No. 3-1 to No. 3-3 configurations, the image pickup device and the external device each have a communication means; and an image obtained by the image pickup element is transmitted to the external device via the communication means.

According to the configuration of the No. 3-4 image pickup system, the image obtained by the image pickup element can be easily offered to the external device. Moreover, it is possible to reduce the storage capacity and throughput of the image pickup device.

With reference to FIGS. 2 to 21, an optical system used in the No. 1 image pickup device of the present embodiment will be described.

Figure 2:
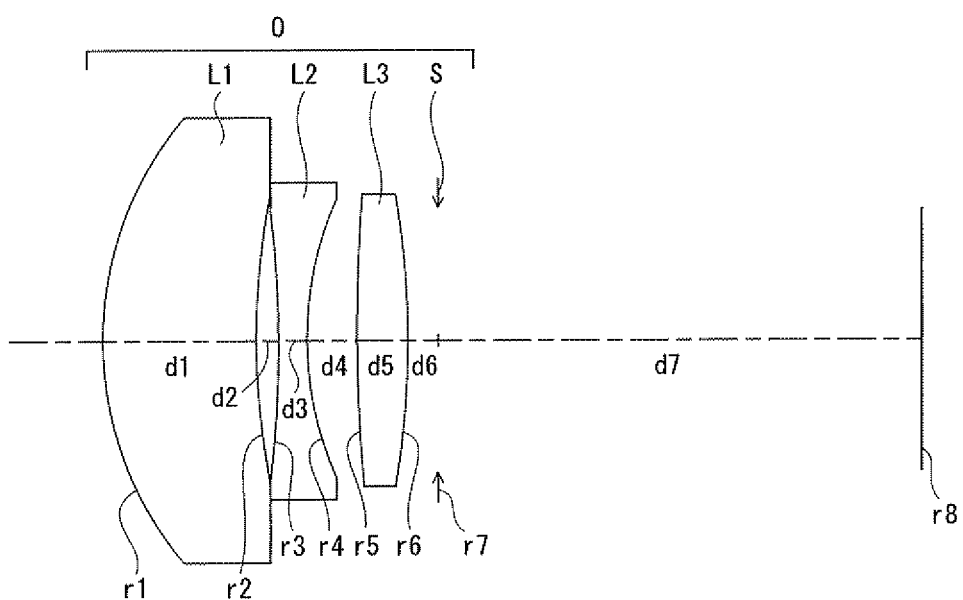
FIG. 2 is a cross-sectional view of an optical system of Comparative Example 1-1 and of Examples 1-1 to 1-3 of the present invention expanded and taken along an optical axis.

FIG. 2 is a schematic cross-sectional view of an optical system expanded and taken along an optical axis, which is used in Comparative Example 1-1 and Examples 1-1 to 1-4 of the present embodiment. In Comparative Example 1-1 and Examples 1-1 to 1-4, as shown in the diagrams, third lenses L3 are different in detail.

Comparative example 1-1 is shown as an example to explain Examples 1-1 to 1-4; both surfaces of a third lens L3 are in a spherical shape. By contrast, in Example 1-1, six surfaces of a third lens L3 are in an aspherical shape. In Examples 1-2 and 1-3, five surfaces of a third lens L3 are bifocal lenses. In Example 1-4, five surfaces of a third lens L3 are trifocal lenses. In that manner, the configurations are different.

In Comparative Example 1-1, an optical system O shown in FIG. 2 includes, from the object side to the emission side, a first lens L1, a second lens L2, a third lens L3, and an aperture diaphragm S in that order. In the diagram, on an image pickup plane indicated by r8, an image pickup element such as CCD is placed.

The first lens L1 is a single lens of a positive meniscus shape with a convex surface facing the object side. The second lens L2 is a single lens of a biconcave shape having negative refractive power. The third lens L3 is a single lens of a biconvex shape having positive refractive power.

In the present comparative example, when an image pickup element placed on the image pickup plane is designed, suppose that the maximum number of pixels in the vertical or horizontal direction is 4,000, and the pixel pitch 1.7 (μm). Incidentally, the same is true for Examples.

Numerical data of the above Comparative Example 1-1 are shown below. In the numerical data, r represents the radius of curvature of each lens surface (optical surface); d represents a distance between lens surfaces (optical surfaces); nd represents the refractive index of d-line of each lens (optical medium); Vd represents the Abbe number of each lens (optical medium); and F represents the focal distance. Incidentally, the symbol "∞", which is recorded as to the radius of curvature, means infinity.

In data set, the focal distance of the optical system and the F-number are shown. The focal distance is measured in millimeters (mm). What is shown here is the F-number that was used for the present measurement at the time of opening.

The depth characteristics represent, at a time when the MTFs are 20% and 10% at an evaluation spatial frequency of 84 (lp/mm), the width of each MTF. The depth characteristics are measured in millimeters (mm).

Comparative Example 1-1

| | Unit [mm] | | | | |
|---|---|---|---|---|---|
| | Surface Data | | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6 | −6.5817 | 0.2367 | | | |
| 7 (Stop) | ∞ | 7.7389 | | | |
| 8 (Image Plane) | ∞ | | | | |

-continued

| Unit [mm] |  |
|---|---|
| Data Set | |
| Focal Distance | 9.9902 |
| F-number | 3.5 |
| Depth characteristics (evaluation spatial frequency: 84 [lp/mm]) | |
| | Depth |
| MTF 20% | 0.09 |
| MTF 10% | 0.11 |

Figure 3:
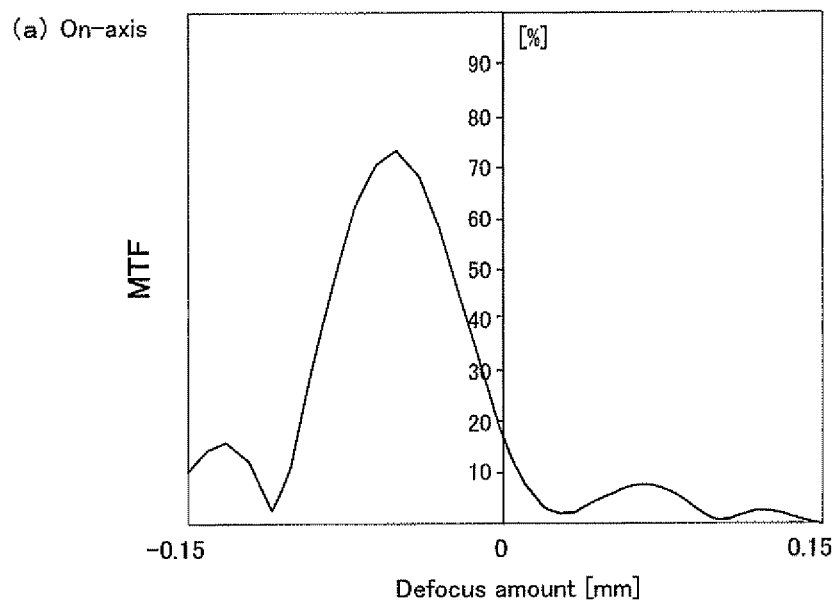
FIG. 3 is a diagram showing a MTF characteristic of Comparative Example 1-1.
Figure 4:
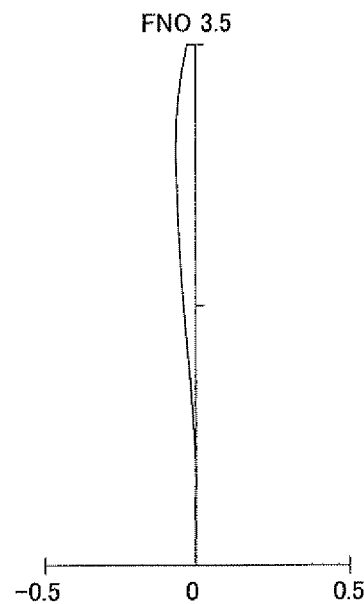
FIG. 4 is a diagram showing a spherical aberration characteristic of Comparative Example 1-1.

FIG. 3 is a diagram showing a MTF characteristic at an evaluation spatial frequency of 84 (lp/mm) in Comparative Example 1-1. FIG. 3 shows the MTF (Unit: %) relative to the on axis defocus amount (Unit: millimeters (mm)). The MTF characteristic of Comparative Example 1-1 is so shaped as to have a sharp peak of about 70% around −0.05 (mm) relative to a reference position. FIG. 4 is a diagram showing a spherical aberration characteristic in Comparative Example 1. In this case, a spherical aberration characteristic at a wavelength of 546.07 (nm) is shown.

Then, the following describes a numerical example and various characteristics in Example 1-1. In Example 1-1, six surfaces of the third lens L3 shown in FIG. 2 are in an aspherical shape, thereby realizing a substantially constant MTF at the location where the image pickup element is placed and in predetermined distances before and behind the location. The meaning of each number and various design criteria are the same as those described in Comparative Example 1-1. In surface data, asterisk "*" marked on the right side of a surface number indicates that a lens surface thereof is in an aspherical shape.

A pair-wise comparison shown in Depth Characteristic shows the ratio of the width of each MTF when the MTF is 20% or 10% with respect to Comparative Example 1. Moreover, the conversion F-number represents an F-number required to realize the width of the MTF of the present Example 1-1 in Comparative Example 1-1.

If x represents an optical axis on which the direction of light travel is positive, and y represents a direction perpendicular to the optical axis, the aspherical shape is represented by the following equation.

$$x = (y^2/r) / [1 + \{1-(K+1)(y/r)^2\}^{1/2}] + A2y^2 + A4y^4 + A6y^6 + A8y^8 + A10y^{10} + \ldots$$

where r is the paraxial radius of curvature; K is the constant of the cone; and A2 to A10 are second- to tenth-order aspherical coefficients, respectively. Incidentally, symbol "E" indicates that the subsequent value is an exponent to base 10. For example, "1.0E-5" means "1.0)(10⁻⁵".

Numerical Example 1-1

| | Unit [mm] | | | | |
|---|---|---|---|---|---|
| | Surface Data | | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |

-continued

| | Unit [mm] | | | | |
|---|---|---|---|---|---|
| 4 | 3.2544 | 0.3997 | | | |
| 5 | 10.7443 | 0.4438 | 1.81067 | 41.00 | 5.0931 |
| 6* | −6.5817 | 0.2367 | | | |
| 7 (Stop) | ∞ | 7.7389 | | | |
| 8 (Image plane) | ∞ | | | | |

Aspheric Data
6th Surface

K = 0
A2 = −2.01E−12
A4 = 5.98E−03
A6 = −2.08E−02
A8 = 2.19E−02
A10 = −7.06E−03

Data Set

| Focal Distance | 9.9902 |
|---|---|
| F-number | 3.5 |

Depth characteristics
(evaluation spatial frequency: 84 [lp/mm])

| | Depth | Pair-wise comparison [%] | Conversion F-number |
|---|---|---|---|
| MTF 20% | 0.09 | 182 | 6.4 |
| MTF 10% | 0.11 | 223 | 7.8 |

Figure 5:
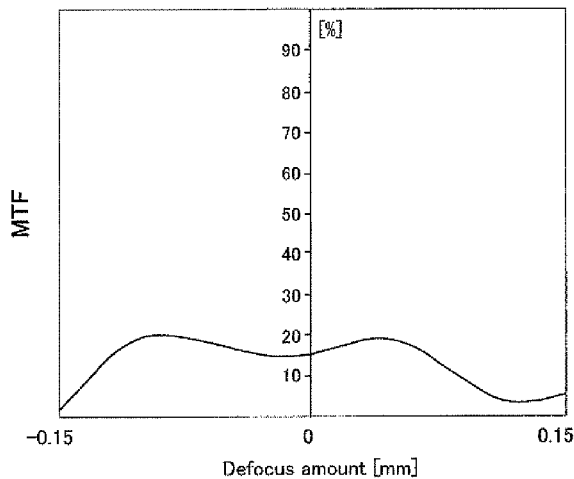
FIG. 5 is a diagram showing MTF characteristics of an optical system of Example 1-1 of the present invention.
Figure 5:
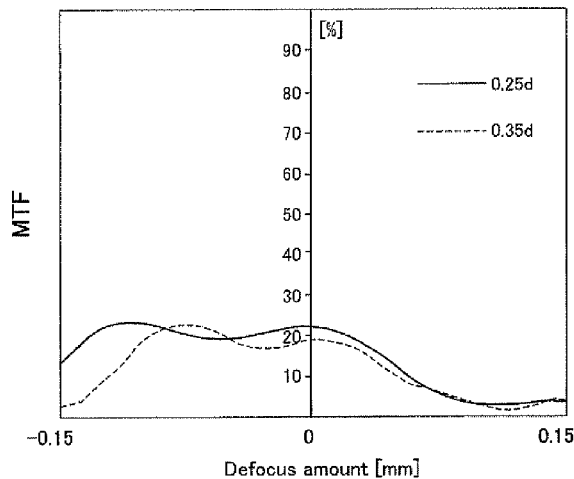
Figure 5:
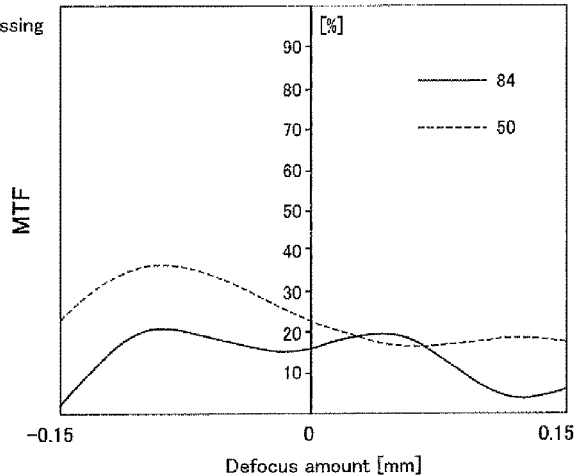

FIG. 5 is a diagram showing a MTF characteristic in Example 1-1. FIG. 5(a) shows an on axis MTF characteristic. FIG. 5(b) shows off-axial MTF characteristics. In this case, two off-axial MTF characteristics, 0.25 d and 0.35 d (0.5 d: maximum height of the image pickup plane), are shown. Incidentally, in both cases shown in FIGS. 5(a) and 5(b), the evaluation spatial frequency is 84 (lp/mm).

FIG. 5(c) shows MTF characteristics at a time when the evaluation spatial frequencies are different. In this case, two MTF characteristics are shown: the MTF characteristic of 84 (lp/mm), which is the same as in FIG. 5(a); and the MTF characteristic of 50 (lp/mm).

It is clear from a comparison of the on-axis MTF characteristic shown in FIG. 5(a) with the MTF characteristic of Comparative Example 1-1 shown in FIG. 3 that the on-axis MTF characteristic is able to realize a substantially constant MTF at locations where the defocus amount is zero, i.e. the location where the image pickup element is placed and within a predetermined distance range before and behind the location, even though the MTF is a low value.

With the MTF having such a characteristic (curve), by performing various image restoration processes on an obtained image, it is possible to increase the MTF evenly on an image where the defocus amount takes place in a predetermined range. Thus, a sufficiently resolved image can be restored. An image with a deep focal depth can be realized. Incidentally, the location where the defocus amount becomes zero, i.e. the location where the image pickup element is placed, may be set to an appropriate location with the shapes of various MTF characteristics taken into account.

It is clear from FIG. 5(b) that there is a substantially constant MTF characteristic even in the off-axial case as in the on-axis case. As shown in FIG. 5(c), in a range where contrast does not become zero in the MTF characteristic of 84 (lp/mm), the MTF characteristic of 84 (lp/mm) and the MTF characteristic of 50 (lp/mm) cross each other. Under such a situation, it can be said that the substantially constant MTF characteristic of 84 (lp/mm) is guaranteed. Incidentally, the location where the contrast is zero is a position where white and black is reversed and where the MTF becomes zero in the MTF of an evaluation spatial frequency of interest.

Figure 6:
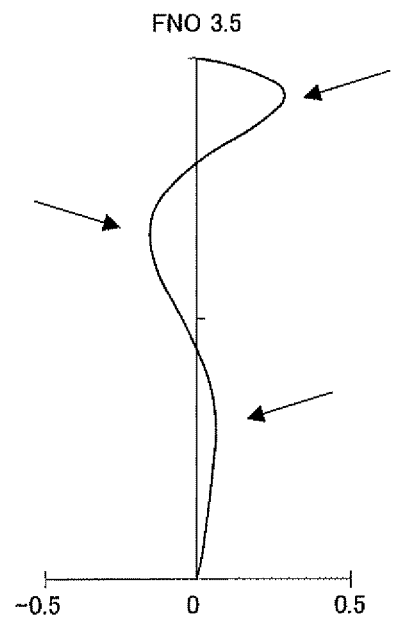
FIG. 6 is a diagram showing a spherical aberration characteristic of Example 1-1 of the present invention.

FIG. 6 is a diagram showing a spherical aberration characteristic in Example 1-1. What is shown here is a spherical aberration characteristic at a wavelength of 546.07 (nm). As for the spherical aberration characteristic here, when being compared with the spherical aberration characteristic shown in FIG. 4, a curve representing the aberration fluctuates in the positive and negative sides. As indicated by arrows in FIG. 6, the aberration curve has three peaks. Before and behind the peaks, the aberration occurrence direction extends from the positive to the negative side, or from the negative to the positive side.

In that manner, the spherical aberration characteristic moves in both the positive- and negative-side directions. Therefore, in the vicinity of the location where the defocus amount is zero, it is possible to realize a substantially constant MTF. It is preferred that a plurality of peaks of the spherical aberration characteristic be formed on both the positive and the negative sides as in Example 1-1. Incidentally, it is possible to make a contribution to having a substantially constant MTF just by providing the spherical aberration characteristic with two or more peaks.

Then, the following describes a numerical example and various characteristics in Example 1-2. In Example 1-2, five surfaces of the third lens L3 shown in FIG. 2 are bifocal lenses, thereby realizing a substantially constant MTF at the location where the image pickup element is placed and in predetermined distances before and behind the location. The meaning of each number and various design criteria are the same as those described in Comparative Example 1-1 and Example 1-1.

Figure 7:
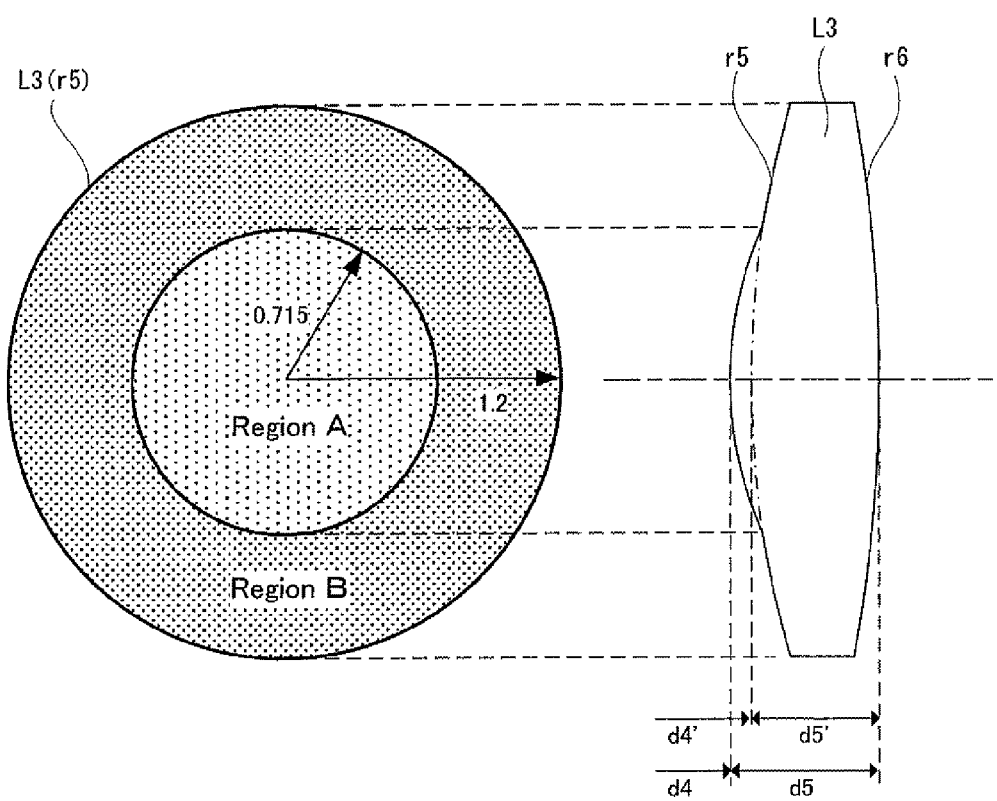
FIG. 7 is a schematic diagram showing the configuration of a bifocal lens used in Example 1-2 of the present invention.

FIG. 7 is a front view of a bifocal lens, which is applied to five surfaces of the third lens L3, as well as a cross-sectional view of the lens taken along the optical axis. The drawing here is a schematic diagram illustrating a multi-focal lens; the shape thereof is different from the shape represented by actual numbers.

As shown in FIG. 7, on the bifocal lens, a region A is provided at the center thereof, and a region B is so provided as to surround the region A. In the present example, the regions A and B both have a spherical shape. The regions A and B are so formed as to have no difference in level therebetween and change seamlessly. In the following numerical example, the radius of each region, curvatures, and the distances d4 and d5 between lens surfaces (optical surfaces) are shown. In this case, the surface distances d4 and d5 of the region B represent, as shown in FIG. 7, the surface distances (d4' and d5' in the diagram) at a location where a virtual surface formed by the lens surface of the region B crosses the optical axis.

Numerical Example 1-2

| | Unit [mm] | | | | |
|---|---|---|---|---|---|
| | Surface Data | | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Bifocal) | 10.7443 | 0.4438 | 1.81067 | 41.00 | 8.1189 |

-continued

Unit [mm]

| | | |
|---|---|---|
| 6 | −6.5817 | 0.2367 |
| 7(Stop) | ∞ | 7.7389 |
| 8(Image plane) | ∞ | |

Bifocal lens data (Surface No. 5)

| | Radius | curvatures | d4 | d5 |
|---|---|---|---|---|
| Region A | 0.715 | 10.7443 | 0.3997 | 0.4438 |
| Region B | 1.2 | 11.0443 | 0.4003 | 0.4432 |

Data Set

| | |
|---|---|
| Focal length | 9.9902 |
| F-number | 3.5 |

Depth characteristics
(evaluation spatial frequency: 84 [lp/mm])

| | Depth | Pair-wise comparison [%] | Conversion F-number |
|---|---|---|---|
| MTF 20% | 0.16 | 177 | 6.2 |
| MTF 10% | 0.19 | 175 | 6.1 |

Figure 8:
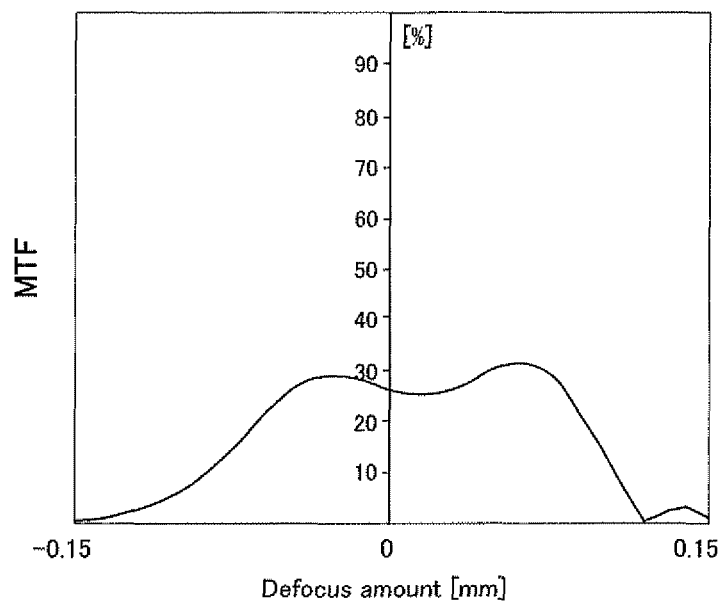
FIG. 8 is a diagram showing a MTF characteristic of an optical system of Example 1-2 of the present invention.

FIG. 8 is a diagram showing an on-axis MTF characteristic in Example 1-2. The evaluation spatial frequency is 84 (lp/mm) as in Comparative Example 1-1. Even with the on-axis MTF characteristic shown in FIG. 8, it is clear that it is possible to realize a substantially constant MTF at locations where the defocus amount is zero, i.e. the location where the image pickup element is placed and within a predetermined distance range before and behind the location.

Figure 9:
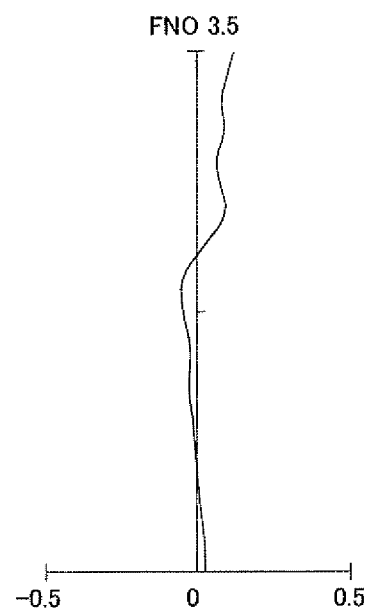
FIG. 9 is a diagram showing a spherical aberration characteristic of Example 1-2 of the present invention.

FIG. 9 is a diagram showing a spherical aberration characteristic in Example 1-2. What is shown here is a spherical aberration characteristic at a wavelength of 546.07 (nm) as in Comparative Example 1-1. The spherical aberration characteristic has several peaks on the positive and the negative sides. Accordingly, even in Example 1-2, the MTF is substantially constant before and behind the location where the defocus amount becomes zero.

Then, the following describes a numerical example and various characteristics in Example 1-3. In Example 1-3, as in Example 1-2, five surfaces of the third lens L3 shown in FIG. 2 are bifocal lenses, thereby realizing a substantially constant MTF at the location where the image pickup element is placed and in predetermined distances before and behind the location. However, the bifocal lenses are different in detail from those in Example 1-2. The meaning of each number and various design criteria are the same as those described in Comparative Example 1-1 and Examples 1-1 and 1-2.

Figure 10:
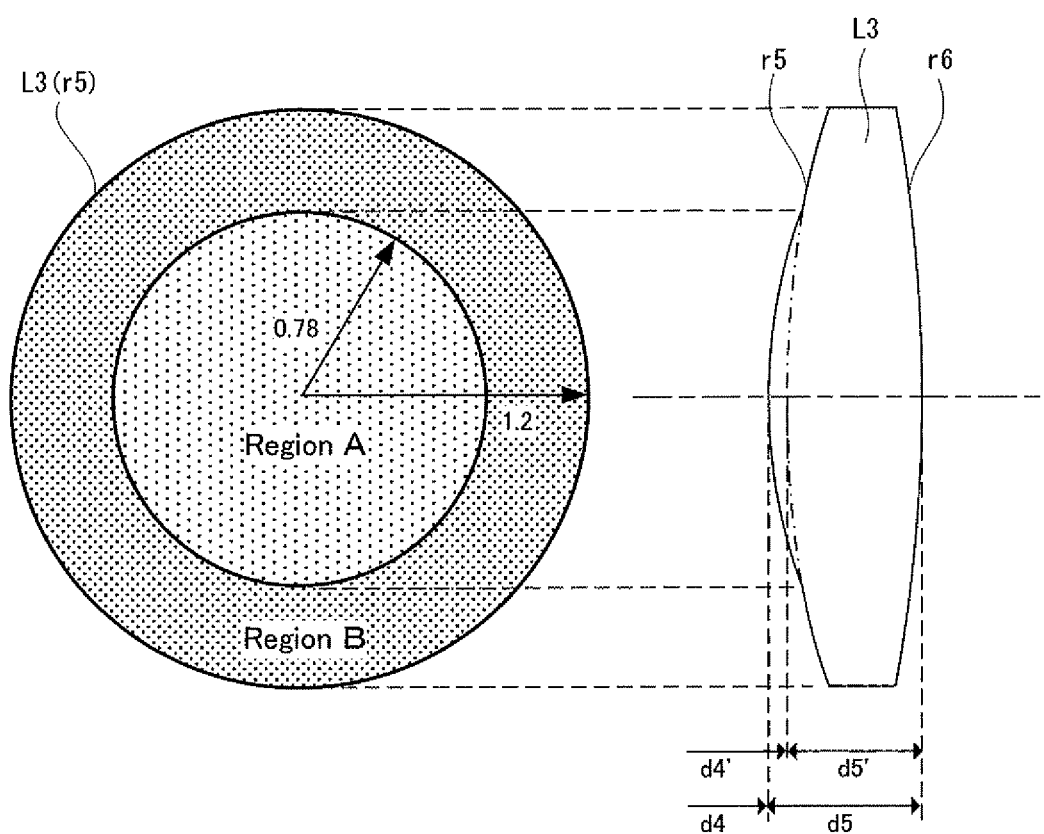
FIG. 10 is a schematic diagram showing the configuration of a bifocal lens used in Example 1-3 of the present invention.
Figure 11:
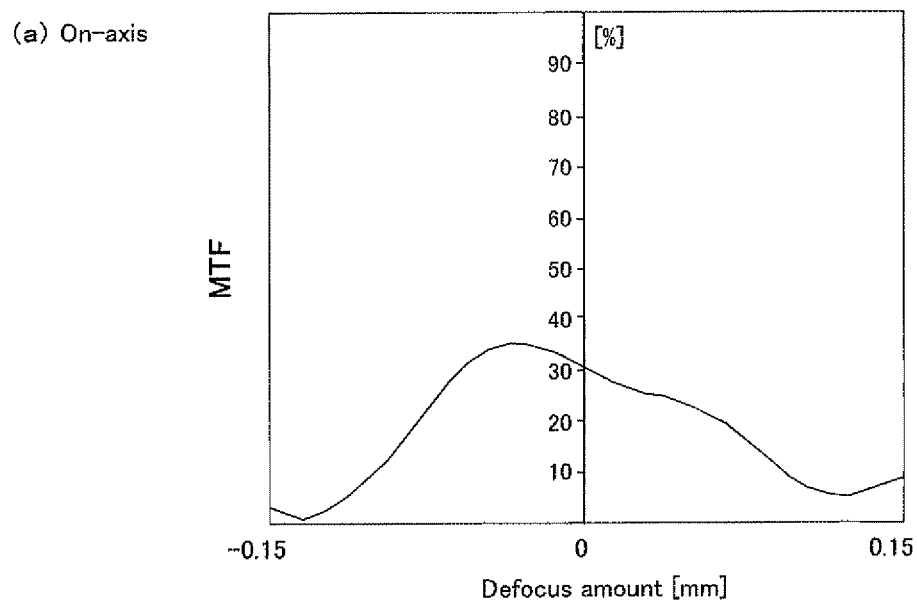
FIG. 11 is a diagram showing a MTF characteristic of an optical system of Example 1-3 of the present invention.

FIG. 10 is a front view of a bifocal lens, which is applied to five surfaces of the third lens L3, as well as a cross-sectional view of the lens taken along the optical axis. The drawing here is a schematic diagram illustrating a multi-focal lens; the shape thereof is different from the shape represented by actual numbers.

As shown in FIG. 10, on the bifocal lens, a region A is provided at the center thereof, and a region B is so provided as to surround the region A. The present Example 1-3 is different from Example 1-2 in that the radius of the regions A is larger. In the following numerical example, the radius of each region, curvatures, and the distances d4 and d5 between lens surfaces (optical surfaces) are shown.

Numerical Example 1-3

Unit [mm]

Surface Data

| Surface No. | r | d | nd | Vd | F |
|---|---|---|---|---|---|
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Bifocal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Image plane) | ∞ | | | | |

Bifocal lens data (Surface No. 5)

| | Radius | curvatures | d4 | d5 |
|---|---|---|---|---|
| Region A | 0.78 | 10.7443 | 0.3997 | 0.4438 |
| Region B | 1.2 | 11.0443 | 0.4005 | 0.4430 |

Data Set

| | |
|---|---|
| Focal length | 9.9902 |
| F-number | 3.5 |

Depth characteristics
(evaluation spatial frequency: 84 [lp/mm])

| | Depth | Pair-wise comparison [%] | Conversion F-number |
|---|---|---|---|
| MTF 20% | 0.14 | 157 | 5.5 |
| MTF 10% | 0.20 | 176 | 6.2 |

FIG. 11(a) shows an on axis MTF characteristic as in Comparative Example 1-1 when the evaluation spatial frequency is 84 (lp/mm)

Even with the on-axis MTF characteristic shown in FIG. 11(a), it is clear that it is possible to realize a substantially constant MTF at locations where the defocus amount is zero, i.e. the location where the image pickup element is placed and within a predetermined distance range before and behind the location.

Figure 12:
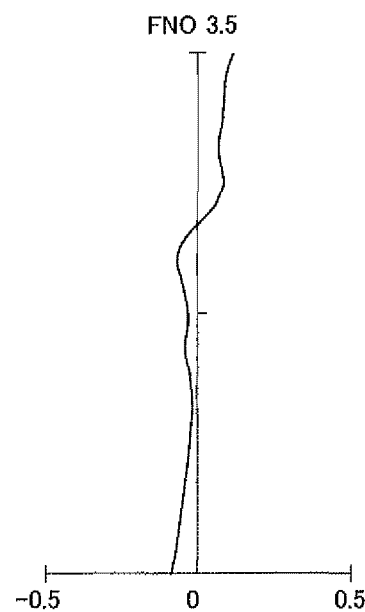
FIG. 12 is a diagram showing a spherical aberration characteristic of Example 1-4 of the present invention.

FIG. 12 is a diagram showing a spherical aberration characteristic in Example 1-3. What is shown here is a spherical aberration characteristic at a wavelength of 546.07 (nm) as in Comparative Example 1-1. The spherical aberration characteristic has several peaks on the positive and the negative sides. Accordingly, even in Example 1-3, the MTF is substantially constant before and behind the location where the defocus amount becomes zero.

Then, the following describes a numerical example and various characteristics in Example 1-4. In Example 1-4, five surfaces of the third lens L3 shown in FIG. 2 are trifocal lenses, thereby realizing a substantially constant MTF at the location where the image pickup element is placed and in predetermined distances before and behind the location. The meaning of each number and various design criteria are the same as those described in Comparative Example 1-1 and Examples 1-1 to 1-3.

Figure 13:
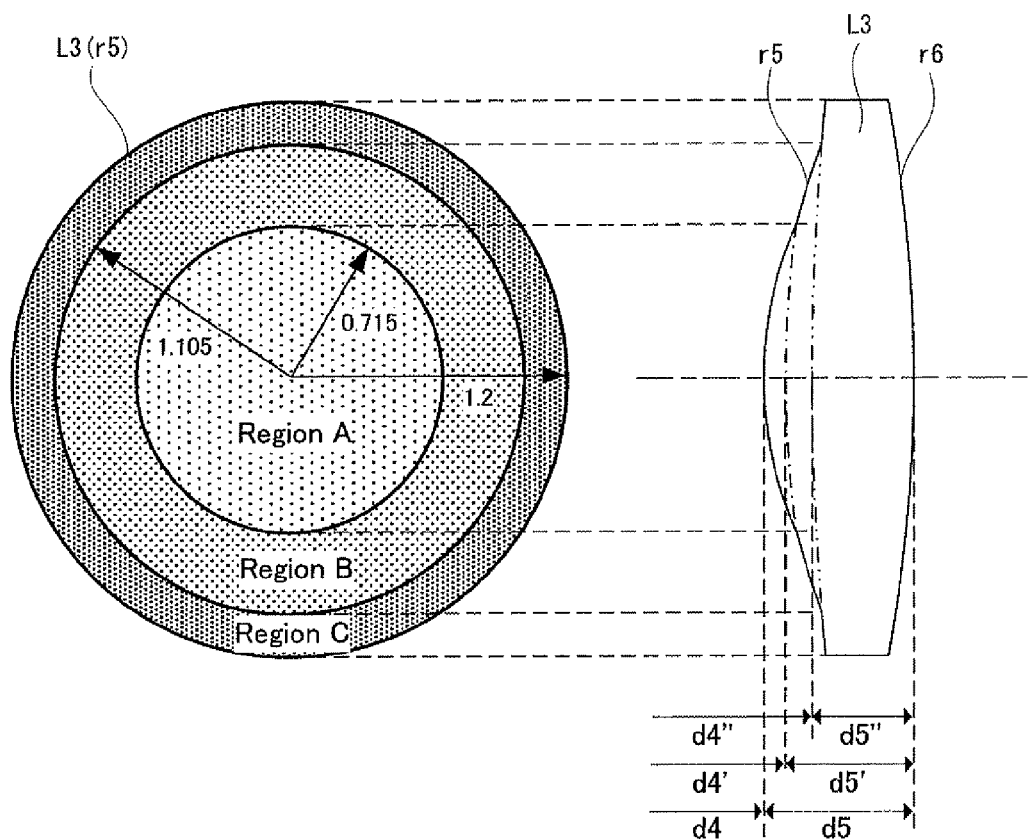
FIG. 13 is a schematic diagram showing the configuration of a trifocal lens used in Example 1-4 of the present invention.

FIG. 13 is a front view of a trifocal lens, which is applied to five surfaces of the third lens L3, as well as a cross-sectional view of the lens taken along the optical axis. The drawing here is a schematic diagram illustrating a multi-focal lens; the shape thereof is different from the shape represented by actual numbers.

As shown in FIG. 13, on the trifocal lens, a region A is provided at the center thereof, and a region B is so provided as to surround the region A, and a region. C is so provided as to surround the region B. In the present Example 1-4, the regions A, B and C each have a spherical shape. The regions A, B and C are so formed as to have no difference in level therebetween and change seamlessly. In the following numerical example, the radius of each region, curvatures, and the distances d4 and d5 between lens surfaces (optical surfaces) are shown. In this case, the surface distances d4 and d5 of the region B represent, as shown in FIG. 13, the surface distances (d4' and d5' in the diagram) at a location where a virtual surface formed by the lens surface of the region B crosses the optical axis. The surface distances d4 and d5 of the region C represent the surface distances (d4" and d5" in the diagram) at a location where a virtual surface formed by the lens surface of the region C crosses the optical axis.

Numerical Example 1-4

| | Unit [mm] | | | |
|---|---|---|---|---|
| | Surface Data | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Tri Focal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Image plane) | ∞ | | | | |

| Trifocal lens data (Surface No. 5) | | | | |
|---|---|---|---|---|
| | Radius | curvatures | d4 | d5 |
| Region A | 0.715 | 10.7443 | 0.3997 | 0.4438 |
| Region B | 1.105 | 11.0443 | 0.4003 | 0.4432 |
| Region C | 1.2 | 11.2943 | 0.4025 | 0.4410 |

| Data Set | |
|---|---|
| Focal length | 9.9902 |
| F-number | 3.5 |

| Depth characteristics (evaluation spatial frequency: 84 [lp/mm]) | | |
|---|---|---|
| Depth | Pair-wise comparison [%] | Conversion F-number |
| MTF 20% 0.17 | 184 | 6.5 |
| MTF 10% 0.22 | 195 | 6.8 |

As for Example 1-4 in which the above trifocal lens is used, the MTF characteristic and spherical aberration characteristic thereof are also shown.

Figure 14:
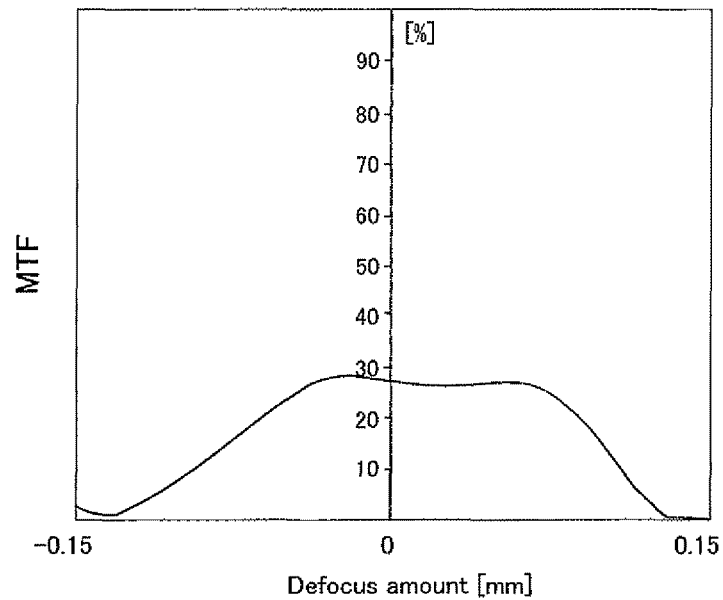
FIG. 14 is a diagram showing MTF characteristics of an optical system of Example 1-4 of the present invention.
Figure 14:
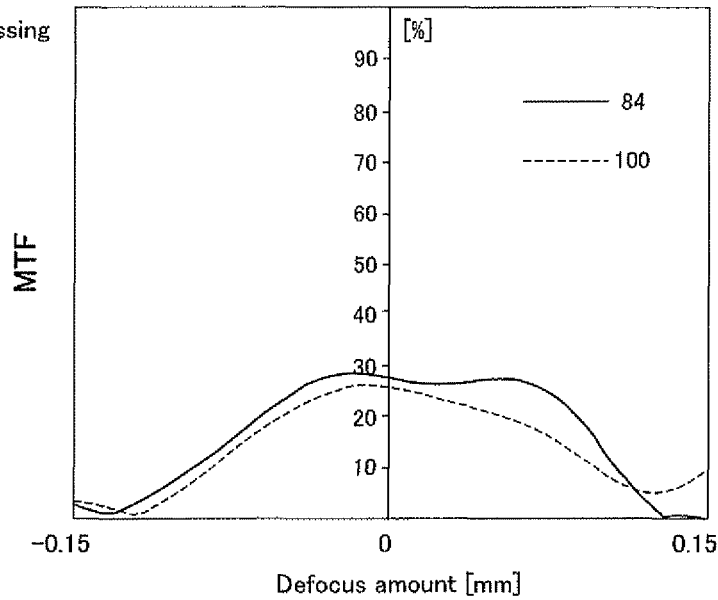

FIG. 14 is a diagram showing an on axis MTF characteristic in Example 1-4. FIG. 14(a) shows an on-axis MTF characteristic as in Comparative Example 1-1 when the evaluation spatial frequency is 84 (lp/mm). FIG. 14(c) shows MTF characteristics when the evaluation spatial frequencies are different. In this case, two MTF characteristics are shown together: the MTF characteristic of 84 (lp/mm), which is the same as in FIG. 14(a), and the MTF characteristic of 100 (lp/mm).

Even with the on-axis MTF characteristic shown in FIG. 14(a), it is possible to realize a substantially constant MTF at locations where the defocus amount is zero, i.e. the location where the image pickup element is placed and within a predetermined distance range before and behind the location. In FIG. 14(c), in a range where contrast does not become zero in the MTF characteristic of 84 (lp/mm) there is the MTF characteristic of 84 (lp/mm), where the MTF characteristic of 100 (lp/mm) intersects. Under such a situation, it can be said that the substantially constant MTF characteristic of 84 (lp/mm) is guaranteed. Moreover, in Example 1-4, the intersection takes place at a position that is less than or equal to 10%, further confirming that the MTF characteristic of 84 (lp/mm) is substantially constant.

Figure 15:
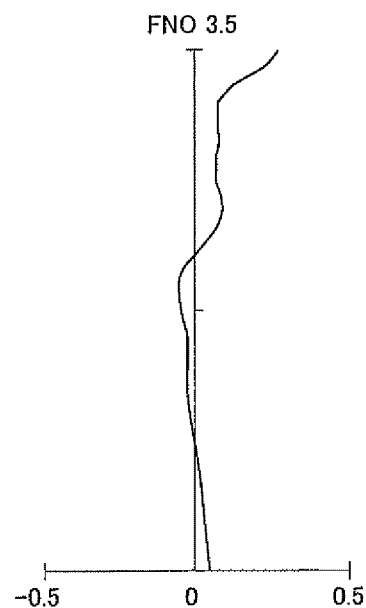
FIG. 15 is a diagram showing a spherical aberration characteristic of Example 1-4 of the present invention.

FIG. 15 is a diagram showing a spherical aberration characteristic in Example 1-4. What is shown here is a spherical aberration characteristic at a wavelength of 546.07 (nm) as in Comparative Example 1-1. The spherical aberration characteristic has several peaks on the positive and the negative sides. Accordingly, even in Example 1-4, the MTF is substantially constant before and behind the location where the defocus amount becomes zero.

Figure 16:
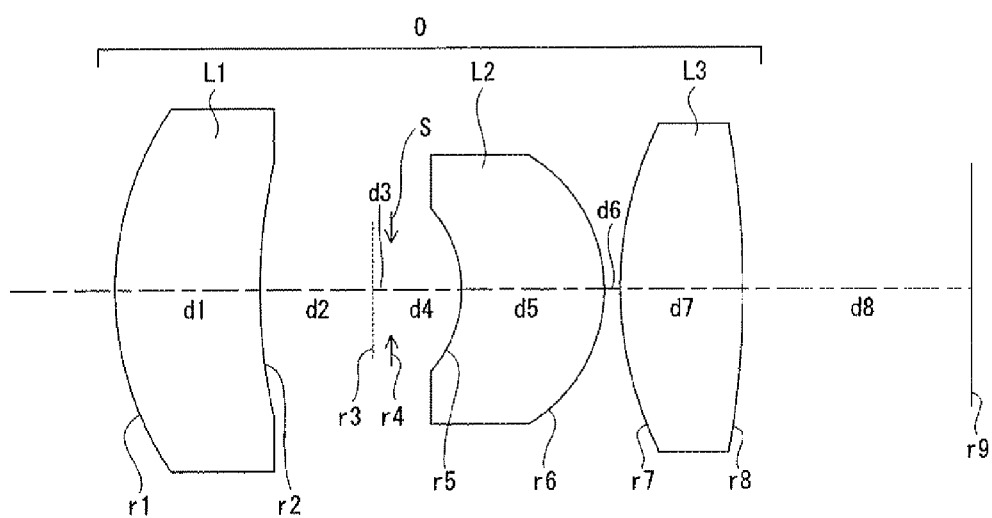
FIG. 16 is a cross-sectional diagram of an optical system of Comparative Example 1-2 expanded and taken along an optical axis.

The following describes Example 1-5 in which another optical system is used, along with Comparative Example 1-2 thereof. FIG. 16 is a cross-sectional view of an optical system expanded and taken along an optical axis, which is used in Comparative Example 1-2.

In Comparative Example 1-2, an optical system O includes a first lens L1, aperture diaphragm 8, second lens L2 and third lens L3, which are arranged from the object side to the emission side. In the diagram, on an image pickup plane indicated by r9, an image pickup element such as CCD is placed.

The first lens L1 is a single lens of a positive meniscus shape with a convex surface facing the object side. The second lens L2 is a single lens of a positive meniscus shape with a concave surface facing the object side. The third lens L3 is a single lens of a biconvex shape having positive refractive power. In order to make a comparison with Example 1-5, a virtual surface r3 is provided and designed before the aperture diaphragm S.

In the present example, when an image pickup element placed on the image pickup plane is designed, suppose that the maximum number of pixels in the vertical or horizontal direction is 353, and the pixel pitch 3.0 (μm).

A numerical example of the above Comparative Example 1-2 is shown below. The meanings of various numbers are the same as those described in Comparative Examples 1-1 and Examples 1-1 to 1-4. The evaluation spatial frequency in Depth Characteristic is 111 (lp/mm).

Comparative Example 1-2

| | Unit [mm] | | | | |
|---|---|---|---|---|---|
| | Surface Data | | | | |
| Surface No. | r | d | nd | Vd | F |
| 1* | 1.0577 | 0.4200 | 1.59008 | 29.90 | 3.5608 |
| 2 | 1.8160 | 0.3820 | | | |
| 3 | ∞ | 0.0500 | | | |
| 4(Stop) | ∞ | 0.2020 | | | |
| 5 | −0.3626 | 0.4200 | 1.49380 | 57.40 | 4.1989 |
| 6* | −0.4268 | 0.0380 | | | |
| 7 | 1.1353 | 0.3530 | 1.69979 | 55.50 | 1.2981 |
| 8 | −3.9640 | 0.6686 | | | |

-continued

Unit [mm]

| | | |
|---|---|---|
| 9(Image Plane) | ∞ | |

Aspheric data

1st Surface

K = 0
A2 = 0.00E+00
A4 = 1.58E−01
A6 = 0.00E+00
A8 = 0.00E+00
A10 = 0.00E+00

6th Surface

K = 0
A2 = 0.00E+00
A4 = 1.08E+00
A6 = −5.63E+00
A8 = 7.40E+01
A10 = 0.00E+00

Data Set

| Focal length | 0.9971 |
|---|---|
| F-number | 2.8 |

Depth characteristics
(evaluation spatial frequency: 111 [lp/mm])

| | Depth |
|---|---|
| MTF 20% | 0.06 |
| MTF 10% | 0.07 |

Figure 17:
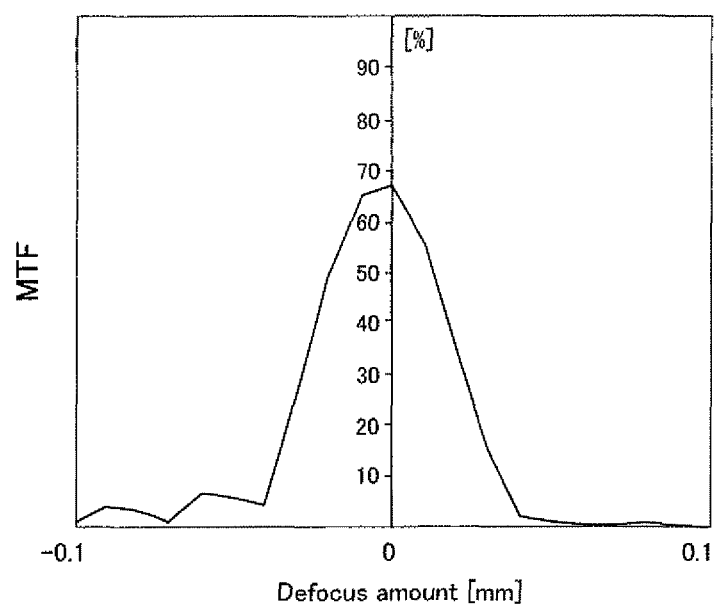
FIG. 17 is a diagram showing a MTF characteristic of Comparative Example 1-2.

FIG. 17 is a diagram showing a MTF characteristic at an evaluation spatial frequency of 111 (lp/mm) in Comparative Example 1-2. FIG. 17 shows the MTF (Unit: %) relative to the on-axis defocus amount (Unit: millimeters (mm)). The MTF characteristic of Comparative Example 1-2 is so shaped as to have a sharp peak of about 65% around 0 (mm).

Figure 18:
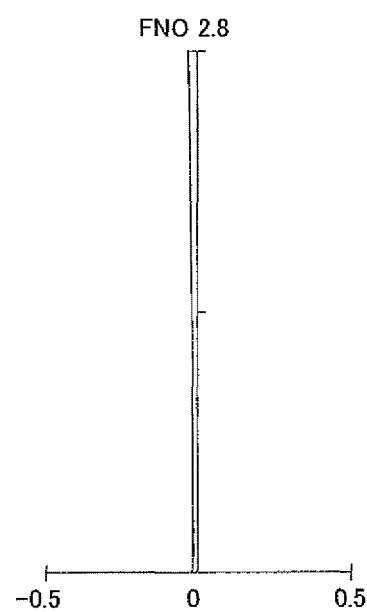
FIG. 18 is a diagram showing a spherical aberration characteristic of Comparative Example 1-2.

FIG. 18 is a diagram showing a spherical aberration characteristic in Comparative Example 1-2. In this case, a spherical aberration characteristic at a wavelength of 546.07 (nm) is shown. It is clear from the diagram that there are fewer fluctuations in the spherical aberration characteristic.

Figure 19:
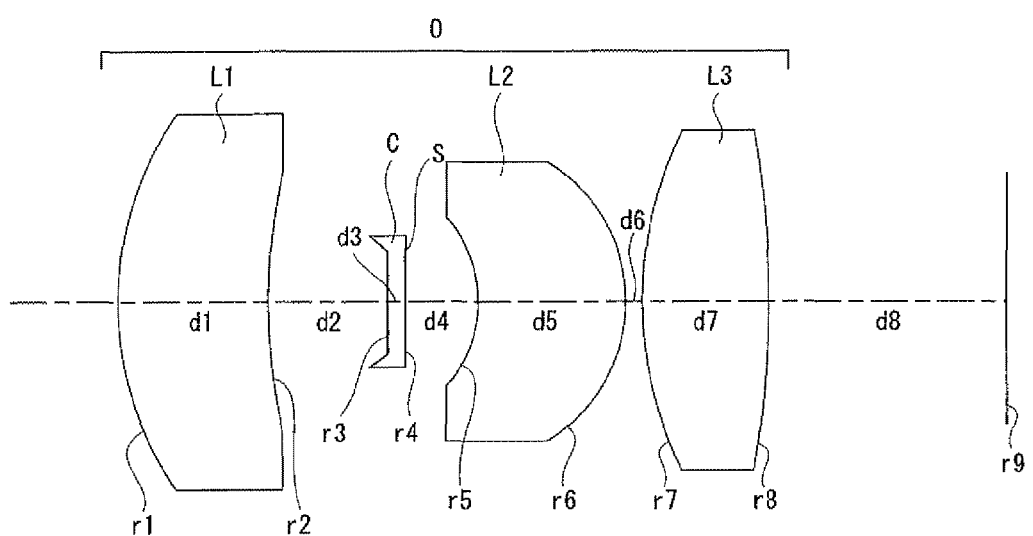
FIG. 19 is a cross-sectional view of an optical system of Example 1-4 of the present invention expanded and taken along an optical axis.

Then, the following describes a numerical example and various characteristics in Example 1-5. FIG. 19 is a cross-sectional view of the optical system of Example 1-5 expanded and taken along the optical axis. In Example 1-5, an aspherical plate C is inserted between the virtual surface r3 shown in FIG. 16 and the aperture diaphragm S, thereby realizing a substantially constant MTF at the location where the image pickup element is placed and in predetermined distances before and behind the location. The meaning of each number and various setting criteria are the same as those described in Comparative Example 1-2.

Numerical Example 1-5

Unit [mm]

Surface Data

| Surface No. | r | d | nd | Vd | F |
|---|---|---|---|---|---|
| 1* | 1.0577 | 0.4200 | 1.59008 | 29.90 | 3.5608 |
| 2 | 1.8160 | 0.3820 | | | |
| 3* | ∞ | 0.0500 | 2.11986 | 36.80 | 11.0766 |
| 4(Stop) | ∞ | 0.2020 | | | |
| 5 | −0.3626 | 0.4200 | 1.49380 | 57.40 | 4.1989 |
| 6* | −0.4268 | 0.0380 | | | |
| 7 | 1.1353 | 0.3530 | 1.69979 | 55.50 | 1.2981 |
| 8 | −3.9640 | 0.6222 | | | |
| 9(Image Plane) | ∞ | | | | |

Aspheric data

1st Surface

K = 0
A2 = 0.00E+00
A4 = 1.58E−01
A6 = 0.00E+00
A8 = 0.00E+00
A10 = 0.00E+00

3rd Surface

K = 0
A2 = 4.01E−02
A4 = −3.95E+00
A6 = 6.19E+02
A8 = −7.92E−01
A10 = −1.04E+06

6th Surface

K = 0
A2 = 0.00E+00
A4 = 1.08E+00
A6 = −5.63E+00
A8 = 7.40E+01
A10 = 0.00E+00

Data Set

| Focal length | 0.9973 |
|---|---|
| F-number | 2.8 |

Depth characteristics
(evaluation spatial frequency: 111 [lp/mm])

| | Depth | Pair-wise comparison [%] | Conversion F-number |
|---|---|---|---|
| MTF 20% | 0.09 | 159 | 4.4 |
| MTF 10% | 0.11 | 158 | 4.4 |

Figure 20:
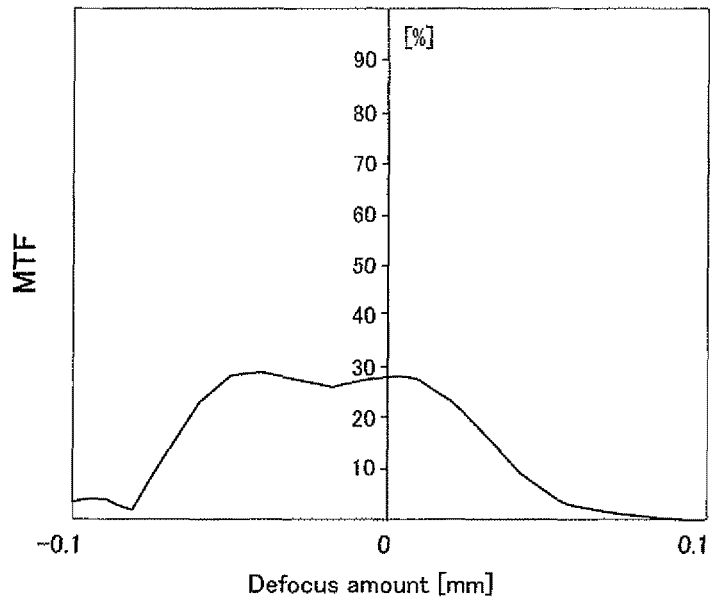
FIG. 20 is a diagram showing MTF characteristics of an optical system of Example 1-4 of the present invention.
Figure 20:
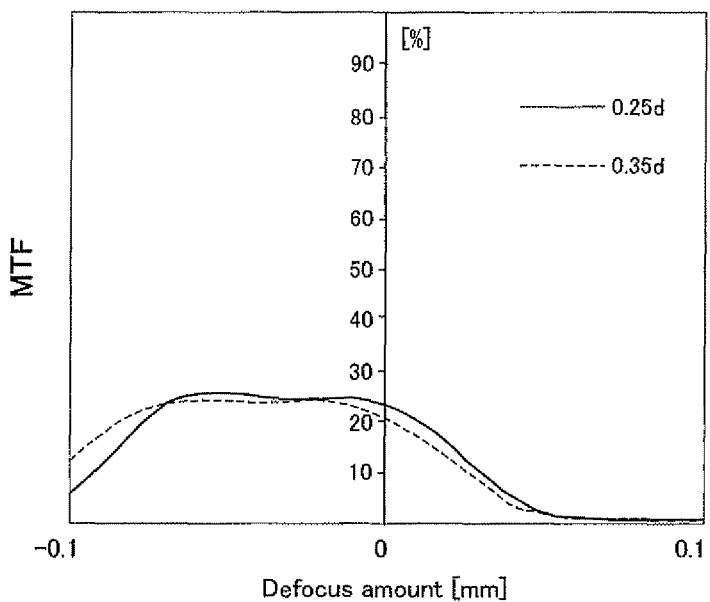

FIG. 20 is a diagram showing a MTF characteristic in Example 1-5. FIG. 20(a) shows an on-axis MTF characteristic. FIG. 20(b) shows off-axial MTF characteristics. In this case, two off-axial MTF characteristics, 0.25 d and 0.35 d (0.5 d: maximum height of the image pickup plane), are shown. Incidentally, in both cases shown in FIGS. 20(a) and 20(b), the evaluation spatial frequency is 111 (lp/mm).

It is clear from a comparison of the on-axis MTF characteristic shown in FIG. 20(a) with the MTF characteristic of Comparative Example 1-2 shown, in FIG. 17 that the on axis MTF characteristic is able to realize a substantially constant MTF at locations where the defocus amount is zero, i.e. the location where the image pickup element is placed and within a predetermined distance range before and behind the location, even though the MTF is a low value.

It is also clear from FIG. 20(b) that there is a substantially constant MTF characteristic even in the off-axial case as in the on-axis case.

Figure 21:
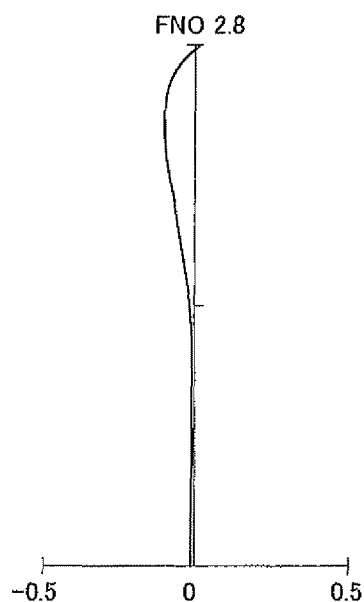
FIG. 21 is a diagram showing a spherical aberration characteristic of Example 1-4 of the present invention.

FIG. 21 is a diagram showing a spherical aberration characteristic in Example 1-5. What is shown here is a spherical aberration characteristic at a wavelength of 546.07 (nm). As for the spherical aberration characteristic here, when being compared with the spherical aberration characteristic shown in FIG. 18, there are significant changes in the characteristic, with two peak values on the negative side.

As described above, the spherical aberration characteristic changes. Therefore, it is possible to realize a substantially constant MTF in the vicinity of the location where the defocus amount is zero.

With reference to FIGS. 2 to 15, the above has described Examples 1-1 to 1-4 and Comparative Example 1-1 thereof. With reference to FIGS. 16 to 21, the above has described Example 1-5 and Comparative Example 1-2 thereof. According to the optical systems of Examples 1-1 to 1-5, a substantially constant MTF is realized at locations where the defocus amount is zero, i.e. the location where the image pickup element is placed and in predetermined distances before and behind the location. When an image is obtained through such an optical system, the sufficiently resolved image can be obtained by performing an image restoration process on the obtained image. Moreover, it is possible to realize an image with a wide focal depth.

Incidentally, in order to realize a substantially constant MTF, Examples 1-1 to 1-4 are different from Comparative Example 1-1 in that: an aspherical shape is provided in Example 1-1; a bifocal lens in Examples 1-2 and 1-3; and a trifocal lens in Example 1-4. Moreover, Example 1-5 is different from Comparative Example 1-2 in that an aspherical plate is provided. Incidentally, for a wave-front control element that is used to realize a substantially constant MTF, besides the aspherical shape of such a lens, a multi-focal lens or an aspherical plate, a phase plate may be used. Furthermore, a plurality of wave-front control elements may be used to realize a substantially constant MTF. In Examples 1-2 to 1-4, each region of a multi-focal lens is in a spherical shape. However, any one of the regions may be in an aspherical shape. Moreover, the wave-front control element may be made of birefringent crystal so that a substantially constant MTF is realized.

Moreover, the wave-front control element designed to realize a substantially constant MTF may be detachable. In this manner, the wave-front control element can be used as a normal optical system (Comparative Examples 1-1 and 1-2) having a sharp MTF characteristic. For example, in Examples 1-1 to 1-4, the optical system can be switched to that in Comparative Example 1-1 by replacing the third lens L3. In Example 1-5, the optical system can be switched to that in Comparative Example 1-2 by removing the aspherical plate C.

As for the above Examples 1-1 to 1-5, values in each of the conditional expressions (1) to (5) are shown below. Incidentally, the following shows the values when a=20. As for Examples 1-1 and 1-5, two off-axial off-axis data sets, 0.25 d and 0.35 d (0.5 d: maximum height of the image pickup plane), are shown.

|  | Example No. | | | | |
|---|---|---|---|---|---|
|  | 1-1 | 1-2 | 1-3 | 1-4 | 1-5 |
| Expression (1) | 0.023 | 0.023 | 0.020 | 0.024 | 0.017 |
| Expression (2) | 0.027 | 0.027 | 0.024 | 0.025 | 0.003 |
| Expression (3) | 84 | 84 | 84 | 84 | 111 |
| Expression (4) | 84 | 84 | 84 | 84 | 111 |
| Expression (5) | 0.021 | 0.021 | 0.021 | 0.021 | 0.314 |

Off-Axial Data

|  | Example 1-1 | | Example 1-5 | |
|---|---|---|---|---|
|  | (0.25d) | (0.35d) | (0.25d) | (0.35d) |
| Expression (1) | 0.006 | 0.006 | 0.015 | 0.015 |
| Expression (2) | 0.035 | 0.033 | 0.004 | 0.004 |
| Expression (3) | 84 | 84 | 111 | 111 |
| Expression (4) | 84 | 84 | 111 | 111 |
| Expression (5) | 0.021 | 0.021 | 0.314 | 0.314 |

With reference to FIGS. 22 to 32, an optical system used in the No. 2 image pickup device of the present embodiment will be described.

Figure 22:
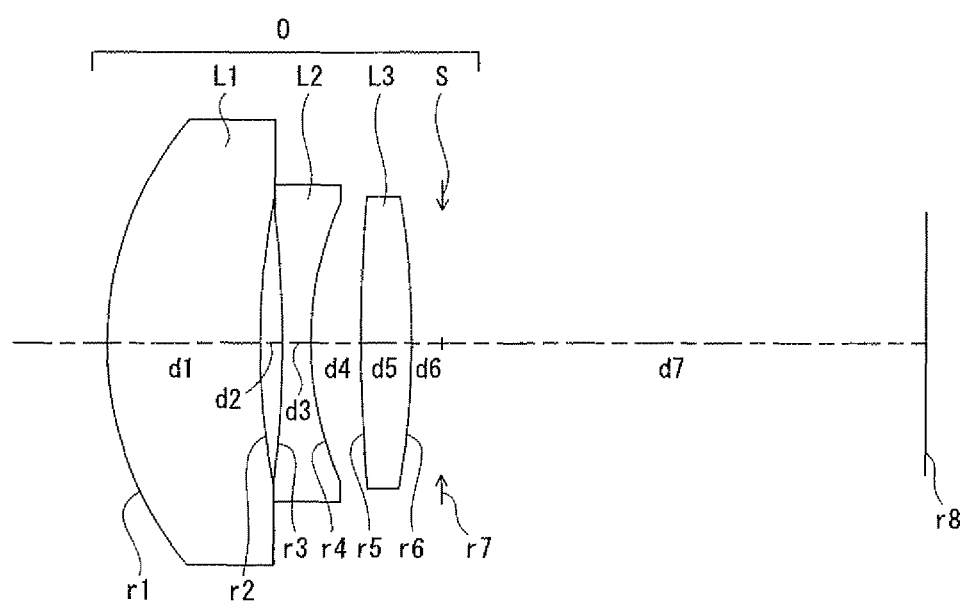
FIG. 22 is a cross-sectional view of an optical system of Comparative Example 2-1 and of Examples 2-1 to 2-3 of the present invention expanded and taken along an optical axis.

FIG. 22 is a schematic cross-sectional view of an optical system expanded and taken along an optical axis, which is used in Comparative Example 2-1 and Examples 2-1 to 2-3 according to the present embodiment of the invention. In Comparative Example 2-1 and Examples 2-1 to 2-3, as shown in the diagrams, third lenses L3 are different in detail.

Comparative example 2-1 is shown as an example to explain Examples 2-1 to 2-3; both surfaces of a third lens L3 are in a spherical shape. By contrast, in Example 2-1, six surfaces of a third lens L3 are in an aspherical shape. In Example 2-2, five surfaces of a third lens L3 are bifocal lenses. In Example 2-3, five surfaces of a third lens L3 are trifocal lenses. In that manner, the configurations are different.

In Comparative Example 2-1, an optical system O shown, in FIG. 22 includes, from the object side to the emission side, a first lens L1, a second lens L2, a third lens L3, and an aperture diaphragm S in that order. In the diagram, on an image pickup plane indicated by r8, an image pickup element such as CCD is placed.

The first lens L1 is a single lens of a positive meniscus shape with a convex surface facing the object side. The second lens L2 is a single lens of a biconcave shape having negative refractive power. The third lens L3 is a single lens of a biconvex shape having positive refractive power.

In the present comparative example, when an image pickup element placed on the image pickup plane is designed, suppose that the maximum number of pixels in the vertical or horizontal direction is 4,000, and the pixel pitch 1.7 (μm). Incidentally, the same is true for Examples.

Numerical data of the above Comparative Example 2-1 are shown below. In the numerical data, r represents the radius of curvature of each lens surface (optical surface); d represents a distance between lens surfaces (optical surfaces); rad represents the refractive index of d-line of each lens (optical medium); Vd represents the Abbe number of each lens (optical medium); and F represents the focal distance. Incidentally, the symbol "∞", which is recorded as to the radius of curvature, means infinity.

In every kind of data, the focal distance of the optical system and the F-number are shown. The focal distance is measured in millimeters (mm). What is shown here is the F-number that was used for the present measurement at the time of opening.

Comparative Example 2-1

Unit [mm]

Surface Data

| Surface No. | r | d | nd | Vd | F |
|---|---|---|---|---|---|
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6 | −6.5817 | 0.2367 | | | |
| 7(Stop) | ∞ | 7.7389 | | | |
| 8(Image plane) | ∞ | | | | |

Data Set

| Focal length | 9.9902 |
|---|---|
| F-number | 3.5 |

Figure 23:
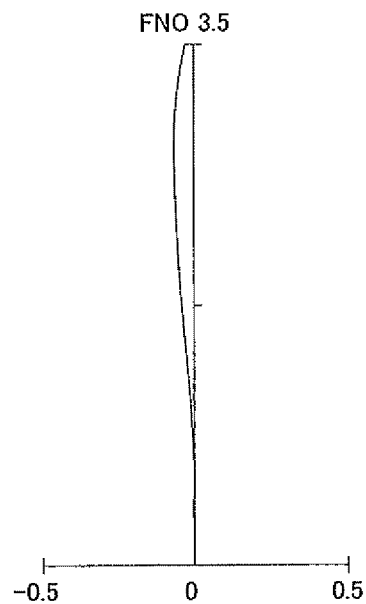
FIG. 23 is a diagram showing a spherical aberration characteristic of Comparative Example 2-1.

FIG. 23 is a diagram showing a spherical aberration characteristic in Comparative Example 2-1. What is shown here is a spherical aberration characteristic at a wavelength of 546.07 (nm).

Figure 24:
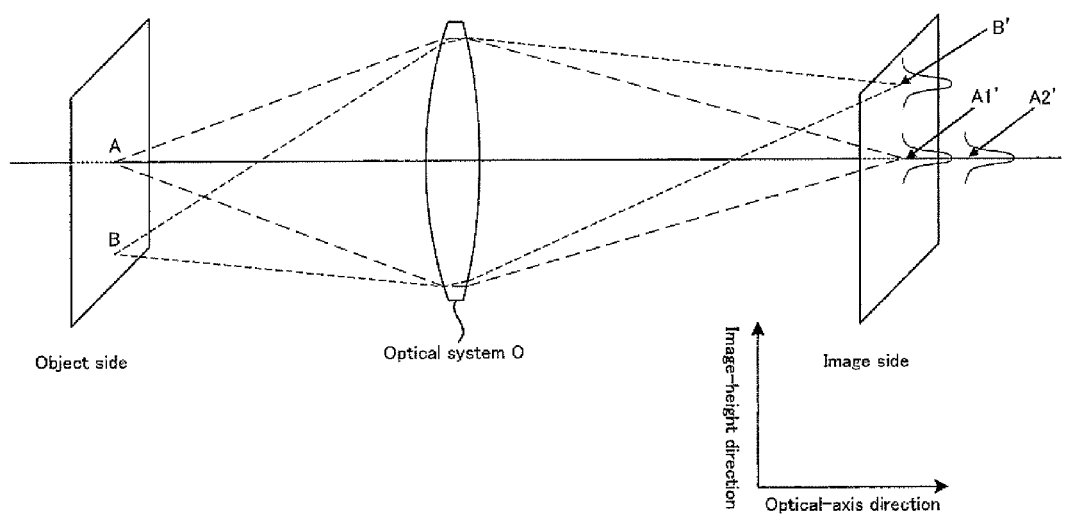
FIG. 24 is a conceptual diagram illustrating observation positions for PSF.

FIG. 24 is a conceptual diagram illustrating observation positions for PSF. The light emitted from a point light source A, which is disposed on the object side, forms an image at an object-side observation spot A1' via an optical system O. In this case, the PSF at the observation spot A1' can be represented as light intensity distribution with respect to an image-height direction with the light intensity at the observation spot A1' as a center. Moreover, the PSF at an observation spot A2' can be represented as light intensity distribution with respect to an image-height direction with the light intensity at the observation spot A2' as a center. Meanwhile, the light emitted from a point light source B, which is disposed on the object side, forms an image at an object-side B'. In this case, the PSF at the observation spot B' can be represented as light intensity distribution of an image-height direction with the light intensity at the observation spot B' as a center. Incidentally, the light intensity distribution with respect to the image-height direction means the light intensity distribution within a plane perpendicular to the optical axis.

According to the present embodiment, PSFs in at least two observation spots on the image side become substantially equal to each other. Therefore, when an image restoration process is performed, a sufficiently resolved image can be obtained. A region that contains the PSFs in at least two spots on the image side can be set arbitrarily with the location where the image pickup element is placed, as well as desired image characteristics, taken into account. A comparison of PSFs between two spots may be made at different locations in the optical-axis direction, which are for example observation spots A1' and A2'; or alternatively, the comparison may be made at different locations in the image-height direction, which are for example observation spots A1' and B'.

Then, the following describes a numerical example and various characteristics in Example 2-1. In Example 2-1, six surfaces of the third lens L3 shown in FIG. 22 are in an aspherical shape, thereby realizing substantially equal PSFs in at least two spots on the image side. The meaning of each number and various design criteria are the same as those described in Comparative Example 2-1. In surface data, asterisk "*" marked on the right side of a surface number indicates that a lens surface thereof is in an aspherical shape.

If x represents an optical axis on which the direction of light travel is positive, and y represents a direction perpendicular to the optical axis, the aspherical shape is represented by the following equation:

$$x=(y^2/r)/[1+\{1-(K+1)(y/r)^2\}^{1/2}]+A2y^2+A4y^4+A6y^6+A8y^8+A10y^{10}\ldots$$

where r is the paraxial radius of curvature; K is the constant of the cone; and A2 to A10 are second- to tenth-order aspherical coefficients, respectively. Incidentally, symbol "E" indicates that the subsequent value is an exponent to base 10. For example, "1.0E-5" means "1.0×10$^{-5}$."

Numerical Example 2-1

Unit [mm]

Surface Data

| Surface No. | r | d | nd | Vd | F |
|---|---|---|---|---|---|
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6* | −6.5817 | 0.2367 | | | |
| 7(Stop) | ∞ | 7.7389 | | | |
| 8(Image plane) | ∞ | | | | |

Aspheric data
6th data

K = 0
A2 = −2.01E−12
A4 = 5.98E−03
A6 = −2.08E−02
A8 = 2.19E−02
A10 = −7.06E−03

Data Set

| Focal length | 9.9902 |
|---|---|
| F-number | 3.5 |

Full-width at half-maximum of PSF

| image-height | Actual size ratio [%] | Pixel conversion ratio |
|---|---|---|
| 0.00 | 0.000 | 0.000 |
| 0.25d | 1.199 | 0.010 |
| 0.50d | 3.300 | 0.027 |

Figure 25:
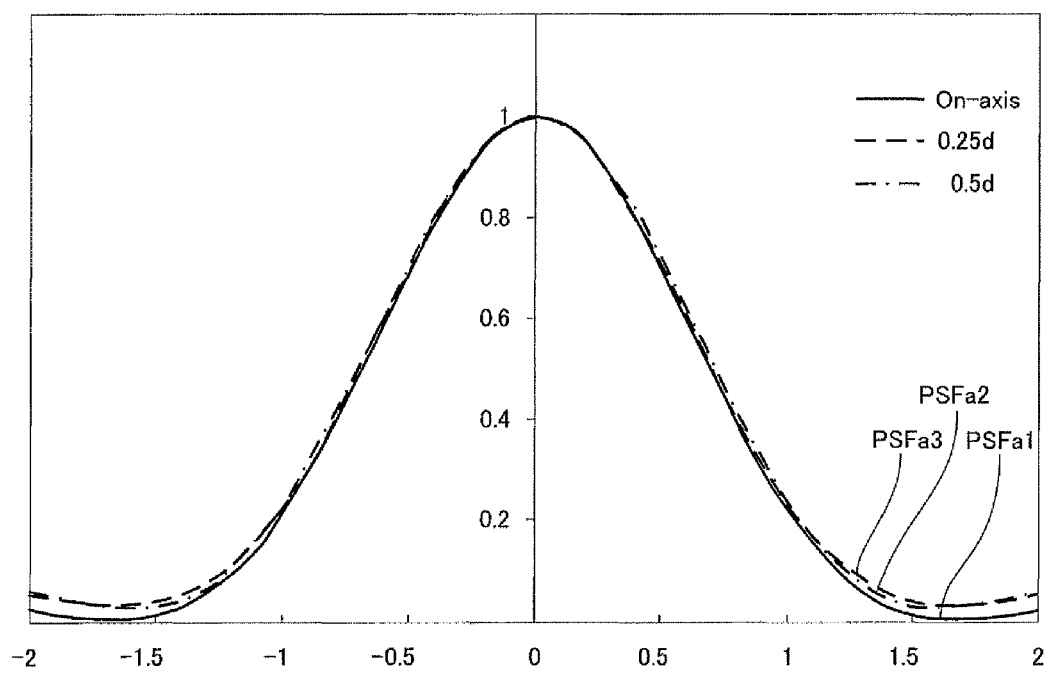
FIG. 25 is a diagram showing changes in the PSF of an optical system of Example 2-1 of the present invention in an image-height direction.

FIG. 25 is a diagram showing PSFs that are in the optical system of Example 2-1 and at different positions in the image-height direction. The horizontal axis represents the image-height direction distance (the distance within a plane perpendicular to the optical axis), measured in millimeters (mm). The vertical axis represents the intensity: the intensity at an observation central position of the PSF on the optical axis (on-axis) is normalized to 1. The intensity distribution indicated by solid line is the PSF (PSFa1) at a focal position on the optical axis. The intensity distribution indicated by broken line is the PSF (PSFa2) at a position 0.25 d (d is the maximum height of image in the optical system) away from the optical axis in the image-height direction. The intensity distribution indicated by one-dot chain line is the PSF (PSFa3) at a position 0.5 d away from the optical axis in the image-height direction.

In that manner, three PSFs are observed at different positions on the same plane (or the focal plane). Incidentally, in FIG. 25, in order to make a comparison between the three PSFs, the three PSFs are superimposed when being displayed in such a way that the centers of the three PSFs are positioned at the same place. For example, the PSFa2 and the PSFa3 are, without any change in intensity distribution, transferred in parallel to the location of the optical axis so that the PSFa2 and the PSFa3 are placed onto the PSFa1, resulting in the situation shown in FIG. 25.

It is clear from the diagram that the three PSFs on the axis and at the positions 0.25 d and 0.5 d are substantially equal to each other. Moreover, even in a numerical example of the full-width at half-maximum of the above PSFs, in terms of actual size ratio, the values are within ±30%, and, in terms of pixel conversion ratio, the values are easily within one-fourth of a pixel, confirming that even numerically the three PSFs are substantially equal to each other. Incidentally, absolute values are used here to indicate the pixel conversion ratio of the full-width at half-maximum.

In the optical system having such a PSF relationship, it is possible to restore a sufficiently resolved image by performing various image restoration processes on an obtained image.

Incidentally, it is preferred that a predetermined region where PSFs are substantially equal to each other be within 0.5 d from the optical axis as in the case of Example 2-1. When the optical system having substantially equal PSFs in such a predetermined region is used, it is possible to recover the resolution around the focal position after an image restoration process is performed on an image obtained by the optical system, as well as to obtain a visually excellent image. The predetermined region where PSFs are substantially equal to each other may be within 0.25 d from the optical axis.

Moreover, as described above, d represents the maximum height of image in the optical system (or the distance from one end of the image to the other end). Therefore, 0.5 d is the distance from the center (optical axis) of the image to one end of the image. Moreover, 0.5 d is also equal to half the length of the diagonal line of the image pickup element.

Figure 26:
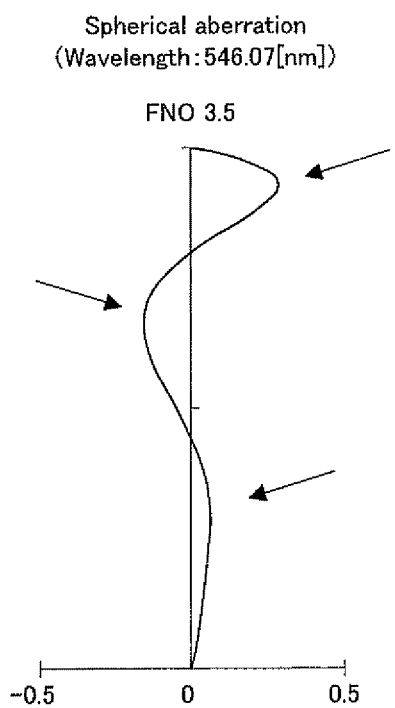
FIG. 26 is a diagram showing a spherical aberration characteristic of Example 2-1 of the present invention.

FIG. 26 is a diagram showing a spherical aberration characteristic in Example 2-1. What is shown here is a spherical aberration characteristic at a wavelength of 546.07 (nm). As for the spherical aberration characteristic here, when being compared with the spherical aberration characteristic shown in FIG. 23, a curve representing the aberration fluctuates in the positive and negative sides. As indicated by arrows in FIG. 26, the aberration curve has three peaks. Before and behind the peaks, the aberration occurrence direction extends from the positive to the negative side, or from the negative to the positive side.

In that manner, the spherical aberration characteristic moves in both the positive- and negative-side directions. Therefore, it is possible to realize an optical system having substantially equal PSFs in at least two spots within an image-side predetermined region. It is preferred that a plurality of peaks of the spherical aberration characteristic be formed on both the positive and the negative sides as in Example 2-1. Incidentally, it is possible to have substantially equal PSFs in at least two spots in an image-side predetermined region just by providing the spherical aberration characteristic with two or more peaks.

Then, the following describes a numerical example and various characteristics in Example 2-2. In Example 2, five surfaces of the third lens L3 shown in FIG. 22 are bifocal lenses, thereby realizing an optical system having substantially equal PSFs in at least two spots in an image-side predetermined region. The meaning of each number and various design criteria are the same as those described in Comparative Example 2-1 and Example 2-1.

Figure 27:
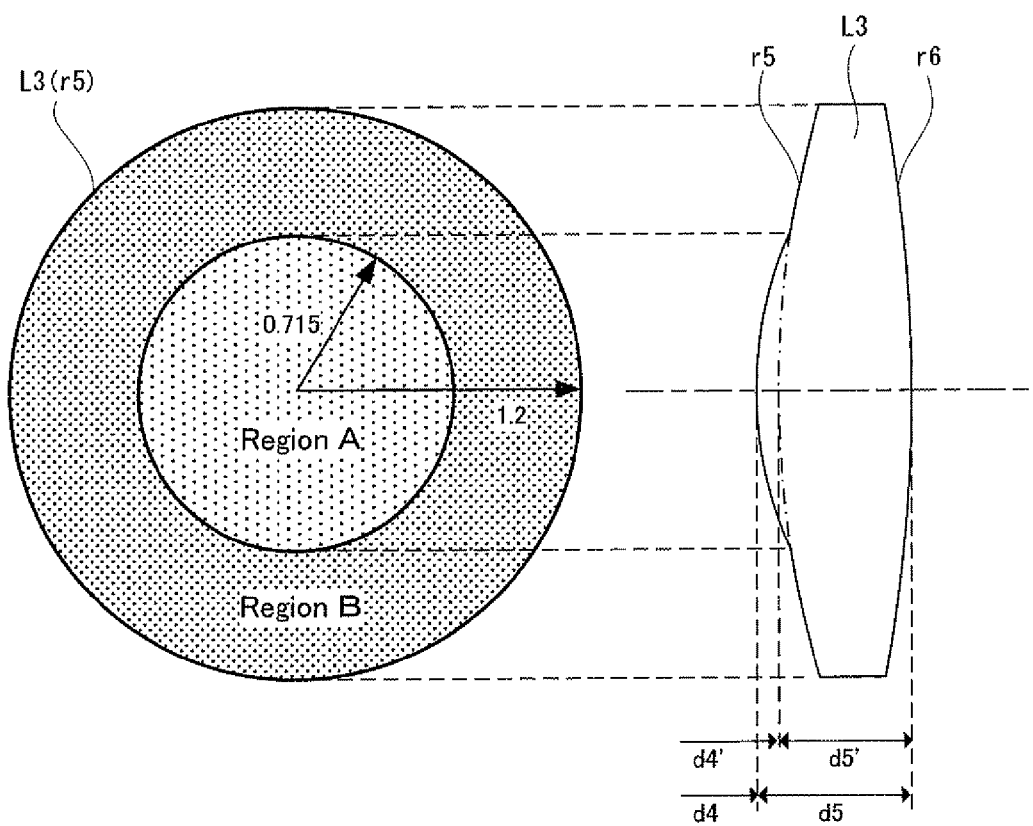
FIG. 27 is a schematic diagram showing the configuration of a bifocal lens used in Example 2-2 of the present invention.

FIG. 27 is a front view of a bifocal lens, which is applied to five surfaces of the third lens L3, as well as a cross-sectional view of the lens taken along the optical axis. The drawing here is a schematic diagram illustrating a multi-focal lens in an easy-to-understand manner; the shape thereof is different from the shape represented by actual numbers.

As shown in FIG. 27, on the bifocal lens, a region A is provided at the center thereof, and a region B is so provided as to surround the region A. In the present example, the regions A and B both have a spherical shape. The regions A and B are so formed as to have no difference in level therebetween and change seamlessly. In the following numerical example, the radius of each region, curvatures, and the distances d4 and d5 between lens surfaces (optical surfaces) are shown. In this case, the surface distances d4 and d5 of the region B represent, as shown in FIG. 27, the surface distances (d4' and d5' in the diagram) at a location where a virtual surface formed by the lens surface of the region B crosses the optical axis.

Numerical Example 2-2

| | | Unit [mm] | | | |
|---|---|---|---|---|---|
| | | Surface Data | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Bifocal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Image Plane) | ∞ | | | | |

| Bifocal lens data (Surface No. 5) | | | | |
|---|---|---|---|---|
| | Radius | Curvature | d4 | d5 |
| Region A | 0.715 | 10.7443 | 0.3997 | 0.4438 |
| Region B | 1.2 | 11.0443 | 0.4003 | 0.4432 |

| Data Set | |
|---|---|
| Focal length | 9.9902 |
| F-number | 3.5 |

| Full-width at half-maximum of PSF | | |
|---|---|---|
| Defocus amount | Actual size ratio [%] | Pixel conversion ratio |
| 0.00 | 0.00 | 0.000 |
| 0.25 | −5.26 | 0.050 |
| −0.25 | 22.98 | 0.219 |

Figure 28:
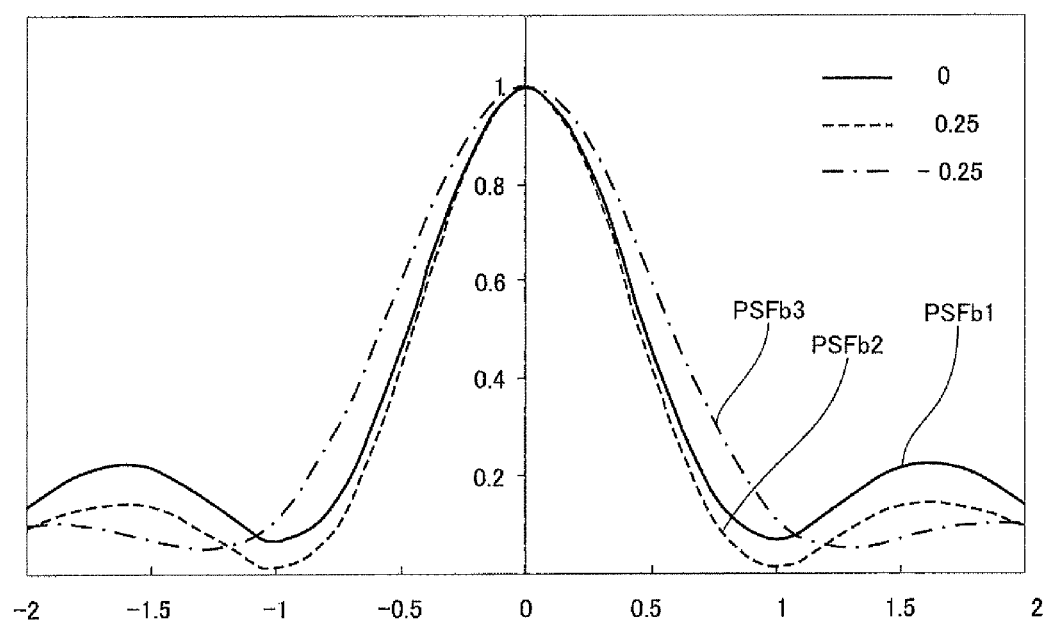
FIG. 28 is a diagram showing changes in the PSF of an optical system of Example 2-2 of the present invention in an optical-axis direction.

FIG. 28 is a diagram showing PSFs that are in the optical system of Example 2-2 and at different positions in the optical-axis direction. The meanings of the horizontal and vertical axes are the same as those in FIG. 25. The intensity distribution indicated by solid line is the PSF (PSFb1) at a focal position on the optical axis (on-axis). The intensity distribution indicated by broken line is the PSF (PSFb2) at a position 0.25 (mm) away from the focal position on the optical axis along the optical-axis direction toward the image side. The intensity distribution indicated by one-dot chain line is the PSF (PSFb3) at a position 0.25 (mm) away from the focal position on the axis along the optical-axis direction toward the object side.

In that manner, three PSFs are observed at different positions on the optical axis. Incidentally, in FIG. 28, in order to make a comparison between the three PSFs, the three PSFs are superimposed when being displayed in such a way that the centers of the three PSFs are positioned at the same place. For example, the PSFb2 and the PSFb3 are, without any change in intensity distribution, transferred along the optical axis so that the PSFb2 and the PSFb3 are placed onto the PSFb1, resulting in the situation shown in FIG. 28.

It is clear visually from the diagram that the three PSFs at the positions 0 (mm), 0.25 (mm) and −0.25 (mm) are substantially equal to each other. Moreover, even in a numerical example of the full-width at half-maximum of the above PSFs, in terms of actual size ratio, the values are within ±30%, and, in terms of pixel conversion ratio, the values are easily within one-fourth of a pixel, confirming that numerically the three PSFs are substantially equal to each other.

In the optical system having such a PSF relationship, it is possible to restore a sufficiently resolved image by performing various image restoration processes on an obtained image. In particular, when the PSFs in the optical-axis direction become substantially equal to each other, it is possible to realize an image with a deep focal depth.

Figure 29:
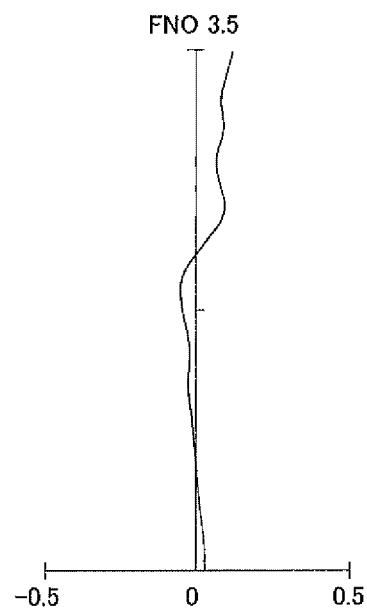
FIG. 29 is a diagram showing a spherical aberration characteristic of Example 2-2 of the present invention.

FIG. 29 is a diagram showing a spherical aberration characteristic in Example 2-2. What is shown here is a spherical aberration characteristic at a wavelength of 546.07 (nm) as in Comparative Example 2-1. The spherical aberration characteristic here has several peak values on the positive and the negative side. Therefore, even in Example 2-2, it is possible to realize an optical system having substantially equal PSFs in at least two spots within an image-side predetermined region.

Then, the following describes a numerical example and various characteristics in Example 2-3. In Example 2-3, five surfaces of the third lens L3 shown in FIG. 22 are trifocal lenses, thereby realizing an optical system having substantially equal PSFs in at least two spots within an image-side predetermined region. The meaning of each number and various design criteria are the same as those described in Comparative Example 2-1 and Examples 2-1 and 2-2.

Figure 30:
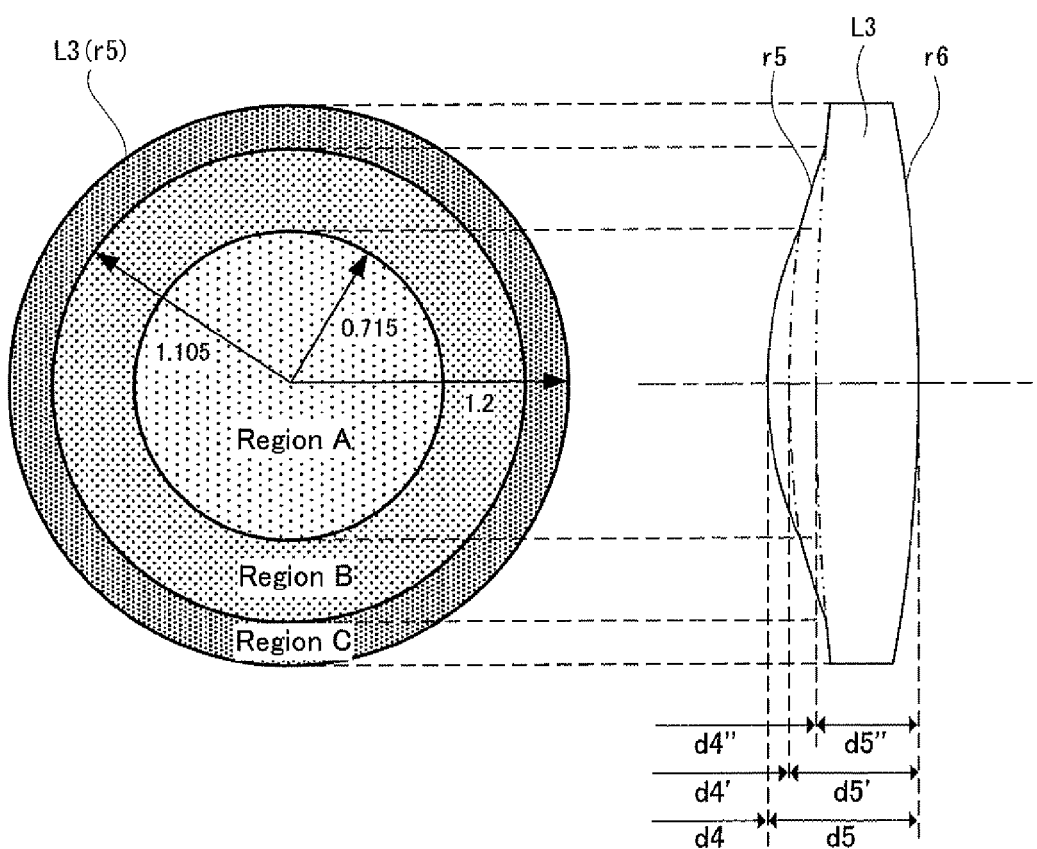
FIG. 30 is a schematic diagram showing the configuration of a trifocal lens used in Example 2-3 of the present invention.

FIG. 30 is a front view of a trifocal lens, which is applied to five surfaces of the third lens L3, as well as a cross-sectional view of the lens taken along the optical axis. The drawing here is a schematic diagram illustrating a multi-focal lens in an easy-to-understand manner; the shape thereof is different from the shape represented by actual numbers.

As shown in FIG. 30, on the trifocal lens, a region A is provided at the center thereof, and a region B is so provided as to surround the region A, and a region C is so provided as to surround the region B. In the present Example 2-4, the regions A, B and C each have a spherical shape. The regions A, B and C are so formed as to have no difference in level therebetween and change seamlessly. In the following numerical example, the radius of each region, curvatures, and the distances d4 and d5 between lens surfaces (optical surfaces) are shown. In this case, the surface distances d4 and d5 of the region B represent, as shown in FIG. 30, the surface distances (d4' and d5' in the diagram) at a location where a virtual surface formed by the lens surface of the region B crosses the optical axis. The surface distances d4 and d5 of the region C represent the surface distances (d4" and d5" in the diagram) at a location where a virtual surface formed by the lens surface of the region C crosses the optical axis.

Numerical Example 2-3

| | | Unit [mm] | | | |
|---|---|---|---|---|---|
| | | Surface Data | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Tri focal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Image plane) | ∞ | | | | |

| | Trifocal lens data (Surface No. 5) | | | |
|---|---|---|---|---|
| | Radius | Curvature | d4 | d5 |
| Region A | 0.715 | 10.7443 | 0.3997 | 0.4438 |
| Region B | 1.105 | 11.0443 | 0.4003 | 0.4432 |
| Region C | 1.2 | 11.2943 | 0.4025 | 0.4410 |

| Data Set | |
|---|---|
| Focal length | 9.9902 |
| F-number | 3.5 |

| Full-width at half-maximum of PSF | | |
|---|---|---|
| Defocus amount | Actual size ratio [%] | Pixel conversion ratio |
| −0.50 | 0.36 | 0.006 |
| −0.25 | −1.24 | 0.022 |
| 0.00 | 0.00 | 0.000 |
| 0.25 | −2.52 | 0.044 |
| 0.50 | −27.84 | 0.492 |

As for Example 2-3 in which the above trifocal lens is used, the PSF characteristic and spherical aberration characteristic thereof are also shown.

Figure 31:
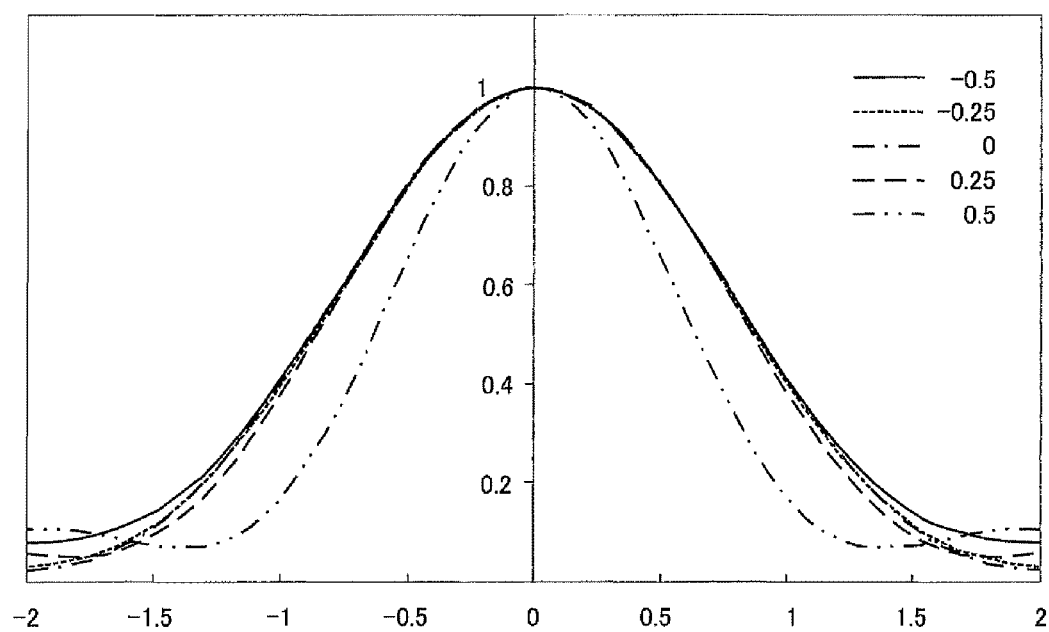
FIG. 31 is a diagram showing changes in the PSF of an optical system of Example 2-3 of the present invention in an optical-axis direction.

FIG. 31 is a diagram showing PSFs that are in the optical system of Example 2-3 and at different positions in the optical-axis direction. The meanings of the horizontal and vertical axes are the same as those in FIG. 25. Among the intensity distributions shown in FIG. 31, the one-dot chain line represents the PSF at the focal position on the axis. The remaining intensity distributions are the PSFs at positions away from the focal position on the axis: the broken line represents the PSF at a position 0.25 (mm) away from the focal position along the optical-axis direction toward the image side; the two-dot chain line represents the PSF at a position 0.5 (mm) away from the focal position toward the image side; the dotted line represents the PSF at a position 0.25 (mm) away from the focal position toward the object side (with a minus sign); and the solid line represents the PSF at a position 0.5 (mm) away from the focal position.

In that manner, five PSFs are observed at different positions on the optical axis. Incidentally, in FIG. 31, in order to make a comparison between the five PSFs, the five PSFs are superimposed when being displayed in such a way that the centers of the five PSFs are positioned at the same place. The five PSFs may be superimposed in the same way as in FIG. 28.

It is clear visually from the diagram that the five PSFs are substantially equal to each other. Moreover, in a numerical example of the full-width at half-maximum of the above PSFs, in terms of actual size ratio, the values are within ±30%, and, in terms of pixel conversion ratio, however, the values are over one-fourth of a pixel. Accordingly, depending on the image pickup element used, a sufficient resolution may not be obtained.

Figure 32:
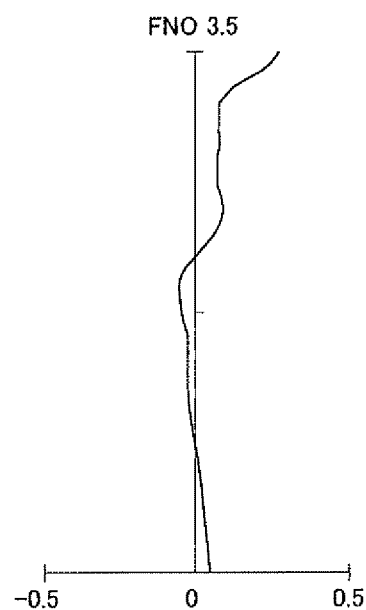
FIG. 32 is a diagram showing a spherical aberration characteristic of Example 2-3 of the present invention.

FIG. 32 is a diagram showing a spherical aberration characteristic in Example 2-3. What is shown here is a spherical aberration characteristic at a wavelength of 546.07 (nm) as in Comparative Example 2-1. The spherical aberration characteristic here has several peaks on the positive and the negative side. Therefore, even in Example 2-3, it is possible to have substantially equal PSFs in at least two spots within an image-side predetermined region.

With reference to FIGS. 21 to 32, the above has described Examples 2-1 to 2-3 and Comparative Example 2-1 thereof. According to the optical systems of Examples 2-1 to 2-3, it is possible to have substantially equal PSFs in at least two spots within an image-side predetermined region. When an image is obtained through such an optical system, the sufficiently resolved image can be obtained by performing an image restoration process on the obtained image. Moreover, it is possible to obtain an image with a wide focal depth.

Incidentally, in order to realize substantially equal PSFs in at least two spots on the image side, Examples 2-1 to 2-3 are different from Comparative Example 2-1 in that: an aspherical shape is provided in Example 2-1; a bifocal lens in Example 2-2; and a trifocal lens in Example 2-3. Incidentally, for a wave-front control element that is used to realize substantially equal PSFs, besides the aspherical shape of such a lens and the multi-focal lens, an aspherical or phase plate may be inserted to realize the above. Furthermore, a plurality of wave-front control elements may be used to realize the above. In Examples 2-2 and 2-3, each region of a multi-focal lens is in a spherical shape. However, any one of the regions may be in an aspherical shape. Moreover, the wave-front control element may be made of birefringent crystal so that a more effective PSF is realized.

Moreover, the above wave-front control element may be detachable. In this manner, the wave-front control element can be used as a normal optical system (Comparative Examples 2-1). For example, in Examples 2-1 to 2-3, the optical system can be used as a normal optical system, such as the one in Comparative Example 2-1, by replacing the third lens L3.

With reference to FIGS. 33 to 40, an optical system used in the No. 3 image pickup device of the present embodiment will be described.

Figure 33:
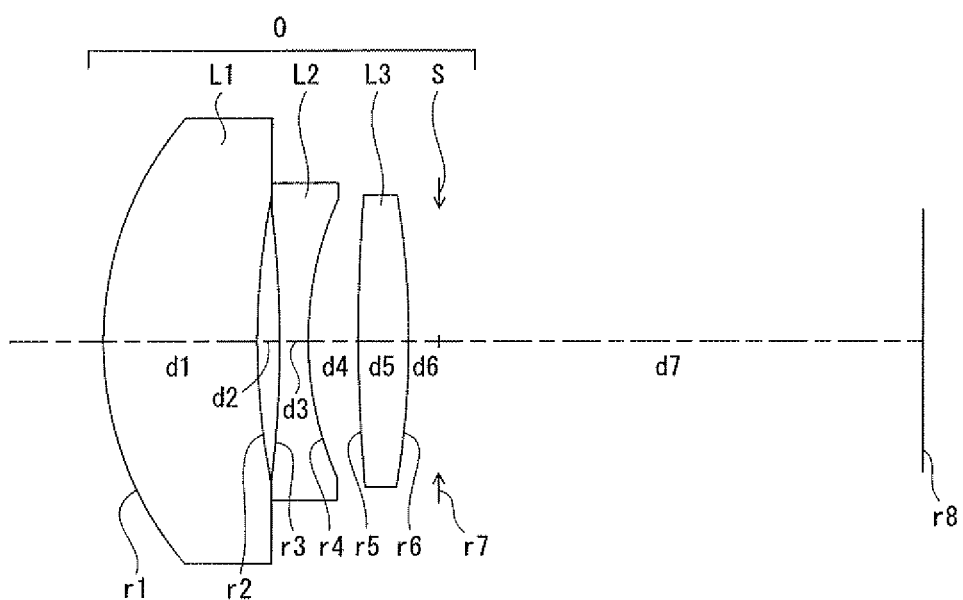
FIG. 33 is a cross-sectional view of an optical system of Comparative Example 3-1 and of Examples 3-1 and 3-2 of the present invention expanded and taken along an optical axis.

FIG. 33 is a schematic cross-sectional view of an optical system expanded and taken along an optical axis, which is used in Comparative Example 3-1 and Examples 3-1 and 3-2 according to the present embodiment of the invention. In Comparative Example 3-1 and Examples 3-1 and 3-2, as shown in the diagrams, third lenses L3 are different in detail.

Comparative example 3-1 is shown as an example to explain Examples 3-1 and 3-2; both surfaces of a third lens L3 are in a spherical shape. By contrast, in Example 3-1, six surfaces of a third lens L3 are in an aspherical shape. In Example 3-2, five surfaces of a third lens L3 are bifocal lenses. In that manner, the configurations are different.

In Comparative Example 3-1, an optical system O shown in FIG. 33 includes, from the object side to the emission side, a first lens L1, a second lens L2, a third lens L3, and an aperture diaphragm S in that order. In the diagram, on an image pickup plane indicated by r8, an image pickup element such as CCD is placed.

The first lens L1 is a single lens of a positive meniscus shape with a convex surface facing the object side. The second lens L2 is a single lens of a biconcave shape having negative refractive power. The third lens L3 is a single lens of a biconvex shape having positive refractive power.

In the present comparative example, when an image pickup element placed on the image pickup plane is designed, suppose that the maximum number of pixels in the vertical or horizontal direction is 4,000, and the pixel pitch 1.7 (μm). Incidentally, the same is true for Examples.

Numerical data of the above Comparative Example 3-1 are shown below. In the numerical data, r represents the radius of curvature of each lens surface (optical surface); d represents a distance between lens surfaces (optical surfaces); nd represents the refractive index of d-line of each lens (optical medium); Vd represents the Abbe number of each lens (optical medium); and F represents the focal distance. Incidentally, the symbol "∞", which is recorded as to the radius of curvature, means infinity.

In every kind of data, the focal distance of the optical system and the F-number are shown. The focal distance is measured in millimeters (mm). What is shown here is the F-number that was used for the present measurement at the time of opening.

Comparative Example 3-1

Unit [mm]

Surface Data

| Surface No. | r | d | nd | Vd | F |
|---|---|---|---|---|---|
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6 | −6.5817 | 0.2367 | | | |
| 7(Stop) | ∞ | 7.7389 | | | |
| 8(Image plane) | ∞ | | | | |

Data Set

| Focal length | 9.9902 |
|---|---|
| F-number | 3.5 |

Figure 34:
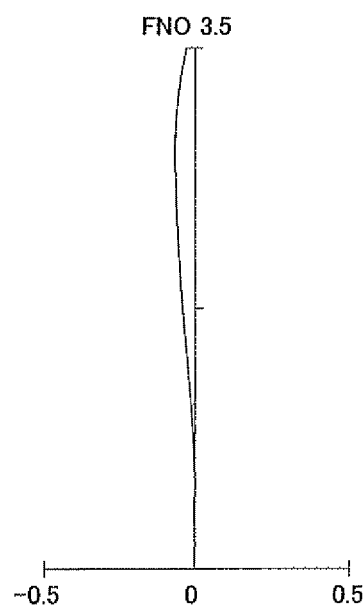
FIG. 34 is a diagram showing a spherical aberration characteristic of Comparative Example 3-1.

FIG. 34 is a diagram showing a spherical aberration characteristic in Comparative Example 3-1. What is shown here is a spherical aberration characteristic at a wavelength of 546.07 (nm).

Figure 35:
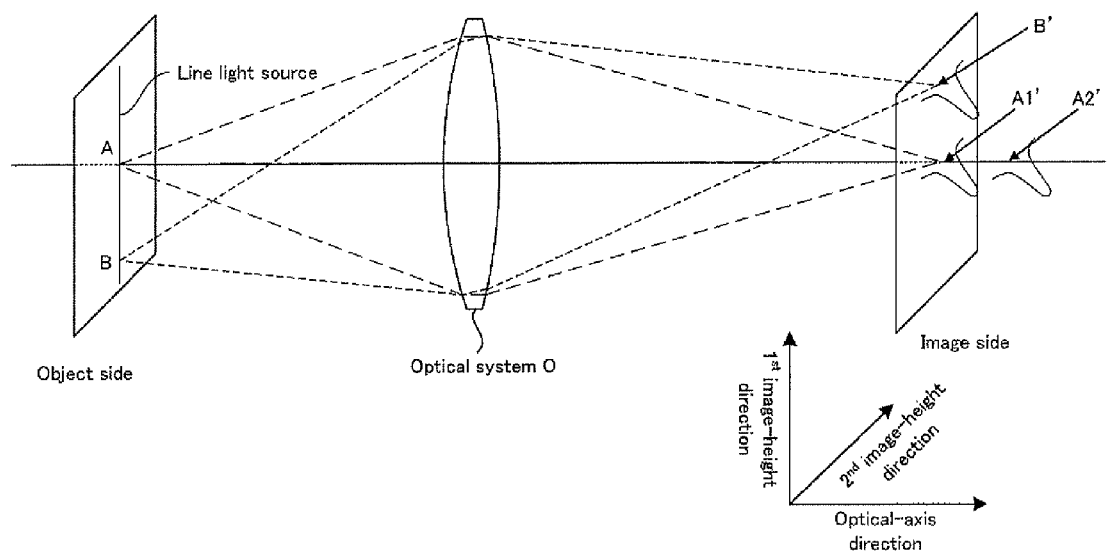
FIG. 35 is a conceptual diagram illustrating observation positions for LSF.

FIG. 35 is a conceptual diagram illustrating observation positions for LSF. On the object side, line light sources are disposed along a space between A and B. As responses to the line light sources disposed on the object side as described above, at observation spots on the image side, the responses to the line light sources are observed as LSF. For example, the LSF at the observation spot A1' can be represented as light intensity distribution with respect to a second image-height direction (or the depth direction of the paper) with the light intensity at the observation spot A1' as a center. Moreover, the LSF at the observation spot A2' can be represented as light intensity distribution with respect to the second image-height direction with the light intensity at the observation spot A2' as a center. Meanwhile, the LSF at the observation spot B' can be represented as light intensity distribution with respect to the second image-height direction with the light intensity at the observation spot B' as a center. Incidentally, the light intensity distribution with respect to the image-height direction means the light intensity distribution within a plane perpendicular to the optical axis.

According to the present embodiment, LSFs in at least two observation spots on the image side become substantially equal to each other. Therefore, when an image restoration process is performed, a sufficiently resolved image can be obtained. A region that contains the LSFs in at least two spots on the image side can be set arbitrarily with the location where the image pickup element is placed, as well as desired image characteristics, taken into account. A comparison of LSFs between two spots may be made at different locations in the optical-axis direction, which are for example observation spots A1' and A2'; or alternatively, the comparison may be made at different locations in the image-height direction, which are for example observation spots A1' and B'.

Then, the following describes a numerical example and various characteristics in Example 3-1. In Example 3-1, six surfaces of the third lens L3 shown in FIG. 33 are in an aspherical shape, thereby realizing substantially equal LSFs in at least two spots on the image side. The meaning of each number and various design criteria are the same as those described in Comparative Example 3-1. In surface data, asterisk "*" marked on the right side of a surface number indicates that a lens surface thereof is in an aspherical shape.

If x represents an optical axis on which the direction of light travel is positive, and y represents a direction perpendicular to the optical axis, the aspherical shape is represented by the following equation:

$$x=(y^2/r)/[1+\{1-(K+1)(y/r)^2\}^{1/2}]+A2y^2+A4y^4+A6y^6+A8y^8+A10y^{10}\dots$$

where r is the paraxial radius of curvature; K is the constant of the cone; and A2 to A20 are second- to tenth-order aspherical coefficients, respectively. Incidentally, symbol "E" indicates that the subsequent value is an exponent to base 10. For example, "1.0E-5" means "$1.0\times10^{-5}$."

Numerical Example 3-1

| | | Unit [mm] | | | |
|---|---|---|---|---|---|
| | | Surface Data | | | |
| Surface No. | r | d | nd | Vd | F |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5 | 10.7443 | 0.4438 | 1.81067 | 41.00 | 5.0931 |
| 6* | −6.5817 | 0.2367 | | | |
| 7(Stop) | ∞ | 7.7389 | | | |
| 8(Image Plane) | ∞ | | | | |

| Aspheric data 6th Surface |
|---|
| K = 0 |
| A2 = −2.01E−12 |
| A4 = 5.98E−03 |
| A6 = −2.08E−02 |
| A8 = 2.19E−02 |
| A10 = −7.06E−03 |

-continued

| Unit [mm] |  |  |
|---|---|---|
| Data Set |  |  |
| Focal length | 9.9902 |  |
| F-number | 3.5 |  |
| Full-width at half-maximum of PSF |  |  |
| Defocus amount | Actual size ratio [%] | Pixel conversion ratio |
| 0.00 | 0.000 | 0.000 |
| 0.25d | 3.631 | 0.178 |
| 0.35d | −8.939 | 0.437 |
| 0.45d | −10.502 | 0.514 |
| 0.50d | −5.678 | 0.278 |

Figure 36:
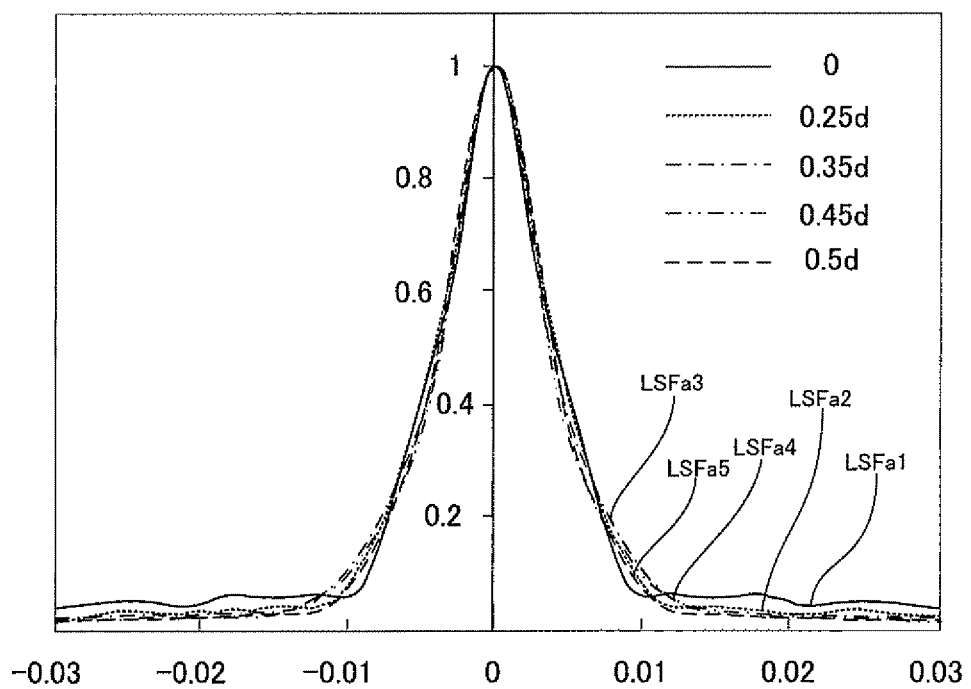
FIG. 36 is a diagram showing changes in the LSF of an optical system of Example 3-1 of the present invention in an image-height direction.

FIG. 36 is a diagram showing LSFs that are in the optical system of Example 3-1 and at different positions in the image-height direction. The horizontal axis represents the image-height direction distance (the distance within a plane perpendicular to the optical axis), measured in millimeters (mm). The vertical axis represents the intensity: the intensity at an observation central position of the LSF on the optical axis (on-axis) is normalized to 1. The intensity distribution F indicated by solid line is the LSF (LSFa1) at a focal position on the optical axis. The intensity distribution indicated by dotted line is the LSF (LSFa2) at a position 0.25 d (d is the maximum height of image in the optical system) away from the optical axis in the image-height direction. The intensity distribution indicated by one-dot chain line is the LSF (LSFa3) at a position 0.35 d away from the optical axis. The intensity distribution indicated by two-dot chain line is the LSF (LSFa4) at a position 0.45 d away from the optical axis. The intensity distribution indicated by broken line is the LSF (LSFa5) at a position 0.5 d away from the optical axis.

In that manner, five LSFs are observed at different positions on the same plane (or the focal plane, in this case). Incidentally, in FIG. 36, in order to make a comparison between the five LSFs, the five LSFs are superimposed when being displayed in such a way that the centers of the five LSFs are positioned at the same place. For example, the LSFa2 to LSFa5 are, without any change in intensity distribution, transferred in parallel to the location of the optical axis so that the LSFa2 to LSFa5 are placed onto the LSFa1, resulting in the situation shown in FIG. 36.

It is clear from the diagram that the LSFs at five positions, including the one at the focal position, are substantially equal to each other. Moreover, even in a numerical example of the full-width at half-maximum of the above LSFs, in terms of actual size ratio, the values are within ±50%, and, in terms of pixel conversion ratio, the values are easily within one pixel, confirming that even numerically the five LSFs are substantially equal to each other. Incidentally, absolute values are used here to indicate the pixel conversion ratio of the full-width at half-maximum.

In the optical system having such a LSF relationship, it is possible to restore a sufficiently resolved image by performing various image restoration processes on an obtained image.

Incidentally, it is preferred that a predetermined region where LSFs are substantially equal to each other be within 0.5 d from the optical axis as in the case of Example 3-1. When the optical system having substantially equal LSFs in such a predetermined region is used, it is possible to recover the resolution around the focal position after an image restoration process is performed on an image obtained by the optical system, as well as to obtain a visually excellent image. The predetermined region where LSFs are substantially equal to each other may be within 0.25 d from the optical axis.

Moreover, as described above, d represents the maximum height of image in the optical system (or the distance from one end of the image to the other end). Therefore, 0.5 d is the distance from the center (optical axis) of the image to one end of the image. Moreover, 0.5 d is also equal to half the length of the diagonal line of the image pickup element.

Figure 37:
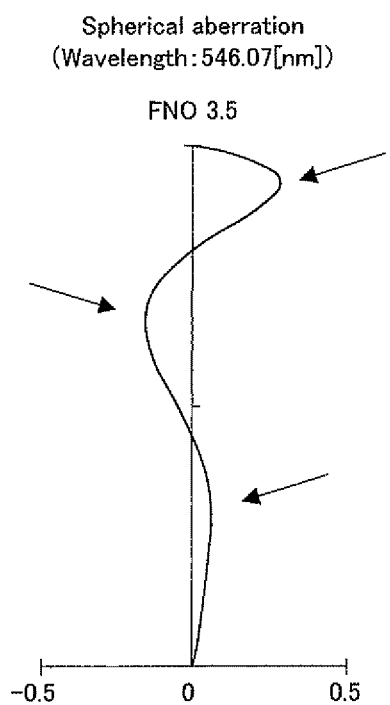
FIG. 37 is a diagram showing a spherical aberration characteristic of Example 3-1 of the present invention.

FIG. 37 is a diagram showing a spherical aberration characteristic in Example 3-1. What is shown here is a spherical aberration characteristic at a wavelength of 546.07 (nm). As for the spherical aberration characteristic here, when being compared with the spherical aberration characteristic shown in FIG. 34, a curve representing the aberration fluctuates in the positive and negative sides. As indicated by arrows in FIG. 37, the aberration curve has three peaks. Before and behind the peaks, the aberration occurrence direction extends from the positive to the negative side, or from the negative to the positive side.

In that manner, the spherical aberration characteristic moves in both the positive- and negative-side directions. Therefore, it is possible to realize an optical system having substantially equal LSFs in at least two spots within an image-side predetermined region. It is preferred that a plurality of peaks of the spherical aberration characteristic be formed on both the positive and the negative sides as in Example 3-1. Incidentally, it is possible to have substantially equal LSFs in at least two spots in an image-side predetermined region just by providing the spherical aberration characteristic with two or more peaks.

Then, the following describes a numerical example and various characteristics in Example 3-2. In Example 3-2, five surfaces of the third lens L3 shown in FIG. 33 are bifocal lenses, thereby realizing an optical system having substantially equal LSFs in at least two spots in an image-side predetermined region. The meaning of each number and various design criteria are the same as those described in Comparative Example 3-1 and Example 3-1.

Figure 38:
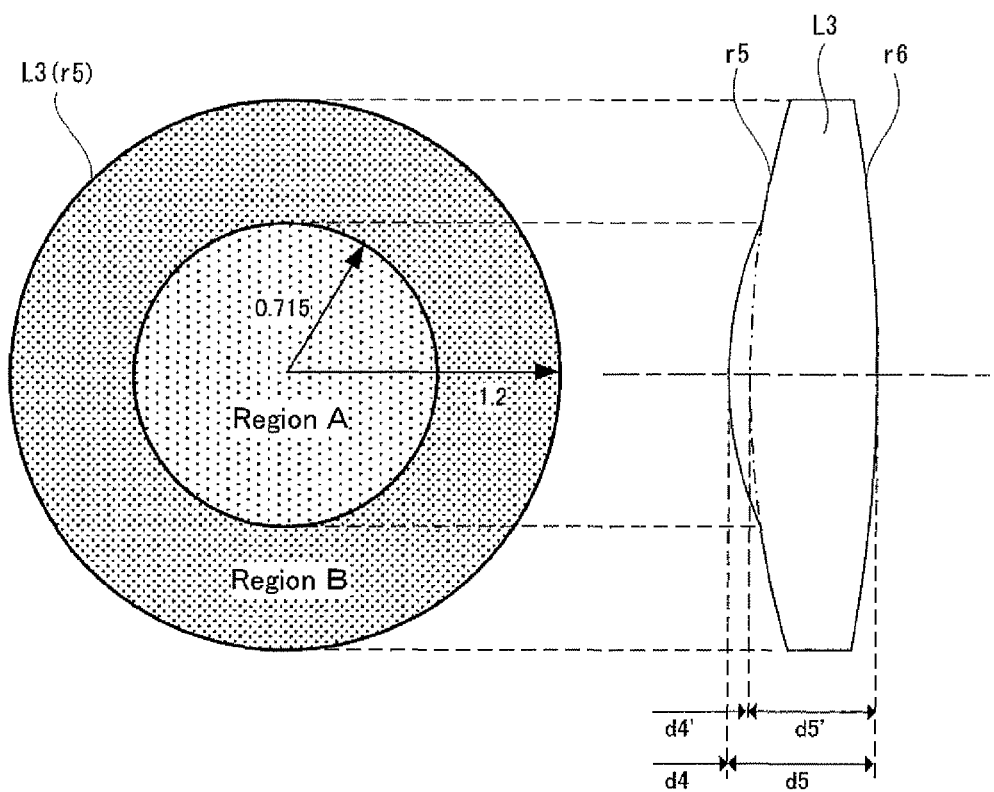
FIG. 38 is a schematic diagram showing the configuration of a bifocal lens used in Example 3-2 of the present invention.

FIG. 38 is a front view of a bifocal lens, which is applied to five surfaces of the third lens L3, as well as a cross-sectional view of the lens taken along the optical axis. The drawing here is a schematic diagram illustrating a multi-focal lens in an easy-to-understand manner; the shape thereof is different from the shape represented by actual numbers.

As shown in FIG. 38, on the bifocal lens, a region A is provided at the center thereof, and a region B is so provided as to surround the region A. In the present example, the regions A and B both have a spherical shape. The regions A and B are so formed as to have no difference in level therebetween and change seamlessly. In the following numerical example, the radius of each region, curvatures, and the distances d4 and d5 between lens surfaces (optical surfaces) are shown. In this case, the surface distances d4 and d5 of the region B represent, as shown in FIG. 38, the surface distances (d4' and d5' in the diagram) at a location where a virtual surface formed by the lens surface of the region B crosses the optical axis.

Numerical Example 3-2

| Surface No. | r | d | nd | Vd | F |
|---|---|---|---|---|---|
| | Unit [mm] | | | | |
| | Surface Data | | | | |
| 1 | 3.0139 | 1.2800 | 1.72341 | 50.20 | 6.1743 |
| 2 | 7.6146 | 0.1923 | | | |
| 3 | −10.5848 | 0.2367 | 1.70448 | 30.10 | −3.5085 |
| 4 | 3.2544 | 0.3997 | | | |
| 5(Bifocal) | 10.7443 | 0.4438 | 1.81067 | 41.00 | 8.1189 |
| 6 | −6.5817 | 0.2367 | | | |
| 7(Stop) | ∞ | 7.7389 | | | |
| 8(Image plane) | ∞ | | | | |

| | Bifocal lens data (Surface No. 5) | | | |
|---|---|---|---|---|
| | Radius | Curvature | d4 | d5 |
| Region A | 0.715 | 10.7443 | 0.3997 | 0.4438 |
| Region B | 1.2 | 11.0443 | 0.4003 | 0.4432 |

| Data Set | |
|---|---|
| Focal length | 9.9902 |
| F-number | 3.5 |

| Full-width at half-maximum of PSF | | |
|---|---|---|
| Defocus amount | Actual size ratio [%] | Pixel conversion ratio |
| −0.10 | −19.041 | 0.575 |
| −0.05 | −40.055 | 1.209 |
| 0.00 | 0.000 | 0.000 |

Figure 39:
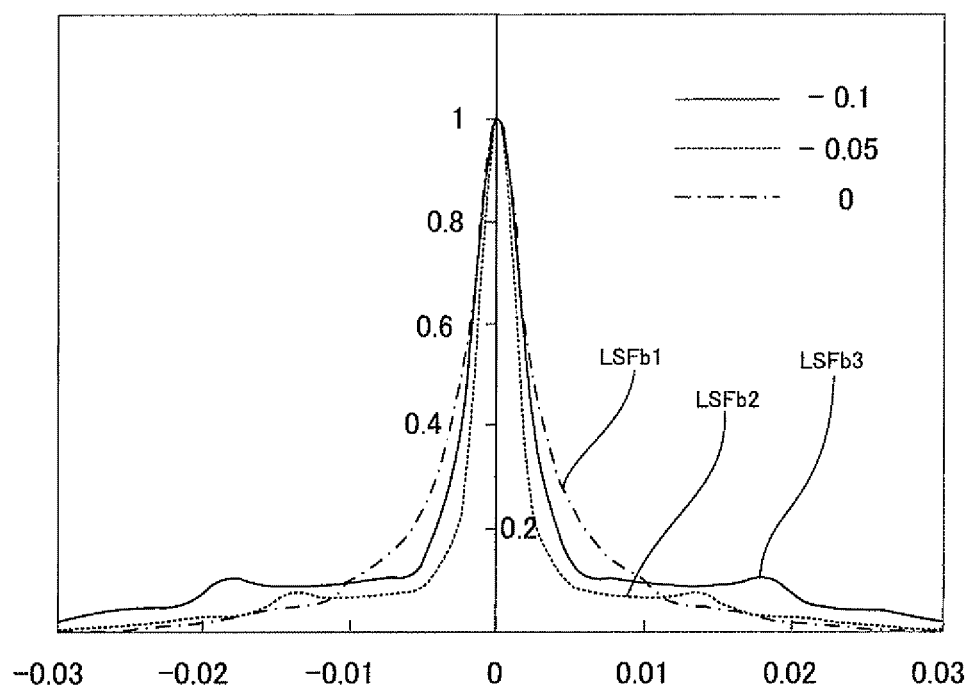
FIG. 39 is a diagram showing changes in the LSF of an optical system of Example 3-2 of the present invention in an optical-axis direction.

FIG. 39 is a diagram showing LSFs that are in the optical system of Example 3-2 and at different positions in the optical-axis direction. The meanings of the horizontal and vertical axes are the same as those in FIG. 36. The intensity distribution indicated by one-dot chain line is the LSF (LSFb1) at a focal position on the optical axis (on axis). The intensity distribution indicated by dotted line is the LSF (LSFb2) at a position 0.05 (mm) away from the focal position on the optical axis along the optical-axis direction toward the object side. The intensity distribution F indicated by solid line is the LSF (LSFb3) at a position 0.1 (mm) away from the focal position on the optical axis along the optical-axis direction toward the object side.

In that manner, three LSFs are observed at different positions on the optical axis. Incidentally, in FIG. 39, in order to make a comparison between the three LSFs, the three LSFs are superimposed when being displayed in such a way that the centers of the three LSFs are positioned at the same place. For example, the LSFb2 and the LSFb3 are, without any change in intensity distribution, transferred along the optical axis so that the LSFb2 and the LSFb3 are placed onto the LSFb1, resulting in the situation shown in FIG. 39.

It is clear from the diagram that, in the vicinity of the observation position, the LSFb2 has the sharpest shape, and the LSFb3 has the widest shape. Meanwhile, it is clear from the diagram that, at positions 0.01 (mm) or more away from the observation central position, the value of LSF increases away from the focal position.

In a numerical example of the full-width at half-maximum of the above LSFs, in terms of actual size ratio, the values are within ±50%, and, in terms of pixel conversion ratio, however, the LSF at a position 0.05 (mm) away from the focal position toward the object side is over one pixel. Accordingly, depending on the image pickup element used, a sufficient resolution may not be obtained.

In an optical system having such a LSF relationship, by adjusting a reference focus position or performing various image restoration processes on an obtained image, it is possible to restore a sufficiently resolved image. In particular, when the LSFs in the optical-axis direction become substantially equal, it is possible to realize an image with a deep focal depth.

Figure 40:
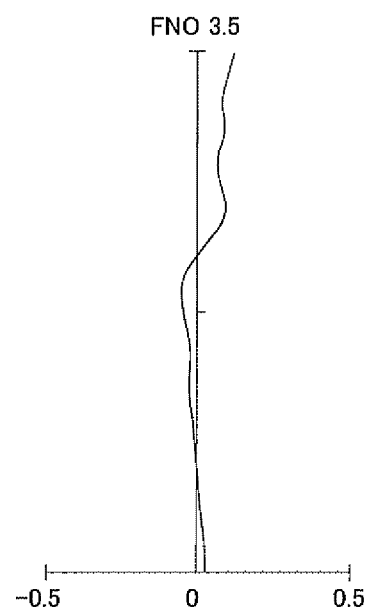
FIG. 40 is a diagram showing a spherical aberration characteristic of Example 3-2 of the present invention.

FIG. 40 is a diagram showing a spherical aberration characteristic in Example 3-2. What is shown here is a spherical aberration characteristic at a wavelength of 546.07 (nm) as in Comparative Example 3-1. The spherical aberration characteristic here has several peaks on the positive and the negative side. Therefore, even in Example 3-2, it is possible to realize an optical system having substantially equal LSFs in at least two spots within an image-side predetermined region.

With reference to FIGS. 33 to 40, the above has described Examples 3-1 and 3-2 and Comparative Example 3-1 thereof. According to the optical systems of Examples 3-1 and 3-2, it is possible to have substantially equal LSFs in at least two spots within an image-side predetermined region. When an image is obtained through such an optical system, the sufficiently resolved image can be obtained by performing an image restoration process on the obtained image. Moreover, it is possible to obtain an image with a wide focal depth.

Incidentally, in order to realize substantially equal LSFs in at least two spots on the image side, Examples 3-1 to 3-2 are different from Comparative Example 3-1 in that: an aspherical shape is provided in Example 3-1; and a bifocal lens in Example 3-2. Incidentally, for a wave-front control element that is used to realize substantially equal LSFs, besides the aspherical shape of such a lens and the multi-focal lens, an aspherical or phase plate may be inserted to realize the above. Furthermore, a plurality of wave-front control elements may be used to realize the above. In Example 3-2, each region of a multi-focal lens is in a spherical shape. However, any one of the regions may be in an aspherical shape. Moreover, the wave-front control element may be made of birefringent crystal so that a more effective LSF is realized.

Moreover, the above wave-front control element may be detachable. In this manner, the wave-front control element can be used as a normal optical system (Comparative Examples 3-1). For example, in Examples 3-1 and 3-2, the optical system can be used as a normal optical system, such as the one in Comparative Example 3-1, by replacing the third lens L3.

Figure 41:
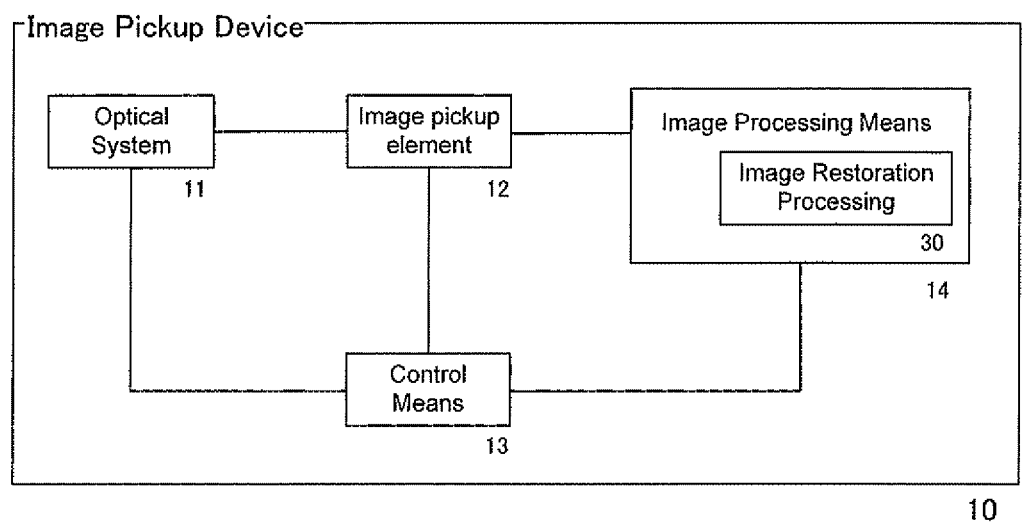
FIG. 41 is a schematic diagram showing the configuration of an image pickup device of the present invention.
Figure 42:
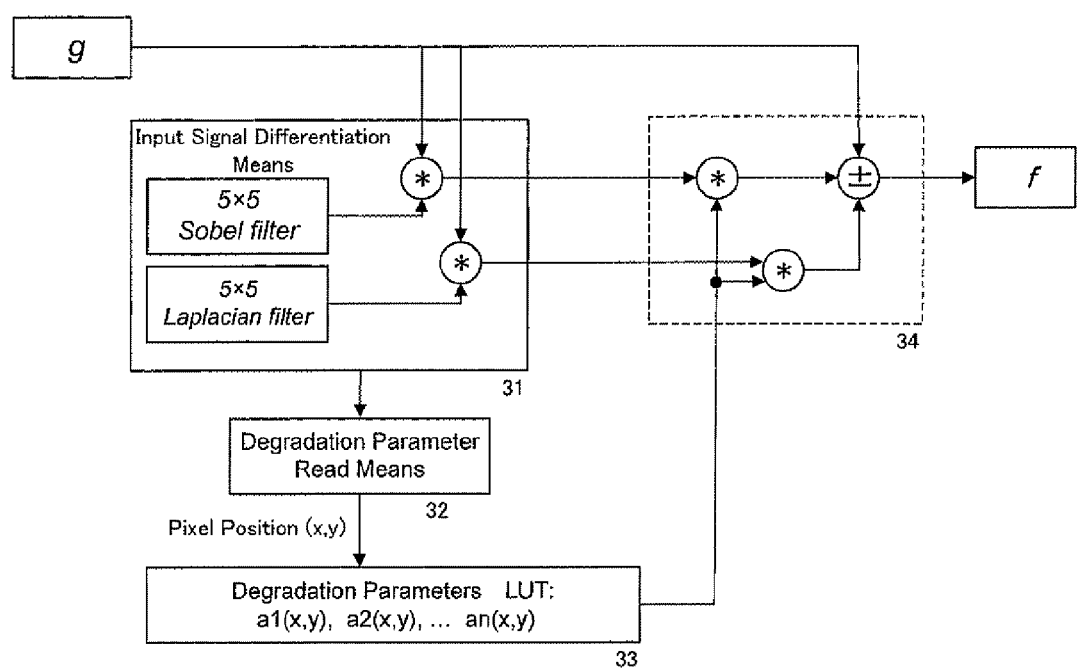
FIG. 42 is a schematic diagram showing an image restoration process of the present invention.

Then, with reference to FIGS. 41 to 43, an image pickup device and image pickup system used in the present embodiment will be described. FIG. 41 is a schematic diagram showing the configuration of an image pickup device of the present embodiment. The image pickup device 10 includes an optical system 11, an image pickup element 12, an image processing means 14, and a control means 13. Incidentally, according to the present embodiment, an image restoration process 30 is performed by the image processing means 14. However, the image restoration process 30 may be performed outside of the image pickup device 10.

In the image pickup device 10, as described above, the optical system 11 has: a substantially constant MTF at the location where the image pickup element 12 is placed and in predetermined distances before and behind the location; or substantially equal PSFs in at least two spots within an image-side predetermined region; or substantially equal LSFs in at least two spots within an image-side predetermined region. The light emitted from an object is concentrated by the optical system 11, and an image of the object is formed at the light concentration position. At the light concentration position, the image pickup element 12 such as CCD is disposed. The image pickup element 12 is formed by a collection of photoelectric conversion elements (pixels) regularly arranged.

The beam of light that has entered the image pickup element 12 is converted into electrical signals (image signals) by the photoelectric conversion elements of the image pickup element 12. The electrical signals are input into the image processing means 14, where various kinds of signal processing, such as an image development process, gamma correction, image compression process and image restoration process 30, are performed. The electrical signals that have undergone the signal processing are output to an external memory or device via a built-in memory in the image pickup device 10 or various interfaces, which are not shown in the diagram.

The control means 13 is a means for taking overall control of the optical system 11, the image pickup element 12 and the image processing means 14. The control means 13 includes a CPU, a storage means such as ROM or RAM, and various programs, which are stored in the storage means. The control means 13 may also serve as the image processing means 14.

In the image restoration process 30, a process is performed based on an image formation characteristic of the optical system 11. In this case, the control means 13 acquires information about the image formation characteristic of the optical system 11, and transfers the information to the image restoration process 30. According to such a configuration, even in the image pickup device 10 having an exchangeable optical system 11, the image restoration process 30 appropriate for the optical system 11 can be executed. The image formation characteristics of the optical system 11 are not limited to the information that shows actual image formation characteristics, such as an aperture value or focal distance; with the use of identification information of the optical system 11, such as a manufacturer's serial number, the information may be converted in the control means 13 to actual image formation characteristics that correspond to the identification information.

The following describes an image restoration process in the image pickup device of the present embodiment. Incidentally, in the following description, an image (or an image obtained by the image pickup element) on which the image restoration process is performed is referred to as an observation image. In the image restoration process, various processes (conversion) are available. When being roughly classified, the available image restoration processes can be divided into the following three:

(1) The image restoration process in which an image formation characteristic of the optical system 11 is used, and processes are also performed according to the position of the observation image;

(2) The image restoration process in which an image formation characteristic of the optical system 11 is used, and a certain process is also performed on the entire observation image; and (3) The image restoration process in which an image formation characteristic of the optical system 11 is not used, and a certain process is performed on the entire observation image.

The image restoration process (1) is image processing in which a different process is performed for each pixel of the observation image, i.e. space-variant processes are performed. The image processing makes it possible to achieve extremely effective image restoration for an image taken by the optical system 11 of the present embodiment. That is, the MTFs at the location where the image pickup element 12 is placed and in the vicinity thereof are increased substantially evenly, and it is possible to restore high MTFs at the location where the image pickup element 12 is placed and in the vicinity thereof. The image restoration process will be described later in detail. Incidentally, a different process may not be performed for each pixel; a different process may be performed for each group of pixels.

The image restoration processes (2) and (3) are image processing in which the same process is performed for each pixel of the observation image, i.e. the space-invariant process is performed. As for the image restoration process (2) or the like, to the observation image, filtering is performed with the use of the inverse function of a degradation function corresponding to the image formation characteristic of the optical system 11. Therefore, it is possible to achieve effective image restoration.

The image restoration processes (3) include band emphasis, which raises a predetermined band, edge enhancement, which adds up edge information extracted from the observation image, and the like. According to the above mage restoration process, it is possible to carryout image restoration in a simple manner without using the image formation characteristic of the optical system 11. The image restoration processes (2) and (3) may be a process that is performed in space, or a process that is performed on a frequency axis with the use of Fourier transform or the like.

The following describes in detail the image restoration process (1).

When an image of an object that varies continuously in depth is taken, what is obtained is an observation image having different degrees of blur from the near side to the back side. If the central portion of the object is in focus, then there are continuous changes in the amount of blur of the object's observation image taken in the following manner: Large→Small→Large. It is possible to define such a situation as a situation where the degree of blur at each pixel of the observation image changes according to the coordinates of the observation image, i.e. a space-variant state.

If a restored image is defined as f(x,y), an observation image as g(x,y) and a degradation function as h(x, y, α, β), mth- and nth-order differentiation around x and y of f(x,y) and g(x, y), and ith- and kth-order moment of h(x, y, α, β) can be defined by the equations shown in (Equation 1). In this case, the degradation function h(x, y, α, β) is a function representing the amount of blur that changes according to the pixel position of the observation image g(x,y) and PSF (α, β), which shows the image formation characteristic of the optical system.

$$f^{(m,n)} = \frac{\partial^m}{\partial x^m}\frac{\partial^n}{\partial y^n} f(x, y)$$

$$g^{(m,n)} = \frac{\partial^m}{\partial x^m}\frac{\partial^n}{\partial y^n} g(x, y)$$

$$h_{i,k}^{(m,n)} = \int\int \alpha^i \beta^k \frac{\partial^m}{\partial x^m}\frac{\partial^n}{\partial y^n} h(x, y, \alpha, \beta) d\alpha d\beta$$

[Equation 1]

When a model of the relationship between the observation image g, the restored image f and the degradation function h is made, g can be represented by convolution of h and f as shown in (Equation 2).

$$g(x, y) = \int_{-\infty}^{\infty}\int_{-\infty}^{\infty} h(x-\alpha, y-\beta, \alpha, \beta) f(x-\alpha, y-\beta) d\alpha d\beta$$

[Equation 2]

In the above (Equation 2), the Taylor expansion of h, f on the right side is made (h: Nth-order truncation, f: Mth-order truncation):

$$f(x-\alpha, y-\beta) = \sum_{n=0}^{N} a_n \sum_{i=0}^{n} C_i^n \alpha^{n-i} \beta^i f^{(n-i,i)}$$

$$h(x-\alpha, y-\beta, \alpha, \beta) = \sum_{m=0}^{M} a_m \sum_{j=0}^{m} C_j^m \alpha^{m-j} \beta^j h^{(m-j,j)}$$

$$C_p^k = \frac{k!}{p!(k-p)!}$$

[Equation 3]

When (Equation 3) is substituted into (Equation 2), and represented by the integral of each term derived from the product of h, f, the term of each integral can be replaced with the moment of h defined in Equation 1, leading to (Equation 4).

$$g(x, y) = \sum_{n=0}^{N} a_n \sum_{i=0}^{n} C_i^n f^{(n-i,i)} \sum_{m=0}^{M} a_m \sum_{j=0}^{m} C_j^m h_{m+n-i-j,i+j}^{(m-j,j)}$$

[Equation 4]

Both sides of (Equation 4) are differentiated with respect to x, y. When the differential coefficients off, h>N, M, each differential coefficient is set to zero. Then, the process is repeated p, q times until $g^{(p,q)}=f^{(p,q)}$ with respect to x, y. Back-calculation is performed before being substituted into the derivative off of (Equation 4). According to such a procedure, the remaining function off in (Equation 4) is only a term of zeroth-order differentiation. The restored image f can be represented by product-sum operation of the observation image g and the degradation function has shown below.

$$f(x,y)=g(x,y)+a_1(x,y)\cdot g'(x,y)+ \ldots +a_n(x,y)\cdot g^{(n)}(x,y)$$

where
  f: the restored image
  g: the observation image
  $a_1, a_2, \ldots, a_n$: degradation parameters, and
  $g^{(n)}$: nth-order differentiation for the observation image.

In this case, the degradation parameters are parameters determined by the degradation function h, as well as parameters that vary according to the pixel position of the observation image g (x,y) and the image formation characteristic of the optical system.

According to the present embodiment, the image formation characteristic of the optical system 11 is used, and the image restoration process (1), in which conversion takes place according to the position of the observation image, is performed on the observation image. That is, when an image of an object is taken by an optical system that has a substantially constant MTF at the location where the image pickup element is placed and in predetermined distances before and behind the location, or that has substantially equal PSFs in at least two spots within an image-side predetermined region, or that has substantially equal LSFs in at least two spots within an image-side predetermined region, it is possible to recover image resolution in a more effective manner (or obtain a sufficiently resolved image) by performing the image processing (1) on the observation image taken, compared with the image restoration processes (2) and (3).

An example of the process by the image restoration process 30 will be described with reference to FIG. 42. FIG. 42 is a block diagram of the image restoration process 30. According to the present embodiment, the image restoration process 30 includes an input signal differentiation means 31, a degradation parameter reading means 32, a degradation parameter lookup table 33, and a multiplication and addition means 34.

The input signal differentiation means 31 is a means for differentiating the observation image g, and uses two filters, a Sobel filter, which executes first-order differentiation, and a Laplacian filter, which executes second-order differentiation.

In the degradation parameter lookup table 33, the pixel positions (x,y) of the observation image g and degradation parameters $a_1, a_2, \ldots a_n$, which correspond to optical characteristics of the optical system 11, are stored in advance. In this manner, according to the present embodiment, the lookup table, which is based on design values of the optical system 11, is prepared in advance, thereby reducing calculation time. Incidentally, when the Sobel filter and the Laplacian filter are used, only coefficients $a_1$ and $a_2$ are read from the degradation parameter lookup table 33. Therefore, there is no need to use $a_3$ to $a_n$.

As for acquisition of degradation parameters, instead of preparing such a lookup table 33, the degradation parameters may be calculated in real time from the optical characteristics. Alternatively, a plurality of approximate equations that go along with the optical characteristics may be prepared in advance, and be selectively used for calculation.

The degradation parameter reading means 32 reads a value corresponding to the pixel position (x,y) from the degradation parameter lookup table 33, and outputs the value to the multiplication and addition means 34.

The multiplication and addition means 34 performs multiplication and addition of signals output from the input signal differentiation means 31 and the degradation parameters read, and adds the observation image g to output the restored image f.

Figure 43:
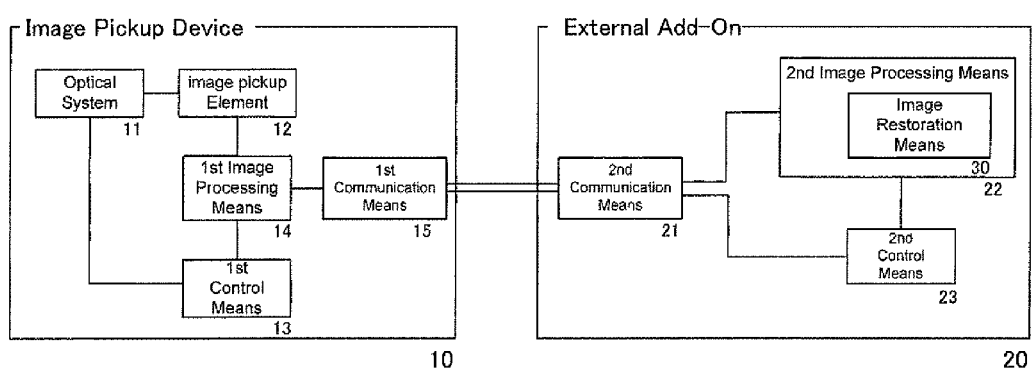
FIG. 43 is a schematic diagram showing the configuration of an image pickup system of the present invention.

FIG. 43 is a schematic diagram showing the configuration of an image pickup device 10 at a time when an image restoration process is performed in an external device, as well as the configuration of an image pickup system including the image pickup device 10 and an external device 20. According to the present embodiment, an image restoration process 30 is so designed to be performed in the external device 20.

The image pickup device 10 includes an optical system 11, an image pickup element 12, a first image processing means 14, and a first control means 13, which each have the same configuration as those indicated by the same reference symbols in the image pickup device illustrated in FIG. 41. According to the present embodiment, a first communication means 15 is provided. The first communication means 15 is provided to transmit an image (observation image) taken by the image pickup device 10 to the external device 20. If an image formation characteristic of the optical system 11 is required in the image restoration process 30 executed in the external device 20, the image formation characteristic may be transmitted so as to be associated with the observation image.

Meanwhile, in the external device 20, a second image processing means 22 and a second control means 23 are provided to make a second communication means 21 and the image restoration process 30 executable. The second communication means 21 is a means for receiving an image transmitted from the first communication means 15. Various types of first communication means 15 and second communication means can be employed regardless of whether the communication means are of wire or wireless communication.

In the second image processing means 22, the image restoration process 30 is executed with an observation image received via the second communication means 21, or with the observation image and the image formation characteristic. The image that has undergone the image restoration process 30 is output to an external memory or any other external device via an internal memory or various types of interface, which are not shown in the diagram. Incidentally, the second image processing means 22 may perform not only the image restoration process 30 but also various other kinds of image processing.

In that manner, the image restoration process 30 is performed by the external device 20. Therefore, it is possible to reduce processing load within the image pickup device 10. Incidentally, according to the present embodiment, various kinds of information, including observation images, are exchanged by the communication means 15 and 21. However, various kinds of information may be exchanged via an external memory, which can be attached to the image pickup device 10 and the external device 20.

The above has described the image pickup device and image pickup system of the present invention. However, the image pickup device and image pickup system of the present invention can be applied not only to typical digital cameras (regardless of whether the cameras are of OVF or EVF), but also to endoscopes, which are used in the medical and any other field and is inserted into a test object for observation; capsule endoscopes, which a test object, or patient, can swallow to observe the inside of the body; or various kinds of optical equipment, such as microscopes.

The above has described various embodiments of the present invention. However, the present invention is not limited to the embodiments. An embodiment in which components of the above embodiments are appropriately combined and formed is also within the scope of the present invention.

What is claimed is:

1. An optical device where an image of an object is formed on an image pickup element and where an image restoration process is performed on the image obtained by the image pickup element, comprising
a MTF that satisfies the following conditional expression (1):

$$0.001 < L \times NA < 0.5, 5 < a < 30 \quad (1)$$

where L: the width of the MTF when the MTF is a %, and
NA: a numerical aperture of the optical device.
2. The optical device according to claim 1, wherein
the MTF satisfies the following conditional expression (2):

$$0.001 < Lc \times NA < 0.5, 5 < a < 30 \quad (2)$$

where Lc: a half-value width of the MTF.
3. The optical device according to claim 1, wherein
the MTF has a spatial frequency that satisfies the following conditional expression (3):

$$v = 1/(2 \times P \times A), 1 < A < 20 \quad (3)$$

where v: a spatial frequency, and
P: a pixel pitch of the image pickup element.
4. The optical device according to claim 1, wherein
the MTF has a spatial frequency that satisfies the following conditional expression (4):

$$v = 1/(2 \times P \times A), 2 < A < 8 \quad (4)$$

where v: a spatial frequency, and
P: a pixel pitch of the image pickup element.
5. The optical device according to claim 1, wherein
the MTF has a spatial frequency that satisfies the following conditional expression (5):

$$0.001 < v/N < 3 \quad (5)$$

where v: a spatial frequency, and
N: the number of pixels on one side of the image pickup element.

6. An image pickup device, comprising:
an image pickup element;
an optical system that forms an image of an object on the image pickup element; and
image processing means for executing image processing on an observation image output from the image pickup element, wherein
the optical system has a MTF that satisfies the following conditional expression (1):

$$0.001 < L \times NA < 0.5, 5 < a < 30 \quad (1)$$

where L: the width of the MTF when the MTF is a %, and
NA: a numerical aperture of the optical system.

7. The image pickup device according to claim 6, wherein the MTF satisfies the following conditional expression (2):

$$0.001 < Lc \times NA < 0.5, 5 < a < 30 \quad (2)$$

where Lc: a half-value width of the MTF.

8. The image pickup device according to claim 6, wherein the MTF has a spatial frequency that satisfies the following conditional expression (3):

$$v = 1/(2 \times P \times A), 1 < A < 20 \quad (3)$$

where v: a spatial frequency, and
P: a pixel pitch of the image pickup element.

9. The image pickup device according to claim 6, wherein the MTF has a spatial frequency that satisfies the following conditional expression (4):

$$v = 1/(2 \times P \times A), 2 < A < 8 \quad (4)$$

where v: a spatial frequency, and
P: a pixel pitch of the image pickup element.

10. The image pickup device according to claim 6, wherein the MTF has a spatial frequency that satisfies the following conditional expression (5):

$$0.001 < v/N < 3 \quad (5)$$

where v: a spatial frequency, and
N: the number of pixels on one side of the image pickup element.

11. The image pickup device according to claim 6, wherein the MTF satisfies, at a maximum aperture, each of the conditional expressions.

12. The image pickup device according to claim 6, wherein the MTF crosses an MTF of another spatial frequency in a range where contrast does not become zero.

13. The image pickup device according to claim 12, wherein
the MTF crosses an MTF of another spatial frequency at a position less than or equal to 10%.

14. The image pickup device according to claim 6, wherein
a spherical aberration characteristic of the optical system has a peak value.

15. The image pickup device according to claim 14, wherein
a spherical aberration characteristic of the optical system has two or more peak values.

16. The image pickup device according to claim 15, wherein
peak values of the spherical aberration characteristic are positioned on positive and negative sides.

17. The image pickup device according to claim 6, wherein
the optical system includes a wave-front control element designed to realize the MTF.

18. The image pickup device according to claim 17, wherein
the wave-front control element designed to realize the MTF has an aspherical surface.

19. The image pickup device according to claim 17, wherein
the wave-front control element designed to realize the MTF is a phase plate.

20. The image pickup device according to claim 17, wherein
the wave-front control element designed to realize the MTF is a lens having a plurality of curvatures on one surface.

21. The image pickup device according to claim 20, wherein
the wave-front control element designed to realize the MTF is a lens having different curvatures in central and peripheral portions.

22. The image pickup device according to claim 20, wherein
the wave-front control element designed to realize the MTF is a lens having three curvatures on one surface.

23. The image pickup device according to claim 17, wherein
the wave-front control element designed to realize the MTF is made of birefringent crystal.

24. The image pickup device according to claim 17, wherein
the wave-front control element designed to realize the MTF is detachable.

25. An image pickup system, comprising:
the image pickup device claimed in claim 6; and
an external device, which performs an image restoration process on an image obtained by the image pickup element.

26. The image pickup system according to claim 25, wherein
the image restoration process uses an image formation characteristic of the optical system.

27. The image pickup system according to claim 25, wherein
as for the image restoration process, a restored image executes a process represented by the following differential equation:

$$f(x,y) = g(x,y) + a_1(x,y) \cdot g'(x,y) + \ldots + a_n(x,y) \cdot g^{(n)}(x,y)$$

where
f: the restored image
g: an observation image
$a_1, a_2, \ldots, a_n$: degradation parameters, and
$g^{(n)}$: nth-order differentiation for the observation image.

28. The image pickup system according to claim 25, wherein:
the image pickup device and the external device each have communication means; and
an image obtained by the image pickup element is transmitted to the external device via the communication means.

* * * * *